(12) United States Patent
Tabuchi et al.

(10) Patent No.: US 7,400,793 B2
(45) Date of Patent: Jul. 15, 2008

(54) OPTICAL DEVICE WITH SLAB WAVEGUIDE AND CHANNEL WAVEGUIDES ON SUBSTRATE

(75) Inventors: Haruhiko Tabuchi, Sagamihara (JP); Terukazu Naruse, Atsugi (JP); Koji Terada, Atsugi (JP); Kohei Shibata, Isehara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/491,130

(22) Filed: Jul. 24, 2006

(65) Prior Publication Data
US 2006/0257091 A1 Nov. 16, 2006

Related U.S. Application Data

(62) Division of application No. 10/655,036, filed on Sep. 5, 2003.

(30) Foreign Application Priority Data
Feb. 4, 2003 (JP) ............................. 2003-026614

(51) Int. Cl.
*G02B 6/28* (2006.01)
(52) U.S. Cl. ........................................ 385/24; 385/37
(58) Field of Classification Search ................ None
See application file for complete search history.

(56) References Cited

U.S. PATENT DOCUMENTS

| 4,786,131 A | 11/1988 | Mahapatra et al. | 350/96.16 |
|---|---|---|---|
| 4,923,270 A | 5/1990 | Carter | |
| 5,414,540 A | 5/1995 | Patel et al. | 359/39 |
| 5,930,439 A | 7/1999 | Ojha et al. | 385/129 |
| 5,960,133 A | 9/1999 | Tomlinson | 385/18 |
| 6,122,419 A | 9/2000 | Kurokawa et al. | 385/31 |
| 6,263,123 B1 | 7/2001 | Bishop et al. | 385/15 |
| 6,263,127 B1 | 7/2001 | Dragone et al. | 385/24 |
| 6,574,397 B2 | 6/2003 | Katayama et al. | 385/46 |
| 6,701,090 B1 | 3/2004 | Hatayama et al. | 398/79 |
| 2002/0118912 A1 | 8/2002 | Katayama et al. | |
| 2002/0159701 A1 | 10/2002 | Katayama et al. | |
| 2003/0007728 A1 | 1/2003 | Koichi et al. | 385/37 |
| 2004/0252938 A1* | 12/2004 | Ducellier et al. | 385/27 |

FOREIGN PATENT DOCUMENTS

| CN | 1373379 | 10/2002 |
|---|---|---|
| FR | 2794858 | 12/2000 |
| JP | 2000-214392 | 8/2000 |
| WO | 03/098962 | 11/2003 |

OTHER PUBLICATIONS

Takahashi et al., "Arrayed-Waveguide Grating for Wavelength Division Multi/Demultiplexer with Nanometre Resolution", Electronics Letters, vol. 26, No. 2, Jan. 18, 1990, pp. 87-88.

(Continued)

*Primary Examiner*—Sung Pak
(74) *Attorney, Agent, or Firm*—Staas & Halsey LLP

(57) ABSTRACT

An optical device used, for example, in an add/drop multiplexer, a dynamic gain equalizer or a optical power monitor. The optical device includes (a) a substrate; (b) a first slab waveguide formed on the substrate; (c) channel waveguides of differing lengths formed on the substrate, light output from the first slab waveguide being input to the channel waveguides; and (d) a second slab waveguide formed on the substrate, light output from the channel waveguides being input to the second slab waveguide. An end face of the second slab waveguide shares a face with an end face of the substrate. The optical device has low loss characteristics.

8 Claims, 49 Drawing Sheets

OTHER PUBLICATIONS

Soole et al., "High Performance Polarization-Independent WDM Filtering Using an InP Reflective Arrayed Waveguide Grating", Lasers and Electro-Optics Society Annual Meeting, 1996, LEOS 96, IEEE Boston, MA, Nov. 18-19, 1996, pp. 228-229.

Smit, et al., "PHASAR-Based WDM-Devices: Principles, Design and Applications," IEEE Journal of Selected Topics in Quantum Electronics, vol. 2, No. 2, pp. 236-250 Jun. 1996.

Ford, et al., "Wavelength Add-Drop Switching Using Tilting Micromirrors", Journal of Lightwave Technology, vol. 17, No. 5, pp. 904-911, May 1999.

Ford, et al., "Dynamic Spectral Power Equalization Using Micro-Opto-Mechanics", IEEE Photonics Technology Letters, vol. 10, No. 10, pp. 1440-1442, Oct. 1998.

Chinese Patent Office Action, mailed Feb. 18, 2005 and issued in corresponding Chinese Patent Application No. 200310101501.0.

European Patent Office Communication, mailed Sep. 11, 2007 and issued in corresponding European Patent Application No. 03018619.1-2216.

* cited by examiner

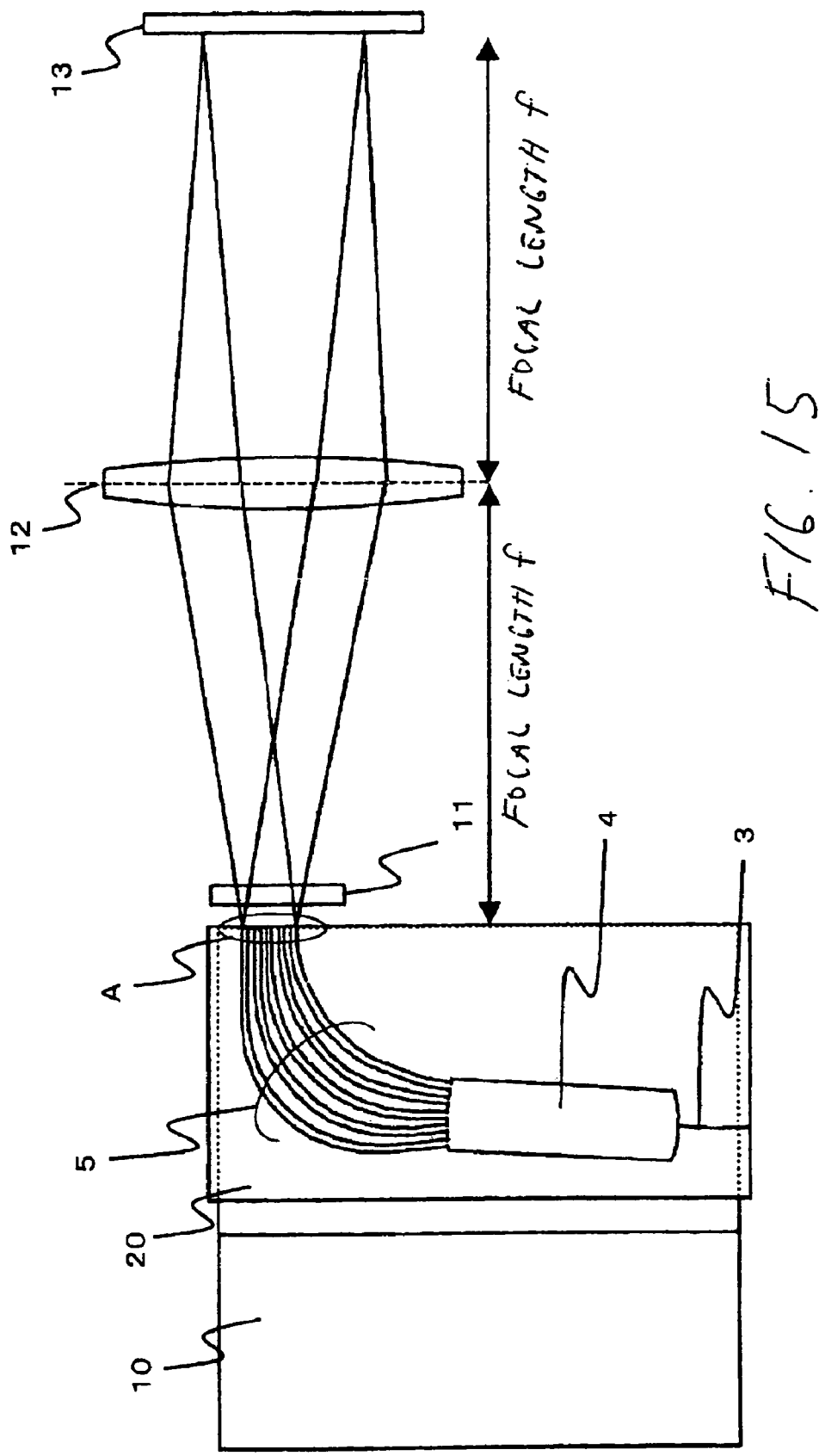

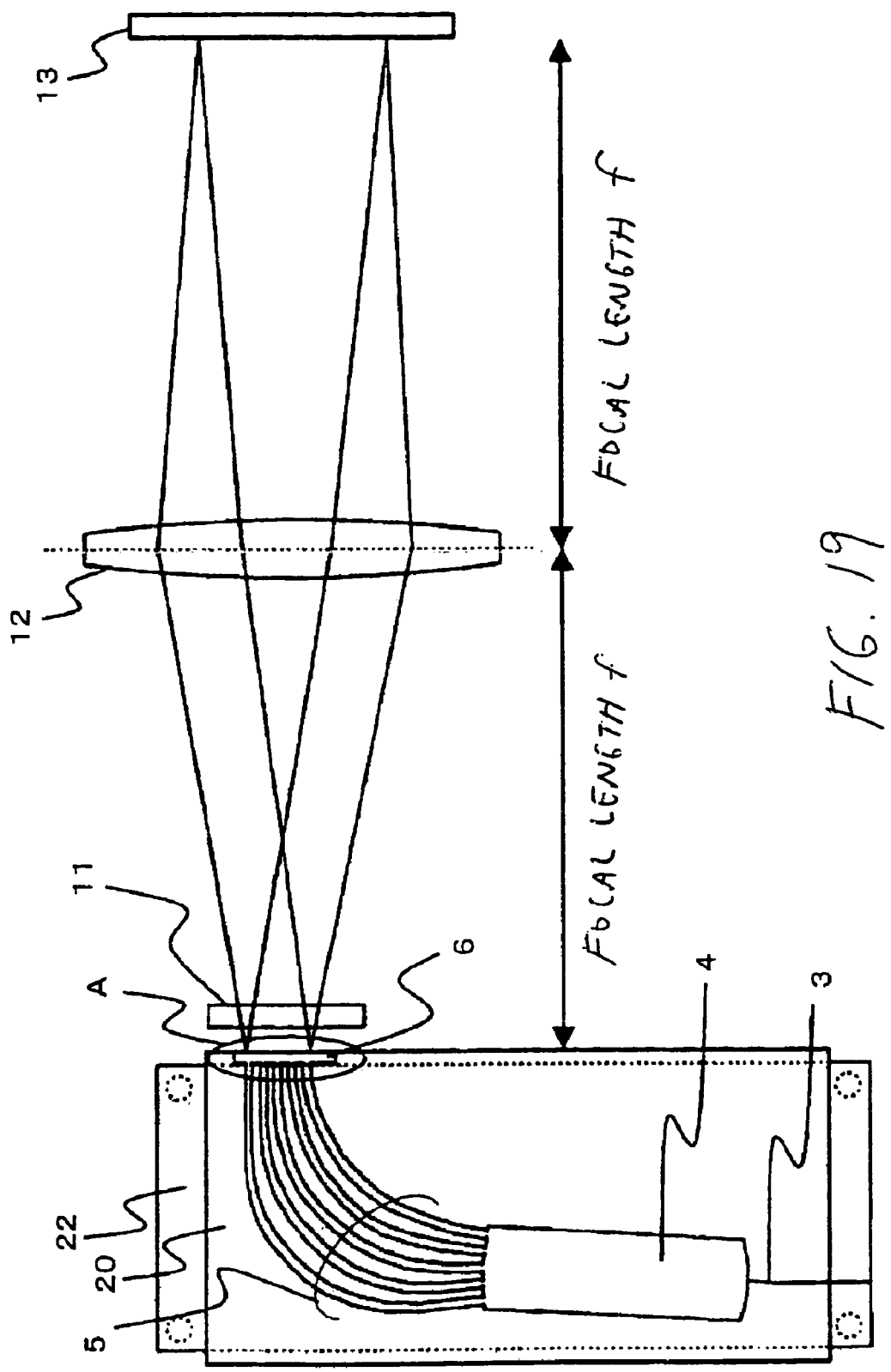

US 7,400,793 B2

OPTICAL DEVICE WITH SLAB WAVEGUIDE AND CHANNEL WAVEGUIDES ON SUBSTRATE

This application is a divisional application of Ser. No. 10/655,036 filed Sep. 5, 2003.

CROSS-REFERENCE TO RELATED APPLICATIONS

The present application claims priority to Japanese application 2003-026614, filed Feb. 4, 2003, and which is incorporated herein by reference, in its entirety.

BACKGROUND OF THE INVENTION

1. Field of the Invention

The present invention relates to optical signal processing for the purpose of performing signal pathway switching and light output power adjustment for each wavelength in a WDM (Wavelength Division Multiplexing) system. More particularly, it is related to an optical functional device that uses flat light guides to integrate and miniaturize components that are necessary for the adding and dropping of signals with specific wavelengths, the adjustment and monitoring of light output power for each wavelength, and wavelength dispersion compensation for each wavelength.

2. Description of the Related Art

In recent years, the introduction of WDM systems has been aggressively advanced in order to accommodate for the increase in data traffic. These systems are basically point to point systems. However, with large-scale photonic networks in which WDM systems are connected in a mesh, in order to reduce operation costs through efficient operation of the WDM systems, it will be indispensable in the future to have an optical functional device such as a wavelength selective switch operating as an OADM (Optical Add/Drop Multiplexing) device. An OADM is used for adding and dropping of light signals with specific wavelengths. It will also be necessary for such an optical functional device to provide for the adjustment and monitoring of light output power for each wavelength, and for wavelength dispersion compensation for each wavelength.

FIG. 1 is an example of a case in which a wavelength selective switch is used in a WDM system.

In FIG. 1, wavelength division multiplexed light is propagated in the direction of station M, station N, and station O, which are given reference numerals 1000, 1002 and 1004, respectively. An OADM node 1006 equipped with a wavelength selective switch 1008 is arranged on station N.

In the example of the system shown in FIG. 1, light signals $\lambda 1(a)$-$\lambda 5(a)$ corresponding to each wavelength $\lambda 1$-$\lambda 5$ are contained in the wavelength division multiplexed light from station m.

At station N, the adding and dropping of light signals having required wavelengths from among the above optical signals is performed.

The example in the figure shows a situation in which light signals $\lambda 2(a)$ and $\lambda 4(a)$ with wavelengths $\lambda 2$ and $\lambda 4$, respectively, are output to the Drop port, and light signals $\lambda 2(b)$ and $\lambda 4(b)$ having the same wavelengths $\lambda 2$ and $\lambda 4$, respectively, are added to the Out port in the direction of the next station, station O.

More specifically, the wavelength division multiplexed light from station M is inputted into the IN port of the wavelength selective switch of station N. The wavelength selective switch outputs the required light signals $\lambda 2(a)$ and $\lambda 4(a)$ to the Drop port. Meanwhile, added signals $\lambda 2(b)$ and $\lambda 4(b)$ are inputted from the Add port into the wavelength selective switch, and outputted to the OUT port in the direction of station O. Therefore, the wavelength division multiplexed light with light signals $\lambda 1(a)$, $\lambda 2(b)$, $\lambda 3(a)$, $\lambda 4(b)$ and $\lambda 5(a)$ are output to station O.

In this way, the wavelength selective switch in this example drops light signals of required wavelengths of the inputted wavelength division multiplexed light, and adds light signals that are different from the dropped light signals but are at the same wavelengths.

FIG. 2 is a first conventional example of a wavelength selective switch which includes a Micro Electro-Mechanical System (MEMS) 1010 having mirrors 1012 and 1014. The wavelength selective switch also includes a lens 1016 and a diffraction grating 1018. Generally, the MEMS is a mechanical optical switch that electrically controls the angles of the mirrors.

In FIG. 2, the wavelength selective switch is a configuration in which wavelength-multiplexed collimated light that enters from the IN port and the ADD port is branched into each wavelength with the diffraction grating. The MEMS mirrors are in the positions of convergence of all of the wavelengths.

Depending on the angles of the corresponding MEMS mirrors, the light of each wavelength entering from the IN port either heads for the OUT port or is outputted from the DROP port.

The light of the same wavelength as the light outputted from the DROP port, which entered from the ADD port, is wavelength-multiplexed with light that enters from the IN port and heads for the OUT port, and it is outputted from the OUT port.

FIG. 3 is a second conventional example of a wavelength selective switch configuration using arrayed waveguide gratings (AWG) 1020 and 1022, diffraction gratings 1024 and 1026, and MEMS mirrors 1028. FIG. 3 also shows optical circulators 1030 and 1031, and lenses 1032, 1033, 1034, 1036, 1037 and 1038.

The wavelength multiplexed light that entered from the INPUT port and the ADD port is branched by the first AWG 1020 and the second AWG 1022, respectively, into wavelength groups containing multiple wavelengths. They are further branched into each wavelength within each wavelength group by the first diffraction grating 1024 and second diffraction grating 1026, respectively, and they are directed to the MEMS mirrors corresponding to each wavelength.

The MEMS mirrors are configured such that the decision to return signals of light from the first AWG to the first AWG (state 1) or send it to the second AWG (state 2) can be switched by changing their tilting angles.

With the light path when the MEMS mirrors are in state 1, the signals of light with appropriate wavelengths that entered from the IN port are reflected by the MEMS mirrors, and they are returned to the first AWG by way of the first diffraction grating. Therefore, they are included in the wavelength division multiplexed light that passes through the optical circulator 1030 and is outputted from the PASS port (equivalent to the aforementioned OUT port).

On the other hand, with the light path when the MEMS mirrors are in state 2, the first AWG and the second AWG are in the optically connected state, and the signals of light with appropriate wavelengths that entered from the IN port are included in the wavelength division multiplexed light that passes through the second AWG and the optical circulator 1031 by way of the second diffraction grating and are outputted from the DROP port. Moreover, the signals of light with appropriate wavelengths that were sent from the ADD port are included in the wavelength division multiplexed light that is outputted from the PASS port by way of the first diffraction grating, the first AWG, and the optical circulator 1030.

In this way, the device enables the adding and dropping of light of specific wavelengths through a wavelength selective switch.

Here, the wavelength selective switch is comprised of a wavelength branching filter that resolves wavelength division multiplexed light into each wavelength, a light switch that switches the routes of the branched light, and a wavelength combining filter that combines into one the light of each wavelength after the routes are switched.

Furthermore, filters with the same compositions are generally used for the wavelength branching filter and the wavelength combining filter, so this wavelength branching filter and wavelength combining filter are hereafter called the wavelength combining/branching filters.

FIG. 4 is a third conventional example of a wavelength selective switch.

Here, the device illustrated in FIG. 4 is a wavelength selective switch comprised of light guides, and in the explanations below, devices of this type are called waveguide type wavelength selective switches. In contrast to this, wavelength selective switches comprised of diffraction gratings, lenses, MEMS mirrors, etc., as shown in FIG. 2, are called spatial-join type wavelength selective switches.

The waveguide type wavelength selective switch of FIG. 4 uses AWGs for wavelength branching filter 1a and wavelength multiplexing filter 1b, and it uses a Mach-Zehnder interferometer type waveguide switch utilizing thermo-optical effects as light switch 2 (this is called a thermo-optical effect type waveguide switch hereafter). FIG. 4 shows a slab substrate 100, a core 202 and a clad 201 of the device.

Here, spatial-join type wavelength selective switches such as that shown in FIG. 2, have characteristics such that, for example, they use free-space diffraction gratings as wavelength combining/branching filters, they use mechanical switches (such as MEMS) for light route switching, and they use free-space optics systems for optical coupling between optical functional components.

On the other hand, waveguide type wavelength selective switches such as that shown in FIG. 4, have characteristics such that, for example, they monolithically integrate component parts comprised of flat light guides, they use AWGs for wavelength combining/branching filters, they use thermo-photometric effect type waveguide switches for light route switching, and they use waveguides for optical coupling between optical functional components.

With the first conventional example shown in FIG. 2, it is difficult to achieve high resolution and miniaturization, which are required in WDM systems.

In order to increase the resolution with diffraction gratings, it is necessary to increase the diameter of the beams that enter the diffraction gratings, and the device consequently grows in size. The resolution of the diffraction gratings is represented by Nm (N: number of gratings in the beam irradiation region; m: diffraction order). Assuming the angle of incidence to a diffraction grating is vertical and the angle of reflection is $\theta$ from the normal line of the primary surface of the diffraction grating, the resolution $\lambda/d\lambda$ of the diffraction grating is expressed by the following Formula (1).

$$\lambda/d\lambda = Nm = N(a * \sin\theta/\lambda) \quad \text{Formula (1)}$$

Here, a is the interval between grid lines of the diffraction grating, and $\lambda$ is the wavelength of the light.

Here, when $\theta=15°$ and $\lambda=1.55$ μm, the following Formula (2) is applied.

$$\lambda/d\lambda = Na/5.99 \text{ μm} \quad \text{Formula (2)}$$

Here, if the spacing between reflection mirrors is set to pm=500 μm and the beam diameters at the mirror reflection surfaces are set to Dm=100 μm, in order to accommodate for a WDM system in which the light wavelengths are in the spectrum of 1.55 μm and the wavelength intervals are 0.8 nm with the configuration of the first conventional example, resolution of:

$$\lambda/d\lambda = 1.55 \text{ μm}/0.8 \text{ nm} \times pm/Dm \quad \text{Formula (3)}$$

$$\approx 10,000$$

becomes necessary. Using Formula (2), the beam diameters Dg at the diffraction gratings become large, as expressed by:

$$Dg = Na = \lambda/d\lambda \times 5.99 \text{ μm} \approx 6 \text{ cm}.$$

Therefore, the widths of the combining/branching filters within the device must be at least 6 cm, causing the entire wavelength selective switch to require an even broader width.

As illustrated in FIG. 4, the waveguide type wavelength selective switch is formed on a slab substrate, so it is thin. Because a slab substrate with a thickness of approximately 1 mm is normally used, the chip itself is extremely thin. Therefore, it is possible to narrow the thickness of the entire device after it is housed in a protective case. In contrast to this, as stated previously, it is difficult to make thin the diffraction gratings and lenses used in spatial join type wavelength selective switches, so there is the problem in which the thickness of the entire device becomes large.

Moreover, with the spatial join type wavelength selective switch, it is necessary to precisely center and fixate the lens in five axis directions—the direction of the two axes perpendicular to the optical axis, the direction of the optical axis, and the mutually orthogonal two axes, yaw and pitch or angles. As for optical parts other than the lens, in addition to the above five axes, it is necessary to precisely center and fixate the parts in the six axes of the rotation direction. Therefore, there is the problem that assembly is troublesome in comparison to the waveguide type wavelength selective switch.

This is the same for the lenses and diffraction gratings of the second conventional example shown in FIG. 3.

On the other hand, with the second and third conventional examples using AWGs, the AWG parts used as wavelength combining/branching filters can be designed to be more compact than the case of diffraction gratings in the first conventional example.

Therefore, it is possible to make the wavelength selective switch smaller than the first conventional example, but the insertion loss of AWGs with configurations such as that shown in FIG. 4 is approximately 3 dB each time a light signal passes through. In the second and third conventional examples, light signals of each wavelength pass through AWGs twice—once at the time of branching and once at the time of multiplexing—so the fact that the insertion loss of AWGs becomes as large as approximately 6 dB. This high insertion loss is a problem.

The reason that the insertion loss of AWGs of the configuration used in the second and third conventional examples becomes large will be explained below.

FIG. 5 is a block diagram of the conventional AWG.

In FIG. 5, the conventional AWG is comprised of input waveguide 3, input slab waveguide 4, channel waveguide array 5 comprising multiple channel waveguides, output slab waveguide 6, and multiple output channel waveguides 610.

Input waveguide 3 is for the purpose of guiding the input light from waveguide end face 203 to input slab waveguide 4, and input slab waveguide 4 is for the purpose of distributing the input light to channel waveguide array 5.

Input slab waveguide 4 extends in the direction parallel to the page of FIG. 5, and when light enters input slab waveguide 4 from input waveguide 3, it freely expands and propagates without being confined in the direction parallel to the page of FIG. 5.

In order for light that has freely propagated through input slab waveguide 4 in the direction parallel to the page to reach channel waveguide array 5 and optically couple, the power of the input light is distributed to all of the channel waveguides that constitute channel waveguide array 5.

Channel waveguide array 5 is for the purpose of providing phase shifts to the light that passes through here, and it is formed such that the differences between effective light path lengths of adjacent waveguides are constant.

Therefore, when light propagates through channel waveguide array 5 to the boundary with output slab waveguide 6 from the boundary with input slab waveguide 4, phase shifts corresponding to the wavelengths of the light within each channel waveguide are generated. This phase shift contributes to spectroscopy effects described later.

Output slab waveguide 6 is for the purpose of freely propagating and interfering with light outputted from channel waveguide array 5.

When light of the same phase is outputted from each channel waveguide constituting channel waveguide array 5, light of a given wavelength is focused on the boundary of the output slab and the waveguide positioned vertically in the center in FIG. 5 from among output channel waveguides 610.

This is because the boundary between channel waveguide array 5 and output slab waveguide 6 forms an arc centered on this position in which light is focused, and the light leaving each channel waveguide proceeds directly towards the center of this arc—that is, the center of output channel waveguides 610 positioned in the central region of the vertical direction. The wavelength at this time is called the center wavelength.

In the case in which the wavelength of light is shorter than the center wavelength, the phase of the light outputted from channel waveguide array 5 proceeds to the bottom of the figure. Focusing attention on the position in which the phases of light outputted from each channel waveguide are equal (this is called the equal phase front hereafter), the further they proceed towards the bottom of the figure, the further to the right they are positioned. This is the state in which phases are advancing. Therefore, light that is shorter than the center wavelength is relatively focused at the top.

Conversely, when the wavelength of light is longer than the center wavelength, the phases of the light outputted from the channel waveguides proceed to the top of the figure. Therefore, they are relatively focused at the bottom.

In this way, on lines 611 that connect the boundaries between output slab waveguide 6 and output channel waveguides 610, spectroscopy and conversion are performed as a continuous spectrum in which the top forms short wavelengths and the bottom forms long wavelengths. Moreover, lines 611 that connect the boundaries between output slab waveguide 6 and output channel waveguides 610 form an arc.

Output channel waveguides 610 are for the purpose of cutting out only light of a specific wavelength band from the continuous spectrum focused on arc 611 and guiding it to waveguide end face 204, and they comprise multiple channel waveguides. As previously stated, if the positions on arc 611 are different, then the wavelength band of trimmed light out becomes different.

The spacing between output channel waveguides 610 on arc 611 is proportionate to the wavelengths of outputted light. Therefore, if the output channel waveguides are arranged on arc 611 at equal intervals, then the wavelength intervals of light that is trimmed and outputted also become equally spaced. Moreover, by adjusting the spacing between the output channel waveguides, it is possible to adjust the wavelength spacing of the outputted light.

Furthermore, the configuration of the aforementioned AWGs and the spectroscopy principles thereof are described in, for example, the document, "Meint K. Smit and Cor van Dam, IEEE JOURNAL OF SELECTED TOPICS IN QUANTUM ELECTRONICS, VOL. 2, pp. 236-250 (1996)."

FIG. 6 is a drawing explaining the distribution of light intensity at the output channel waveguide parts.

FIG. 6($a$) is an enlarged drawing of part A of FIG. 5, and FIG. 6($b$) is an enlarged drawing of part B of FIG. 6($a$).

As illustrated in FIG. 6($a$), the light that is focused on arc 611 has an intensity distribution that is strong in the central region, as shown by 612, for example, and rapidly weakens towards the edges (vertical in the diagram).

For example, supposing that white light is inputted and the light intensity distribution shown by 612 is the wavelength $\lambda c$ intensity distribution, then light with slightly short wavelength ($\lambda c - \Delta \lambda$) and light with slightly long wavelength ($\lambda c + \Delta \lambda$) result with the same intensity distributions. In the case in which the incident light is white light, the light of this intensity distribution continuously forms lines.

At this time, focusing attention on efficiency of coupling with the output channel waveguides, light with wavelength $\lambda c$ forms a bond with highest efficiency due to the fact that the output channel waveguides and the optical axis are in agreement. In contrast to this, the coupling efficiency of light with a wavelength of $\lambda c - \Delta \lambda$ or $\lambda c + \Delta \lambda$ is decreased due to the output channel waveguides and the optical axis being misaligned, and the coupling efficiency further diminishes as the wavelength deviates from $\lambda c$.

Coupling in this case becomes almost the same as Gauss beam coupling.

FIG. 7 shows the loss with respect to wavelength of light that is outputted from the output channel waveguides at this time. This is a graph of the intensity of light outputted from the output channel waveguides with wavelength on the horizontal axis and intensity on the vertical axis (this becomes the same as the spectrum outputted from channel waveguides), and its shape is Gaussian.

However, in a communications system, the transmission property in which the end is roughly flat (called flat top hereafter) is desired. This is because it is desirable for the loss to be roughly equal, even if each wavelength that constitutes wavelength division multiplexed light changes within a given spectrum due to changes in environmental conditions, for example.

Here, conventional technology for the purpose of flat-topping the transmission properties will be explained.

FIG. 8 is a conventional configuration example for the purpose of flat-topping the transmission properties.

In FIG. 8, broad part 301 (multimode waveguide part) is formed on the boundary of input waveguide 3 and input slab waveguide 4, and this performs the flat-topping of the spectrum. The light intensity distribution becomes double peaked (referred to as the "double peak mode" hereafter) at the broad part 301 of the input waveguide.

FIG. 9 is a diagram that describes the light intensity distribution at the output channel waveguide parts corresponding to FIG. 8. FIG. 9(a) is an enlarged drawing of part A of FIG. 8, and FIG. 9(b) is an enlarged drawing of part B of FIG. 9(a).

When light that moves into the input slab waveguide enters the double peak mode, the intensity distribution 612 of light that is focused on output channel waveguides 610 also enters the double peak mode, as illustrated in FIG. 9(a). In other words, the shape of the intensity distribution of light that moves into the input slab waveguide and the shape of the intensity distribution of light that is focused on output channel waveguides 610 are the same.

FIG. 9(b) shows the intensity distributions of light with wavelength λc, light with slightly short wavelength (λc−Δλ), and light with slightly long wavelength (λc+Δλ). They all form the same shape when the incident light is white light.

The coupling efficiency of this double-peak mode light having wavelengths λc, λc−Δλ, and λc+Δλ with the output channel waveguides becomes constant if the size of the central cavity and the spacing between the two peaks are adjusted.

FIG. 10 is a figure showing the loss with respect to wavelength of light that is outputted from the output channel waveguides when the spacing between the two peaks is adjusted in this way. As illustrated by the curve (b) of FIG. 10, for example, flattop transmission properties are obtained. Moreover, the curve (a) of FIG. 10 has the Gaussian transmission properties shown in FIG. 7.

In this way, by using the structure illustrated in FIG. 8—that is, by forming part 301 that makes the input waveguide into multiple mode—it is possible to achieve flat-top type transmission properties.

However, as is clear from the comparison of (a) and (b) in FIG. 10, the loss in the case of (b)—in which part 301 that makes the input waveguide into multiple mode—is greater than that of (a).

This loss is approximately 3 dB in cases in which light passes through AWGs once. In the example of FIG. 3, for example, it passes through the AWGs twice, so this results in a loss increase of approximately 6 dB.

SUMMARY OF THE INVENTION

The present invention was conceived with consideration of such problems, and its purpose is to provide a compact optical functional device that has flattop type transmission properties and has little loss.

Additional objects and advantages of the invention will be set forth in part in the description which follows, and, in part, will be obvious from the description, or may be learned by practice of the invention.

Objects of the present invention are achieved by providing an apparatus including (a) a substrate; (b) a first slab waveguide formed on the substrate; (c) channel waveguides of differing lengths formed on the substrate, light output from the first slab waveguide being input to the channel waveguides; and (d) a second slab waveguide formed on the substrate, light output from the channel waveguides being input to the second slab waveguide. An end face of the second slab waveguide shares a face with an end face of the substrate.

Objects of the present invention are also achieved by providing an apparatus including (a) a substrate; (b) a slab waveguide formed on the substrate; and (c) channel waveguides of differing lengths formed on the substrate, light input to the slab waveguide traveling through the slab waveguide and then being input to the channel waveguides. A wavelength division multiplexed (WDM) light is input to the slab waveguide to thereby travel through the slab waveguide and be input to the channel waveguides of differing lengths. The channel waveguides of differing lengths have differences in optical path lengths, respectively, so that light at different wavelengths in the WDM light is angularly dispersed from an end face of the substrate in different directions, respectively, in accordance with wavelength. The apparatus also includes a focusing device focusing the angularly dispersed lights at different wavelengths at different positions, respectively.

Moreover, objects of the present invention are achieved by providing an apparatus including a first optical device and a second optical device. The first optical device receives a first wavelength division multiplexed (WDM) light, and includes (a) a substrate, (b) a slab waveguide formed on the substrate, and (c) channel waveguides of differing lengths formed on the substrate, wherein the first WDM light is input to the slab waveguide to thereby travel through the slab waveguide and be input to the channel waveguides of differing lengths. The channel waveguides of differing lengths have differences in optical path lengths, respectively, so that lights at different wavelengths in the first WDM light are angularly dispersed from an end face of the substrate in different directions, respectively, in accordance with wavelength. The second optical device receives a second WDM light, and includes (a) a substrate, (b) a slab waveguide formed on the substrate, and (c) channel waveguides of differing lengths formed on the substrate, wherein the second WDM light is input to the slab waveguide to thereby travel through the slab waveguide and be input to the channel waveguides of differing lengths. The channel waveguides of differing lengths have differences in optical path lengths, respectively, so that lights at different wavelengths in the second WDM light are angularly dispersed from an end face of the substrate in different directions, respectively, in accordance with wavelength. The apparatus also includes at least one focusing device focusing the lights at different wavelengths angularly dispersed from the first optical device at different positions, respectively, and focusing the lights at different wavelengths angularly dispersed from the second optical device at different positions, respectively, so that angularly dispersed light from the first optical device and angularly dispersed light from the second optical device at the same wavelength are focused at the same position. A reflector is positioned at this same position and is controllable to reflect light focused at this same position to the first or second optical devices.

Objects of the present invention are achieved by providing an apparatus including first and second optical devices. The first optical device receives a first wavelength division multiplexed (WDM) light, and includes (a) a substrate, (b) a first slab waveguide formed on the substrate, (c) channel waveguides formed on the substrate, light output from the first slab waveguide being input to the channel waveguides, and (d) a second slab waveguide formed on the substrate, light output from the channel waveguides being input to the second slab waveguide. An end face of the second slab waveguide shares a face with an end face of the substrate. The first WDM light is input to the first slab waveguide to thereby travel through the first slab waveguide and thereafter be input to the channel waveguides and then to the second slab waveguide. The channel waveguides have differences in optical path lengths, respectively, so that angular dispersion is generated in lights output from the channel waveguides in accordance with wavelengths in the first WDM light. The second optical device receives a second WDM light, and includes (a) a substrate, (b) a first slab waveguide formed on the substrate, (c) channel waveguides formed on the substrate, light output from the first slab waveguide being input to the channel waveguides, and (d) a second slab waveguide formed on the substrate, light output from the channel waveguides being input to the second slab waveguide. An end face of the second slab waveguide shares a face with an end face of the substrate. The second WDM light is input to the first slab waveguide to thereby travel through the first slab waveguide and thereafter be input to the channel waveguides and then to the second slab waveguide. The channel waveguides have differences in optical path lengths, respectively, so that angular dispersion is generated in lights output from the channel waveguides in accordance with wavelengths in the second WDM light. The apparatus includes at least one focusing device focusing lights at different wavelengths angularly dispersed from the first optical device at different positions, respectively, and focusing lights at different wavelengths angularly dispersed from the second optical device at different positions, respectively, so that angularly dispersed light from the first optical device and angularly dispersed light from the second optical device at the same wavelength are focused at the same position. The apparatus also includes a reflector positioned at this same position and controllable to reflect light focused at this same position to the first or second optical devices.

Objects of the present invention are achieved by an apparatus including (a) a substrate; (b) a slab waveguide formed on the substrate; and (c) channel waveguides of differing lengths formed on the substrate. Light input to the slab waveguide travels through the slab waveguide and then is input to the channel waveguides. Subsequent channel waveguides channeling light of different wavelength bands, respectively, are not formed on the substrate.

Objects of the present invention are achieved by providing an apparatus including (a) a substrate; (b) a slab waveguide formed on the substrate; and (c) channel waveguides of differing lengths formed on the substrate. Light output from the slab waveguide is input to the channel waveguides. Light output from the channel waveguides eventually passes an end face of the substrate, there being no channel waveguides for cutting light of specific wavelength bands, respectively, on the substrate through which the light travels between the channel waveguides of differing lengths and the end face.

Further, objects of the present invention are achieved by providing an apparatus including (a) a substrate; (b) a first slab waveguide formed on the substrate; (c) channel waveguides of differing lengths formed on the substrate, light output from the first slab waveguide being input to the channel waveguides; and (d) a second slab waveguide formed on the substrate, light output from the channel waveguides being input to the second slab waveguide. An end face of the second slab waveguide shares a face with an end face of the substrate.

Objects of the present invention are also achieved by providing an apparatus including (a) a substrate; (b) a first slab waveguide formed on the substrate; (c) channel waveguides of differing lengths formed on the substrate, light output from the first slab waveguide being input to the channel waveguides; and (d) a second slab waveguide formed on the substrate, light output from the channel waveguides being input to the second slab waveguide. Light output from the second slab waveguide eventually passes an end face of the substrate, there being no channel waveguides for cutting light of specific wavelength bands, respectively, on the substrate through which the light travels between the second slab waveguide and the end face.

Objects of the present invention are further achieved by providing an apparatus comprising first and second optical devices. The first optical device receives a first wavelength division multiplexed (WDM) light, and includes (a) a substrate, (b) a slab waveguide formed on the substrate, and (c) channel waveguides of differing lengths formed on the substrate. Subsequent channel waveguides channeling light of different wavelength bands, respectively, are not formed on the substrate. The first WDM light is input to the slab waveguide to thereby travel through the slab waveguide and be input to the channel waveguides of differing lengths. The channel waveguides of differing lengths having differences in optical path lengths, respectively, so that lights at different wavelengths in the first WDM light are angularly dispersed from an end face of the substrate in different directions, respectively, in accordance with wavelength. The second optical device receives a second WDM light, and includes (a) a substrate, (b) a slab waveguide formed on the substrate, and (c) channel waveguides of differing lengths formed on the substrate. Subsequent channel waveguides channeling light of different wavelength bands, respectively, are not formed on the substrate. The second WDM light is input to the slab waveguide to thereby travel through the slab waveguide and be input to the channel waveguides of differing lengths. The channel waveguides of differing lengths have differences in optical path lengths, respectively, so that lights at different wavelengths in the second WDM light are angularly dispersed from an end face of the substrate in different directions, respectively, in accordance with wavelength. At least one focusing device focuses the lights at different wavelengths angularly dispersed from the first optical device at different positions, respectively, and focuses the lights at different wavelengths angularly dispersed from the second optical device at different positions, respectively, so that angularly dispersed light from the first optical device and angularly dispersed light from the second optical device at the same wavelength are focused at the same position. A reflector is positioned at said same position and is controllable to reflect light focused at said same position to the first or second optical devices.

In addition, objects of the present invention are achieved by providing an apparatus including first and second optical devices. The first optical device receives a first wavelength division multiplexed (WDM) light, and includes (a) a substrate, (b) a slab waveguide formed on the substrate, and (c) channel waveguides of differing lengths formed on the substrate, wherein light output from the channel waveguides eventually passes an end face of the substrate, there being no channel waveguides for cutting light of specific wavelength bands, respectively, on the substrate through which the light travels between the channel waveguides of differing lengths and the end face. The first WDM light is input to the slab waveguide to thereby travel through the slab waveguide and be input to the channel waveguides of differing lengths, the channel waveguides of differing lengths having differences in optical path lengths, respectively, so that lights at different wavelengths in the first WDM light are angularly dispersed from the end face of the substrate in different directions, respectively, in accordance with wavelength. The second optical device receives a second WDM light, and includes (a) a substrate, (b) a slab waveguide formed on the substrate, and (c) channel waveguides of differing lengths formed on the substrate, wherein light output from the channel waveguides eventually passes an end face of the substrate, there being no channel waveguides for cutting light of specific wavelength bands, respectively, on the substrate through which the light travels between the channel waveguides of differing lengths and the end face. The second WDM light is input to the slab waveguide to thereby travel through the slab waveguide and be input to the channel waveguides of differing lengths, the channel waveguides of differing lengths having differences in optical path lengths, respectively, so that lights at different wavelengths in the second WDM light are angularly dispersed from the end face of the substrate in different directions, respectively, in accordance with wavelength. At least one focusing device focuses the lights at different wavelengths angularly dispersed from the first optical device at different positions, respectively, and focuses the lights at different wavelengths angularly dispersed from the second optical device at different positions, respectively, so that angularly dispersed light from the first optical device and angularly dispersed light from the second optical device at the same wavelength are focused at the same position. A reflector is positioned at said same position and is controllable to reflect light focused at said same position to the first or second optical devices.

Objects of the present invention are also achieved by providing an apparatus including first and second optical devices. The first optical device receives a first wavelength division multiplexed (WDM) light, and includes (a) a substrate, (b) a first slab waveguide formed on the substrate, (c) channel waveguides formed on the substrate, light output from the first slab waveguide being input to the channel waveguides, and (d) a second slab waveguide formed on the substrate, light output from the channel waveguides being input to the second slab waveguide, an end face of the second slab waveguide sharing a face with an end face of the substrate. The first WDM light is input to the first slab waveguide to thereby travel through the first slab waveguide and thereafter be input to the channel waveguides and then to the second slab waveguide. The channel waveguides have differences in optical path lengths, respectively, so that angular dispersion is generated in lights output from the second slab waveguide in accordance with wavelengths in the first WDM light. The second optical device receives a second WDM light, and includes (a) a substrate, (b) a first slab waveguide formed on the substrate, (c) channel waveguides formed on the substrate, light output from the first slab waveguide being input to the channel waveguides, and (d) a second slab waveguide formed on the substrate, light output from the channel waveguides being input to the second slab waveguide, an end face of the second slab waveguide sharing a face with an end face of the substrate. The second WDM light is input to the first slab waveguide to thereby travel through the first slab waveguide and thereafter be input to the channel waveguides and then to the second slab waveguide. The channel waveguides have differences in optical path lengths, respectively, so that angular dispersion is generated in lights output from the second slab waveguide in accordance with wavelengths in the second WDM light. At least one focusing device focuses lights at different wavelengths angularly dispersed from the first optical device at different positions, respectively, and focuses lights at different wavelengths angularly dispersed from the second optical device at different positions, respectively, so that angularly dispersed light from the first optical device and angularly dispersed light from the second optical device at the same wavelength are focused at the same position. A reflector is positioned at said same position and controllable to reflect light focused at said same position to the first or second optical devices.

As would be understood from the above, an optical functional device of the present invention assumes a structure having a slab waveguide having an input terminal and multiple channel waveguides with different lengths into which light from the slab waveguide is inputted.

Moreover, the optical functional device of the present invention may also assume a structure having a first slab waveguide having an input terminal, a second slab waveguide having an output terminal, and multiple channel waveguides having differing lengths, in which light is inputted from the first slab waveguide and light is outputted to the second slab waveguide.

Furthermore, the optical functional device of the present invention may also assume a structure in which, when the channel waveguides input wavelength division multiplexed light from the input terminal, the differences of each optical path length are established such that angular dispersion is generated according to each wavelength constituting the wavelength division multiplexed light.

Furthermore, the optical functional device of the present invention may also assume a structure in which the output terminals of the channel waveguides are arranged such that they form a straight line.

Furthermore, the optical functional device of the present invention may also assume a structure in which the boundary between the second slab waveguide and the channel waveguides is formed in a straight line.

Furthermore, the optical functional device of the present invention may also assume a structure having (A) an optical focusing device that focuses light, having each wavelength generating angular dispersion, into different positions based on the angular dispersion directions, and (B) a light reflection device in at least one position in which light of each wavelength generating angular dispersion is nearly focused.

Furthermore, the optical functional device of the present invention may also assume a structure having (A) an optical focusing device that focuses light, having each wavelength generating angular dispersion, into different positions based on the angular dispersion directions, and (B) a light reflection device, in which the positions of the reflection surface normal line directions differ, in at least one position in which light of each wavelength generating angular dispersion is nearly focused.

Furthermore, the optical functional device of the present invention may also assume a structure having (A) an optical focusing device that focuses light, having each wavelength generating angular dispersion, into different positions based on the angular dispersion directions, and (B) a photoelectric conversion device in at least one position in which light of each wavelength generating angular dispersion is nearly focused.

Furthermore, the optical functional device of the present invention may also assume a structure having (A) first optical functional device and second optical functional device each having a slab waveguide having an input terminal and multiple channel waveguides with differing lengths into which light from the slab waveguide is inputted. The optical functional device also includes an optical focusing device that focuses light, having each wavelength generating angular dispersion with the first optical functional device, into different positions based on the angular dispersion directions, and an optical focusing device that focuses light, having each wavelength generating angular dispersion with the second optical functional device, into different positions based on the angular dispersion directions. Each of the optical functional devices and an optical focusing devices is arranged such that (i) the position in which light of a given frequency generating angular dispersion with the first optical functional device is focused and (ii) the position in which light of the same frequency generating angular dispersion with the second optical functional device is focused are in agreement. Moreover, there is a light reflection device in at least one position in which light of the wavelengths is nearly focused.

Moreover, the optical functional device of the present invention may also assume a structure having first optical functional device and second optical functional devices each having a first slab waveguide having an input terminal, a second slab waveguide having an output terminal, and multiple channel waveguides having differing lengths, in which light is inputted from the first slab waveguide and light is outputted to the second slab waveguide. An optical focusing device focuses light, having each wavelength generating angular dispersion with the first optical functional device, into different positions based on the angular dispersion directions. Moreover, an optical focusing device focuses light, having each wavelength generating angular dispersion with the second optical functional device, into different positions based on the angular dispersion directions. Each of the optical functional devices and optical focusing devices is arranged such that (i) the position in which light of a given frequency generating angular dispersion with the first optical functional device is focused and (ii) the position in which light of the same frequency generating angular dispersion with the second optical functional device is focused are in agreement. A light reflection device is in at least one position in which light of the wavelengths is nearly focused.

Furthermore, the optical functional device of the present invention may also assume a structure in which the waveguide parts that constitute the first optical functional device and the second optical functional device, respectively, are formed on the same substrate.

Moreover, in various embodiments of the present invention, the optical functional device may have a structure in which (a) when the channel waveguides input wavelength division multiplexed light from the input terminal, the differences of each optical path length are established such that angular dispersion is generated according to each wavelength constituting the wavelength division multiplexed light, and (b) a reflection surface that focuses light, having each wavelength generating angular dispersion, into different positions based on the angular dispersion directions is established inside the second slab waveguide. Furthermore, in various embodiments of the present invention, the optical functional device may have a light reflection device in at least one position in which light of each wavelength generating angular dispersion is nearly focused by the reflection surface inside the second slab waveguide.

In addition, in embodiments of the present invention, the optical functional device may assume a structure having a light reflection device, in which the positions of the reflection surface normal line directions differ, in at least one position in which light of each wavelength generating angular dispersion is nearly focused by the reflection surface inside the second slab waveguide.

Furthermore, in various embodiments of the present invention, the optical functional device may have a structure in which (A) a reflection surface that focuses light, having each wavelength generating angular dispersion, into different positions based on the angular dispersion directions is established inside the second slab waveguide, and (B) a photoelectric conversion device is established in at least one position in which light of each wavelength generating angular dispersion is nearly focused.

Furthermore, in various embodiments of the present invention, the optical functional device may have a structure including a first optical functional device and a second optical functional device each having a first slab waveguide having an input terminal, a second slab waveguide having an output terminal, and multiple channel waveguides having differing lengths, in which light is inputted from the first slab waveguide and light is outputted to the second slab waveguide. When the channel waveguides input wavelength division multiplexed light from the input terminal, the differences of each optical path length are established such that angular dispersion is generated according to each wavelength constituting the wavelength division multiplexed light. A reflection surface that focuses light, having each wavelength generating angular dispersion, into different positions based on the angular dispersion directions is established inside the second slab waveguide. Each of the optical functional devices and reflection surfaces are arranged such that (i) the position in which light of a given frequency generating angular dispersion with the first optical functional device is focused and (ii) the position in which light of the same frequency generating angular dispersion with the second optical functional device is focused are in agreement. A light reflection device is in at least one position in which light of the wavelengths is nearly focused.

Furthermore, in various embodiments of the present invention, the waveguides that constitute the first optical functional device and the waveguides that constitute the second optical functional device may be formed on the same substrate.

Furthermore, groups of optical functional devices of the present invention may be a group of optical functional devices comprising any two or more of the aforementioned optical functional devices, wherein the waveguides that constitute each optical functional device may be formed on the same substrate.

Furthermore, the optical functional device of the present invention may also assume a structure having a optical device that outputs into a second port the light that was inputted into a first port, and outputs into a third port the light that was inputted into the second port, wherein the second port is connected to the input terminal. For example, the optical device might be a circulator.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 12 shows the loss with respect to the wavelengths of light corresponding to FIG. 11.

FIG. 15 is a plan view of the wavelength selective switch of Embodiment 2.

FIG. 19 is a plan view of the wavelength selective switch of Embodiment 3.

DESCRIPTION OF THE PREFERRED EMBODIMENTS

Figure 1:
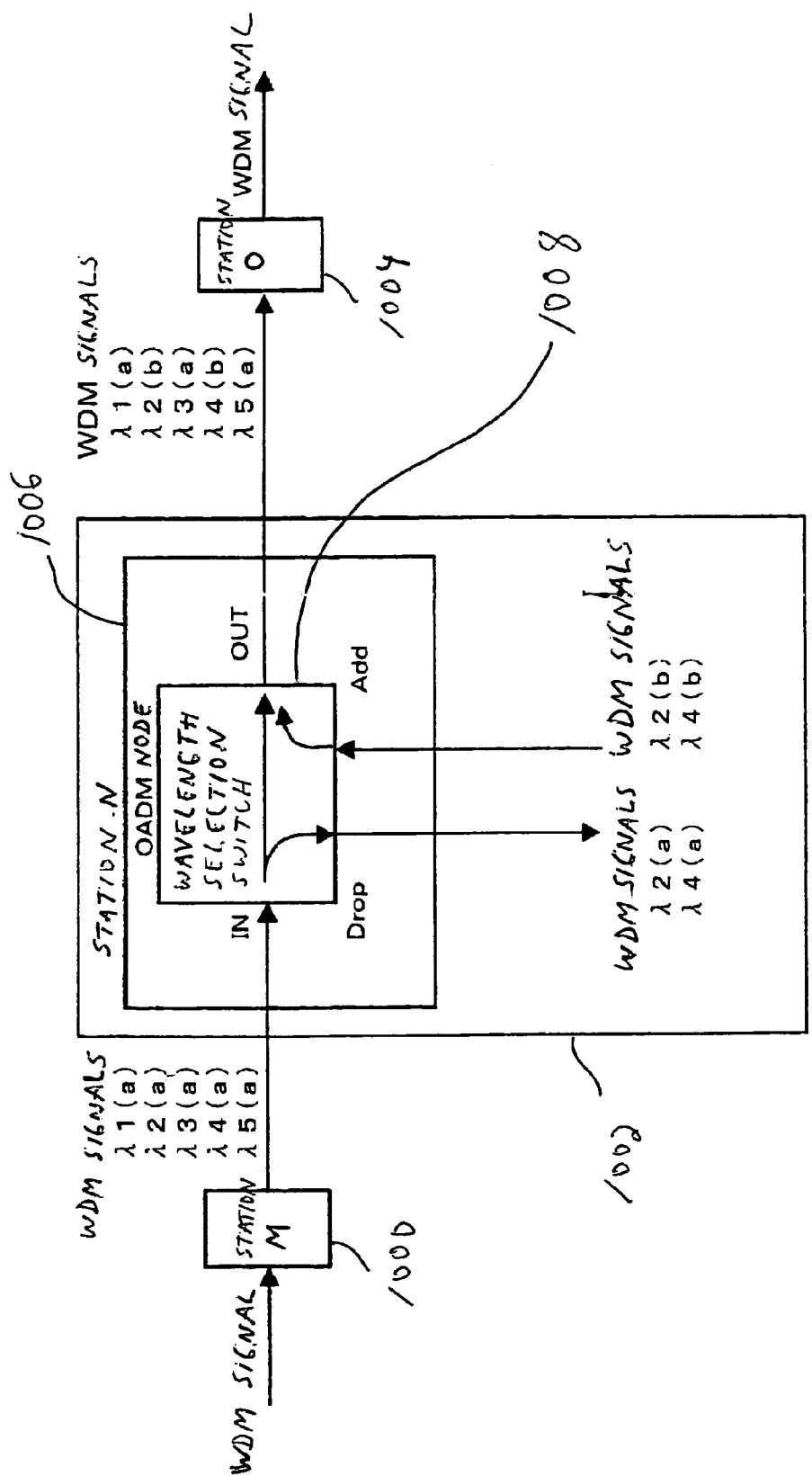
FIG. 1 (prior art) shows an example in which a wavelength selective switch is used in a WDM system.
Figure 2:
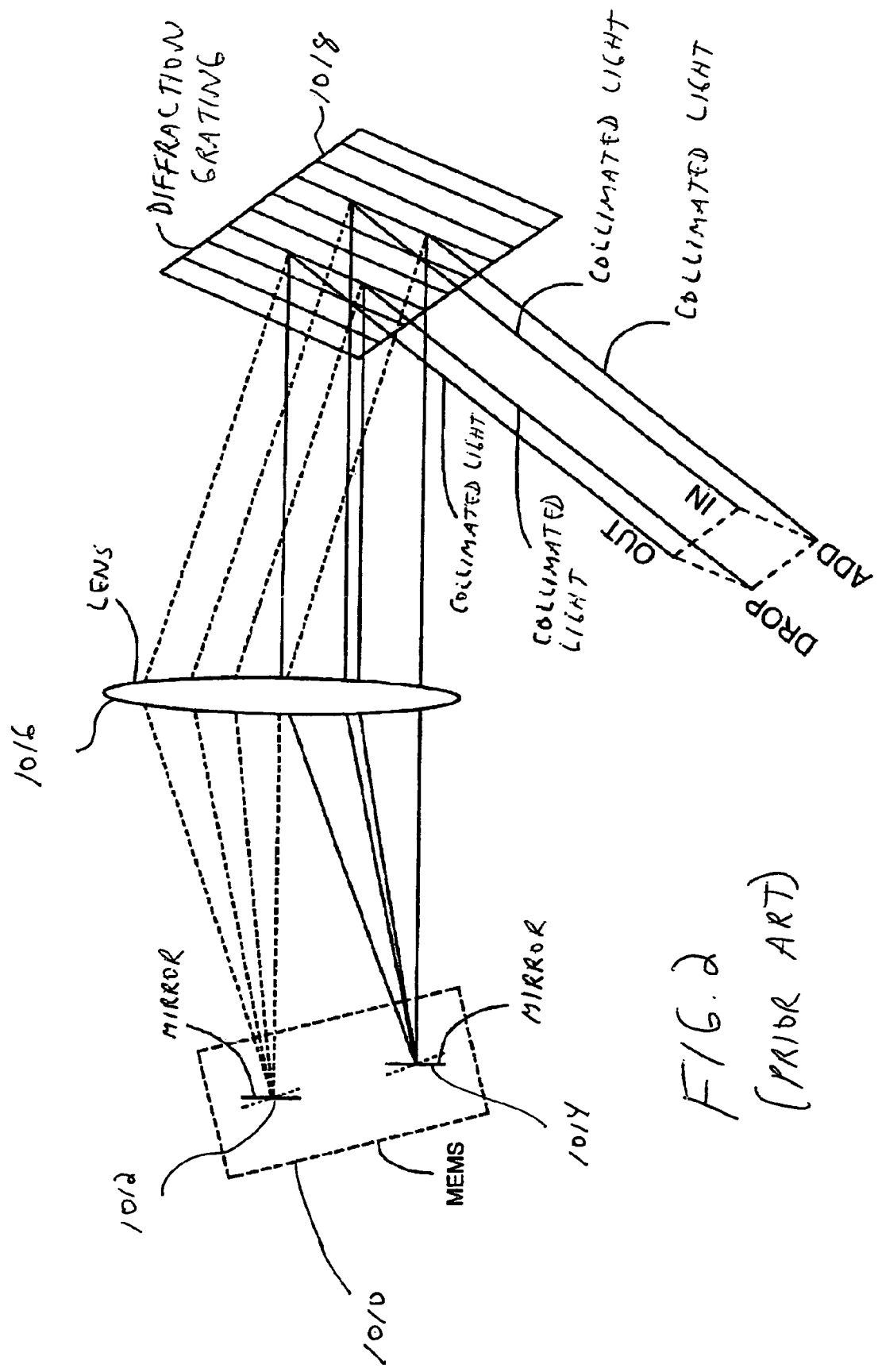
FIG. 2 (prior art) shows a first conventional example of a wavelength selective switch configuration.
Figure 3:
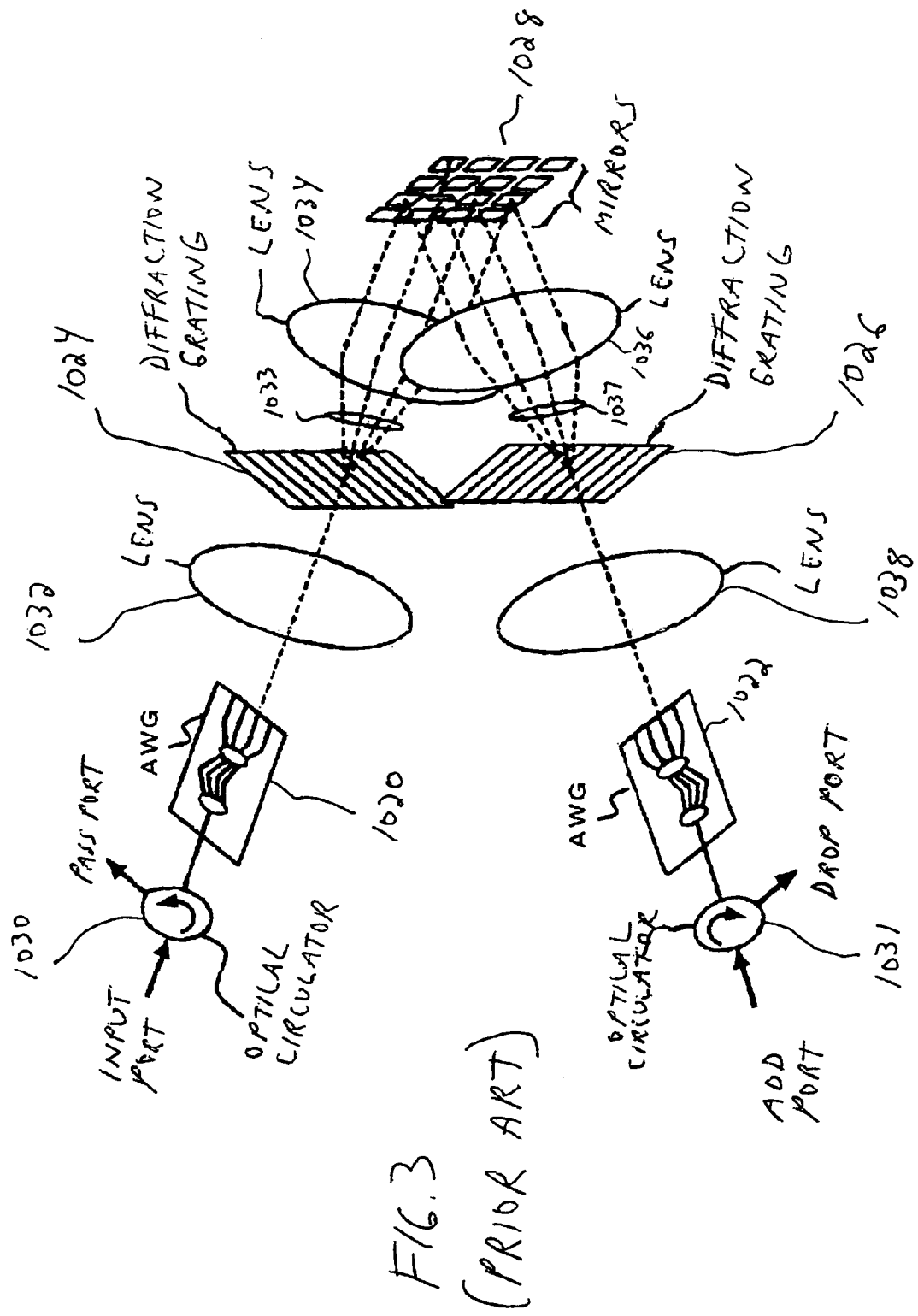
FIG. 3 (prior art) shows a second conventional example of a wavelength selective switch configuration.
Figure 4:
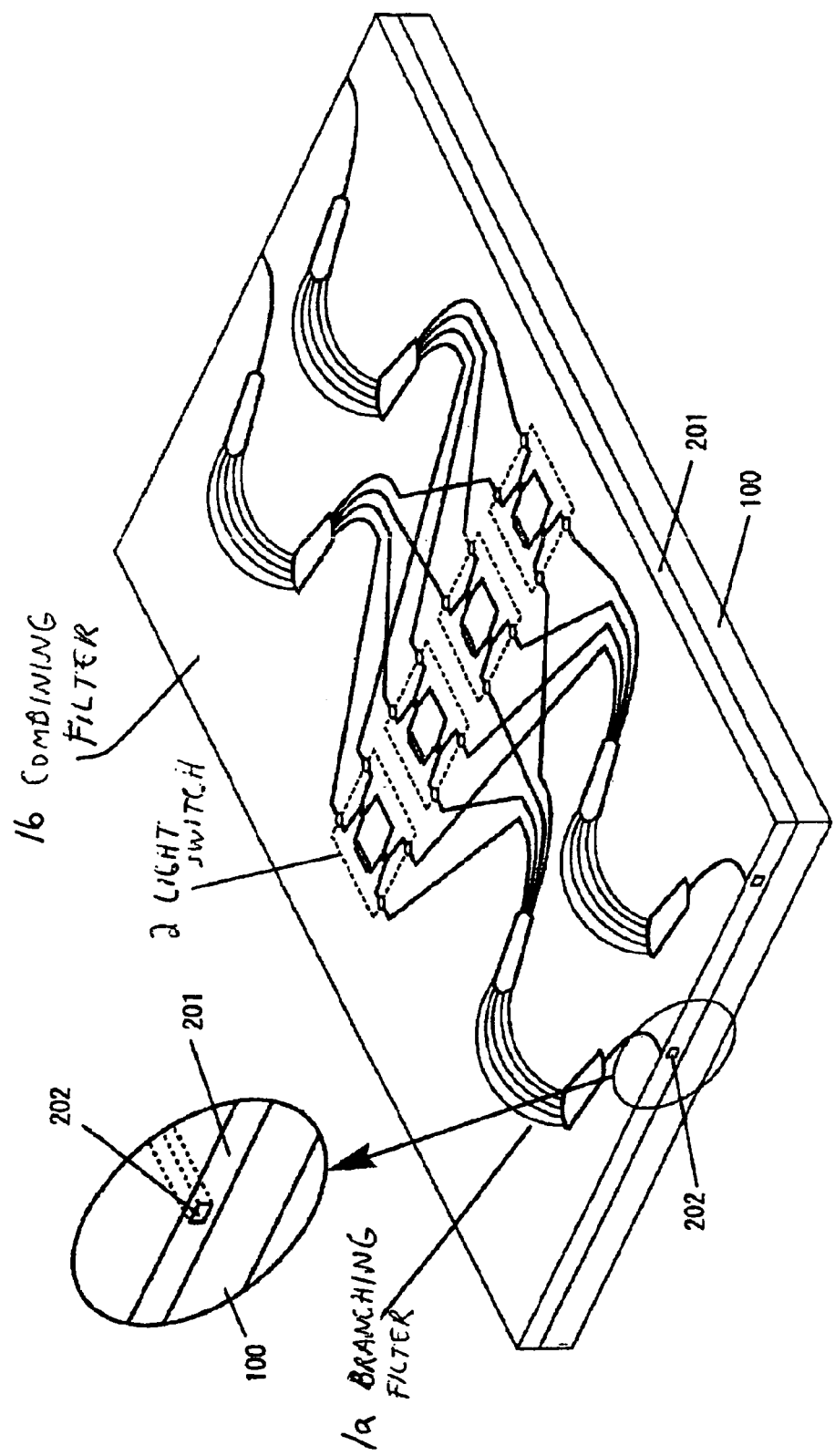
FIG. 4 (prior art) shows a third conventional example of a wavelength selective switch configuration.

Reference will now be made in detail to the present preferred embodiments of the present invention, examples of which are illustrated in the accompanying drawings, wherein like reference numerals refer to like elements throughout.

Figure 11:
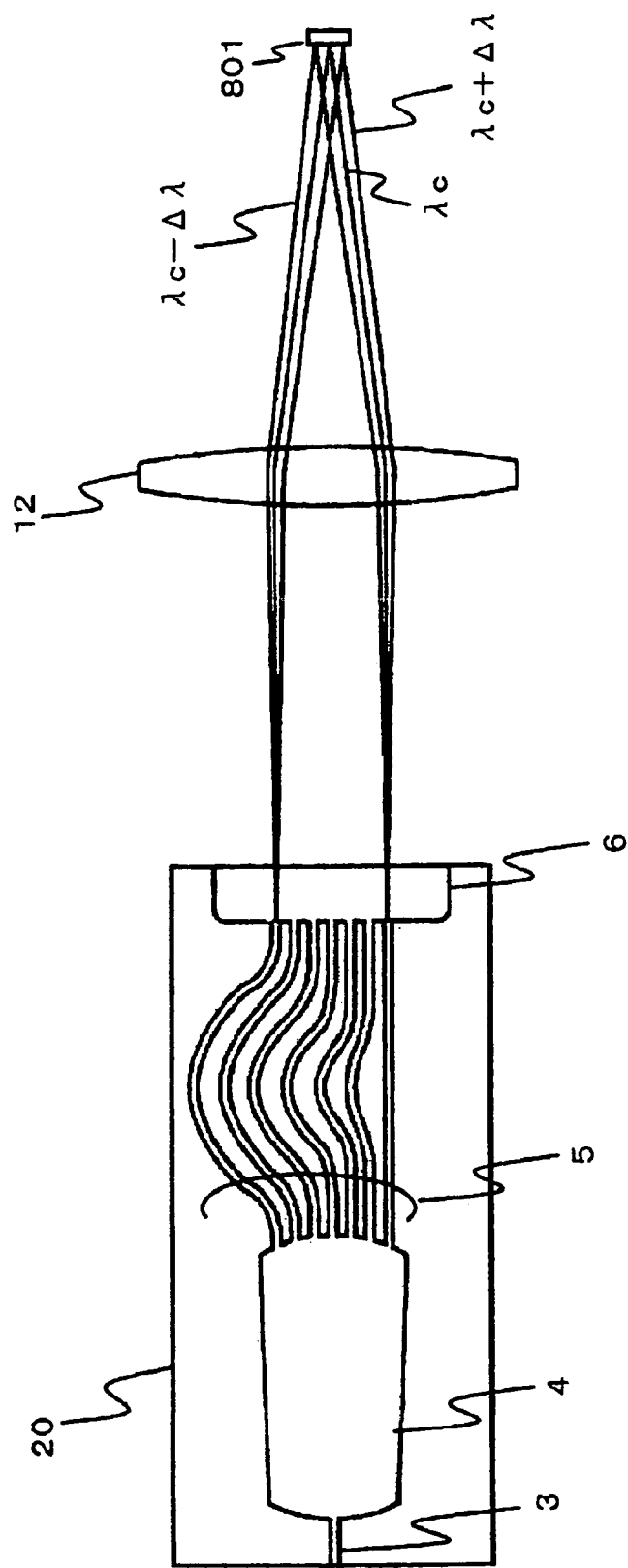
FIG. 11 explains the basic operations of the present invention.
Figure 10:
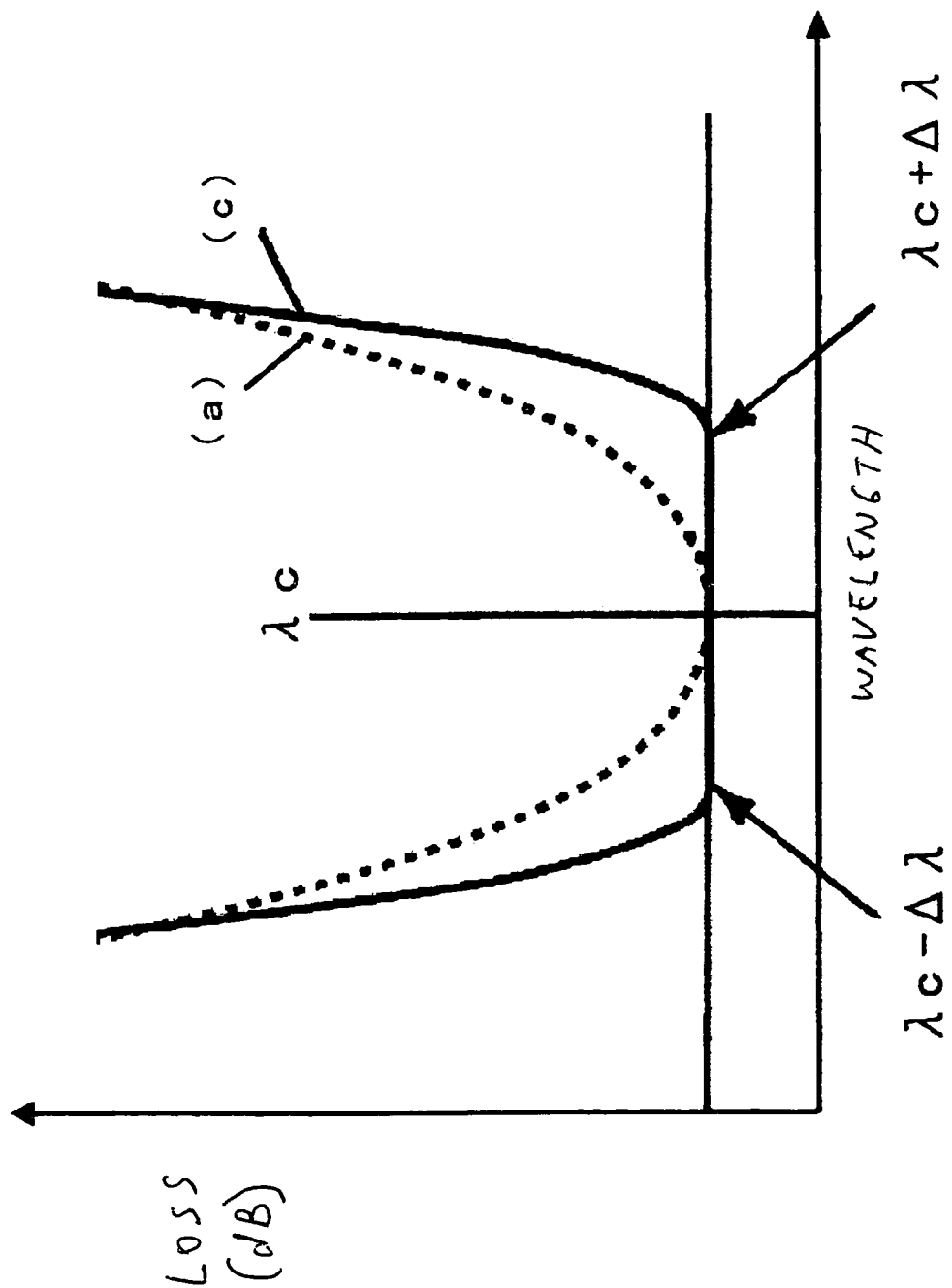
Figure 13A:
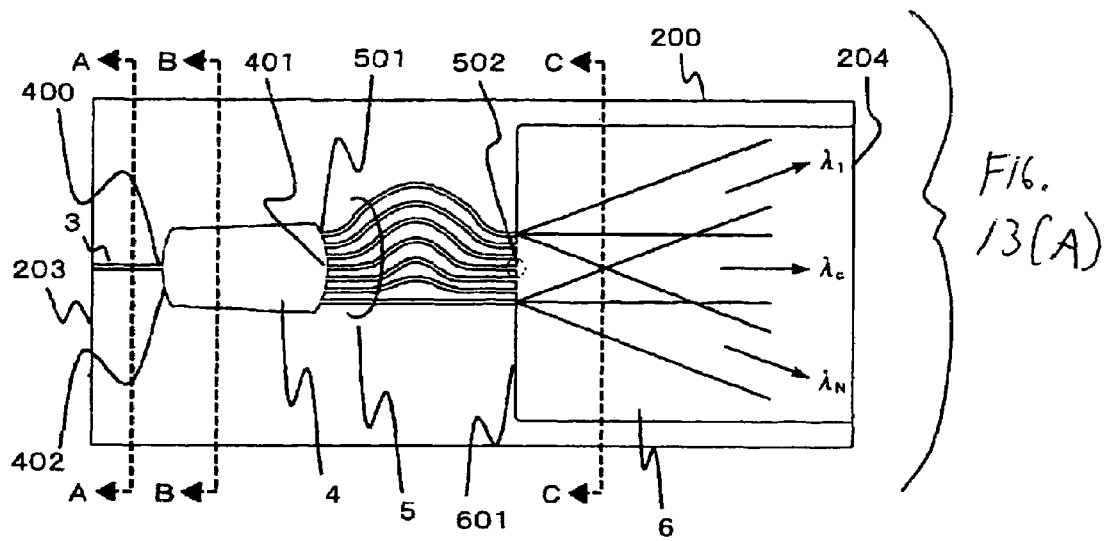
FIG. 13 explains the optical functional device of Embodiment 1.
Figure 13B:
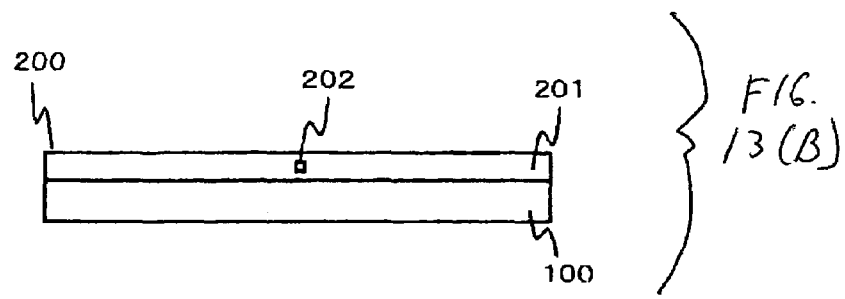
Figure 13C:
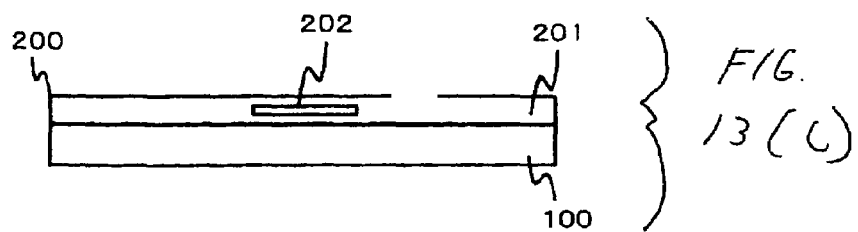
Figure 13D:
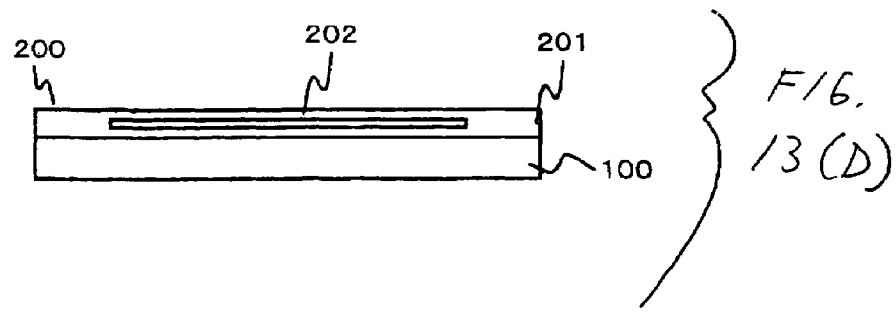

FIG. 11 explains the basic operation of the present invention. In FIG. 11, combining/branching device 20, which is an optical functional device of the present invention, is comprised of input slab waveguide 4, input waveguide 3 as an input terminal that inputs light into this input slab waveguide 4, output slab waveguide 6 having an output terminal, and channel waveguide array 5 comprising multiple channel waveguides with different lengths in which light is inputted from input slab waveguide 4 and outputted to output slab waveguide 6. FIG. 11 also shows a mirror 801 and a lens 12.

Figure 10:
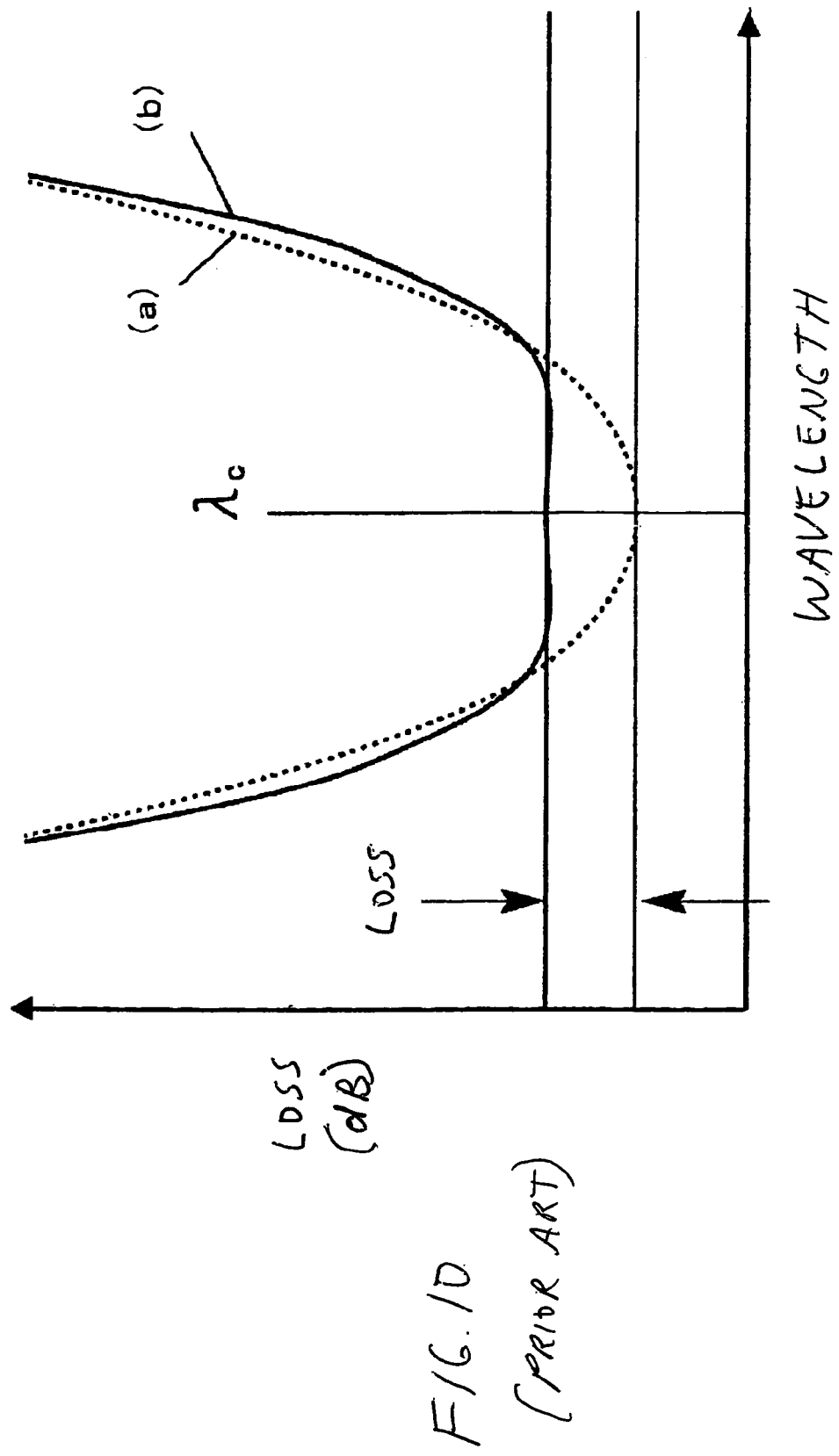
FIG. 10 (prior art) shows the loss with respect to wavelengths of light outputted from the output waveguide corresponding to FIG. 8.

FIG. 12 is a drawing that shows the loss with respect to wavelength of light in the case of an optical device that feeds light from input waveguide 3 in FIG. 11, reflects it with mirror 801, and returns it once again to the input waveguide, and it results in flattop and low-loss properties, as illustrated by curve (c) of FIG. 12. Moreover, curve (a) of FIG. 12 has the Gaussian transmission properties shown in FIG. 10.

The reason that the transmission properties shown by curve (c) in FIG. 12 can be obtained is because channel waveguides (equivalent to 610 in FIG. 8) for the purpose of inputting light of each wavelength and leading it to the output terminal are not established in combining/branching device 20 in FIG. 11.

Figure 8:
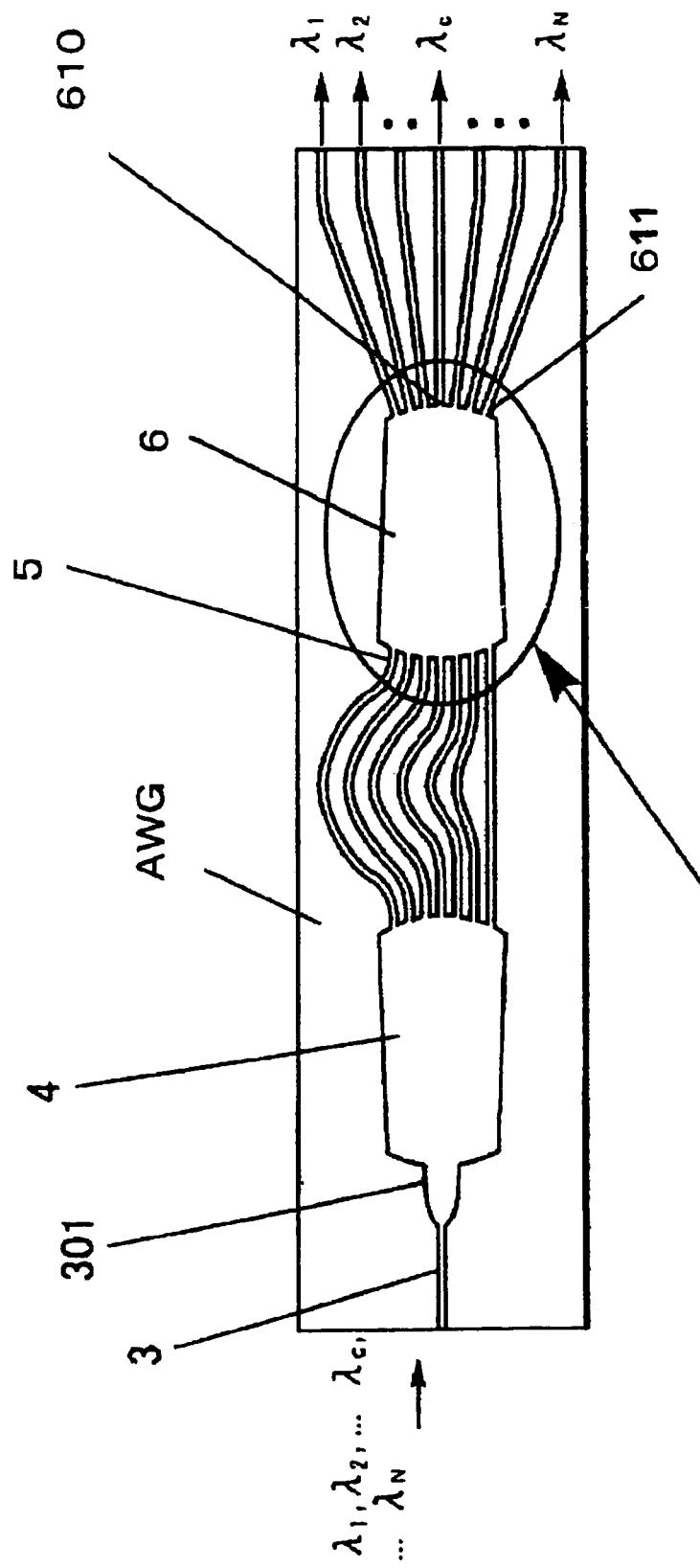
FIG. 8 (prior art) shows a conventional configuration example for the purpose of flat-topping transmission properties.
Figure 9A:
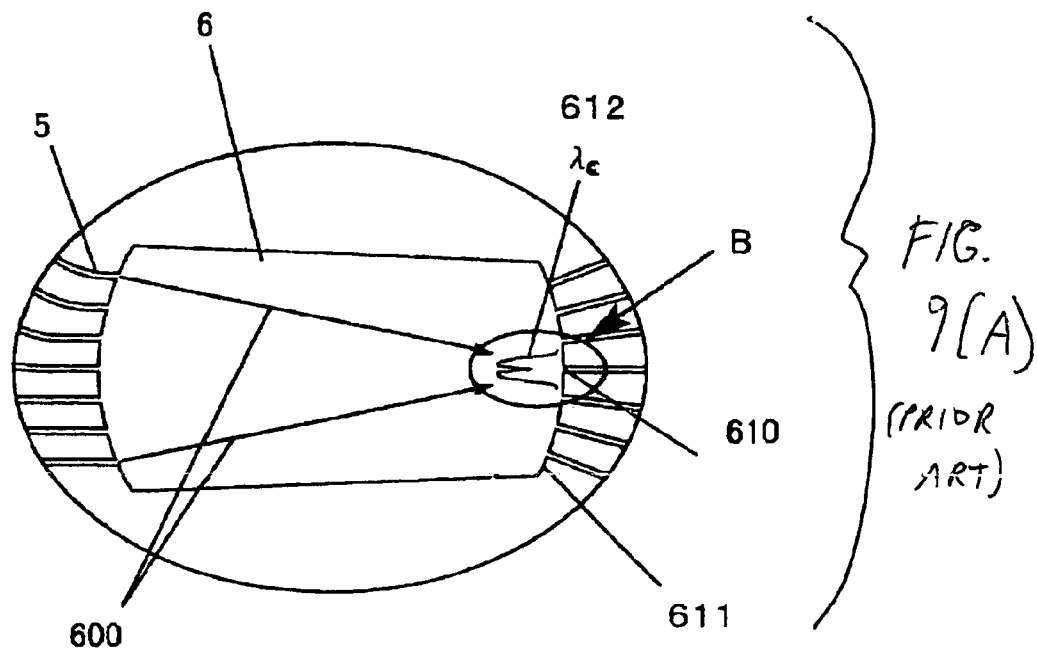
FIG. 9 (prior art) explains the intensity distribution of light at the output waveguide input part corresponding to FIG. 8.
Figure 9B:
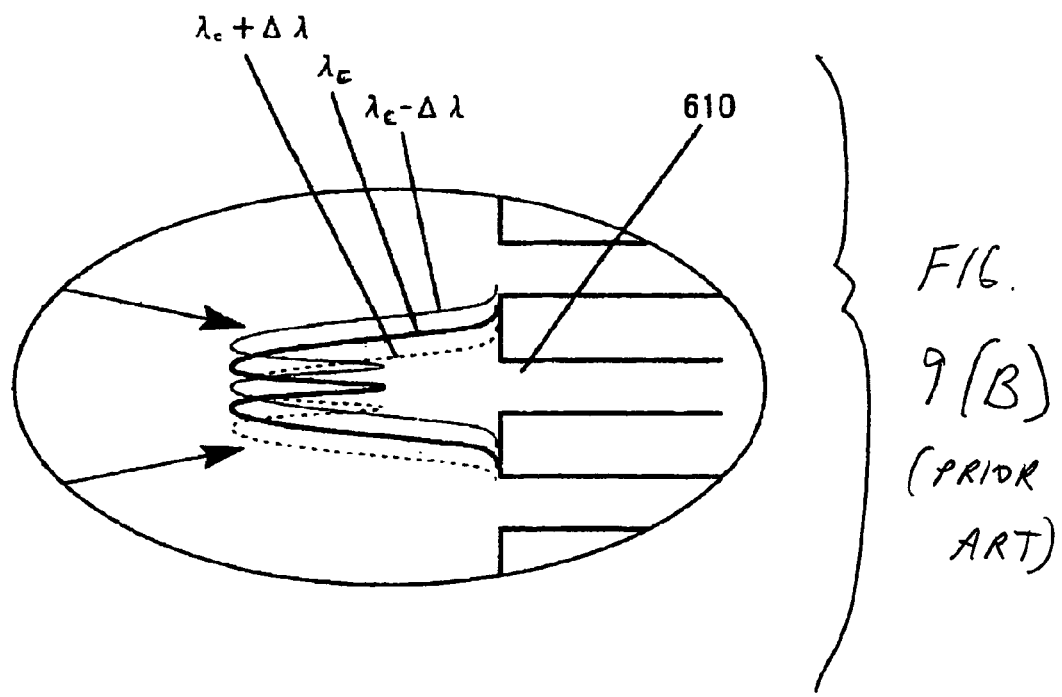

As described previously with respect to a conventional structure such as that in FIG. 8, the channel waveguides on the output terminal side cut out a portion of the spectrum and guide light with specific wavelengths. When trimming this spectrum, there was the problem that the transmission properties become Gaussian when loss is made low, and insertion loss increases when the transmission properties are flat-topped.

In contrast to this, because channel waveguides on the output terminal side are not present in the combining/branching device to which the present invention is applied, the light outputted from the combining/branching device has an extremely broad spectrum.

Mirror 801 is what determines the spectrum in FIG. 11.

Furthermore, the spectrum of light reflected is proportionate to the width of mirror 801 (the vertical width on the page surface in FIG. 11).

Moreover, with the mirror, the loss will be low as long as the spot in which light is focused is within the effective portion of the mirror. Therefore, flattop and low-loss transmission properties can be obtained, as shown by curve (c) in FIG. 12.

As stated above, by using the combining/branching device as the optical functional device of the present invention, the effect in which flattop and low-loss transmission properties can be obtained is generated. Moreover, because it is compact and there are few parts to assemble, it is possible to realize low-loss optical functional devices—wavelength combining/branching filters for wavelength selective switches, for example—without troublesome assembly.

Furthermore, in cases in which another optical device—a photoelectric converter, for example—is arranged in FIG. 11 in place of mirror 801, because channel waveguides on the output terminal side are not present, it is clear that the aforementioned effects are achieved.

Moreover, in this example embodiment, output slab waveguide 6 is established for the purpose of reducing the length errors of each channel waveguide in order to restrict nonadjacent crosstalk.

In other words, in the manufacturing process, when it is cut with the part of channel waveguide array without establishing output slab waveguide 6, if there is deviation in the cross sectional angles between adjacent channel waveguides, this directly becomes the length variation of the channel waveguides.

However, by establishing a short output slab waveguide 6, it becomes unnecessary to cut at the location of channel waveguide array 5, so it is possible to restrict length variation of the channel waveguides with the precision of the photomask used at the time of core processing.

Due to such reasons, a configuration in which the configuration of FIG. 11 is equipped with output slab waveguide 6 was used, but even with a combining/branching device in which output slab waveguide 6 is not present and the output terminal of channel waveguide array 5 is taken an used the end face, the effect in which flattop and low-loss transmission properties can be obtained. Moreover, because it is compact and there are few parts to assemble, it is clear that it is possible to realize low-loss optical functional devices—wavelength combining/branching filters for wavelength selective switches, for example—without troublesome assembly.

Example of Embodiment 1

FIG. 13 is an example of the optical functional device of the present invention, and it is an example of a wavelength combining/branching filter configuration. FIG. 13(*a*) is a plan view of the wavelength combining/branching filter, FIG. 13(*b*) is a cross-sectional view in which the wavelength combining/branching filter is cut by dotted line A-A of FIG. 13(*a*), FIG. 13(*c*) is a cross-sectional view in which the wavelength combining/branching filter is cut by dotted line B-B of FIG. 13(*a*), and FIG. 13(*d*) is a cross-sectional view in which the wavelength combining/branching filter is cut by dotted line C-C of FIG. 13(*a*).

As shown in FIG. 13(*b*), for example, the wavelength combining/branching filter of the present invention is comprised of slab substrate 100 and light guide 200 that is formed on the primary plane of slab substrate 100. Here, the "primary plane" of slab substrate 100 is the surface that makes contact with light guide 200 in slab substrate 100 of FIG. 13(*b*), for example.

Light guide 200 is comprised of clad 201 and core 202, whose perimeter is enclosed by clad 201 and has a higher index of refraction than the clad. However, core 202 is exposed only to waveguide end face 203 and waveguide end face 204.

In FIG. 13(*a*), the shape of the core (called the core pattern hereafter) of light guide 200 that constitutes the wavelength combining/branching filter contains input slab waveguide 4, input waveguide 3 as an input terminal that inputs light into this input slab waveguide 4, output slab waveguide 6 having an output terminal, and channel array 5 comprising multiple channel waveguides with different lengths in which light is inputted from input slab waveguide 4 and light is outputted to output slab waveguide 6.

Moreover, the core pattern of light guide 200 in FIG. 13(*a*) is embedded within clad 201, but for the sake of convenience, it is shown with a solid line rather than a dotted line. Layers are shown by solid lines in the following plan views, even if they are layers that are embedded in the same way, but as shown in FIG. 13(*b*), FIG. 13(*c*), and FIG. 13(*d*), core 202 is actually embedded within clad 201.

Furthermore, core 202 of FIG. 13(*b*) corresponds to input waveguide 3 in FIG. 13(*a*), core 202 of FIG. 13(*c*) corresponds to input slab waveguide 4 of FIG. 13(*a*), and core 202 of FIG. 13(*d*) corresponds to output slab waveguide 6 of FIG. 13(*a*).

Defining the boundary of input slab waveguide 4 and channel waveguide array 5 of the wavelength combining/branching filter illustrated in FIG. 13(*a*) as input apertures 501 of channel waveguide array 5, input apertures 501 of channel waveguide array 5 are positioned on arc 401 with radius R around connection point 400 of input waveguide 3 and input slab waveguide 4.

Furthermore, connection point 400 of input waveguide 3 and input slab waveguide 4 is on the Rowland circle constituting arc 401, and boundary 402 with input slab waveguide 4 is a part of this Rowland circle. Here, "Rowland circle" is a circle with radius R/2, whose arc passes through the center of a circle with radius R.

Moreover, as long as it is on this Rowland circle, it is possible to arrange input waveguide 3 on positions other than position 400 as well.

Furthermore, defining the boundary of channel waveguide array 5 and output slab waveguide 6 as output apertures 502 of channel waveguide array 5, the output apertures 502 of channel waveguide array 5 are arranged in a straight line, as shown in the figure. Boundary 601 of the core that constitutes output slab waveguide 6, the core that constitutes channel waveguide array 5, and clad 201 is configured in a straight line.

In addition, the length of channel waveguide array 5 is adjusted such that the light path length differences between core pattern input apertures and output apertures of adjacent channel waveguides are constant.

This light path difference is established such that, when wavelength division multiplexed light is inputted from input waveguide 3, which is used as an input terminal, angular dispersion is generated based on each wavelength that constitutes this wavelength division multiplexed light.

Figure 5:
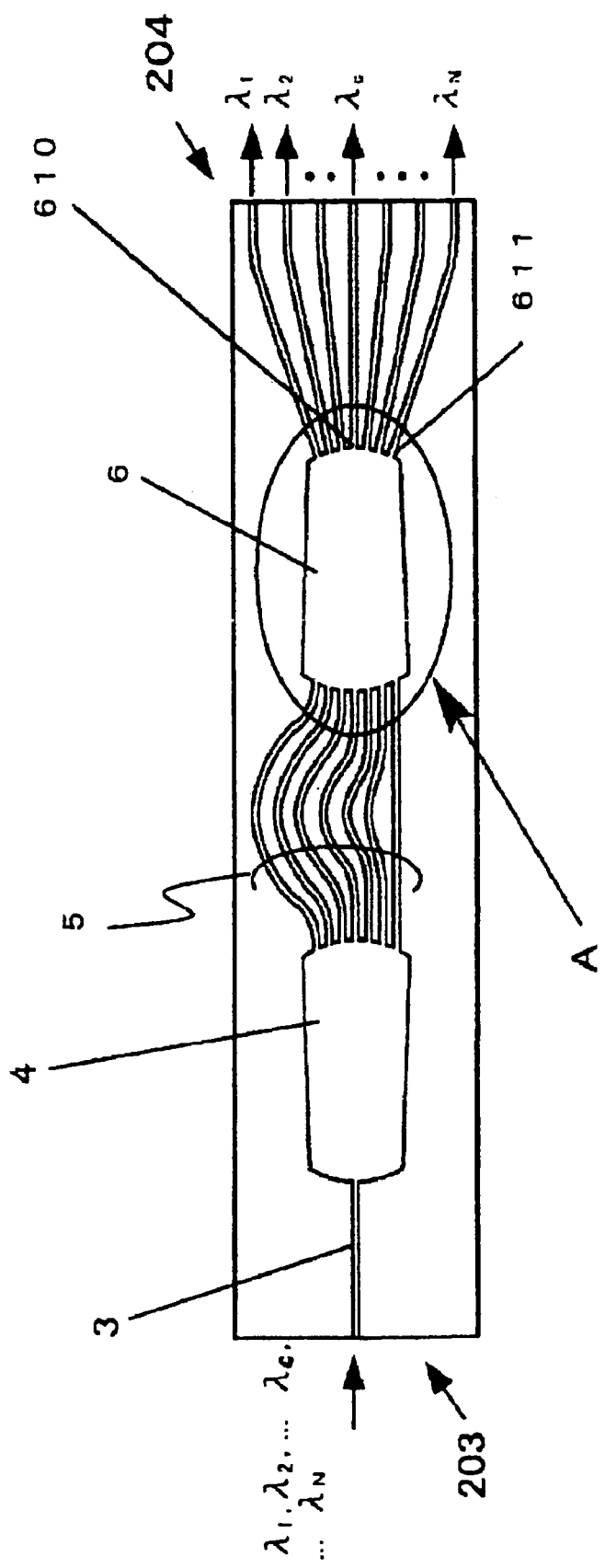
FIG. 5 (prior art) shows a configuration example of a conventional AWG.
Figure 6A:
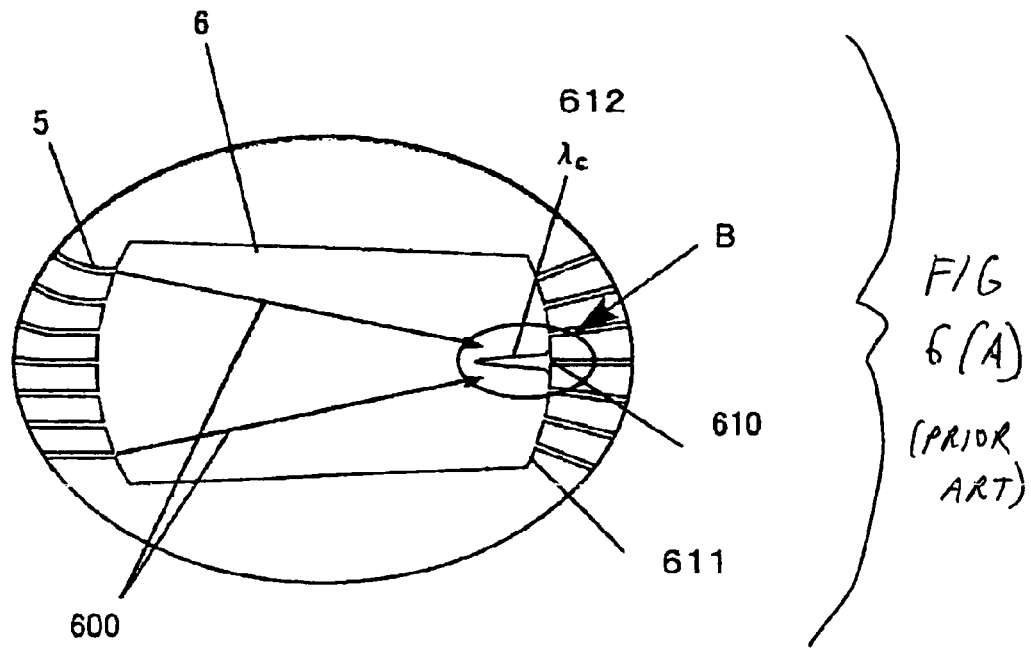
FIG. 6 (prior art) explains the intensity distribution of light at the output waveguide input part corresponding to FIG. 5.
Figure 6B:
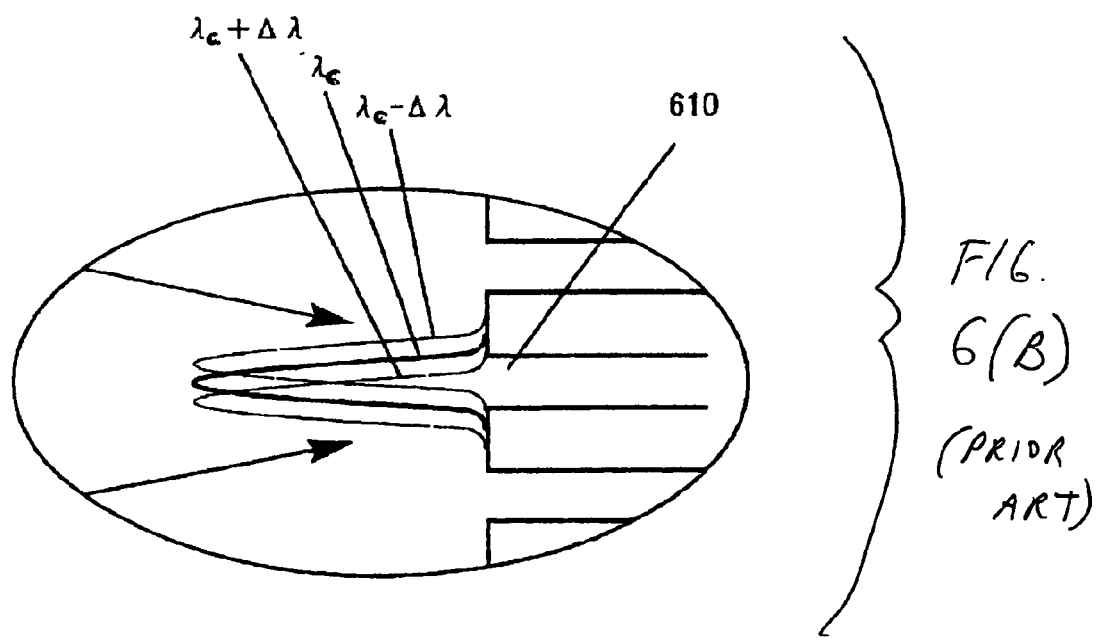
Figure 7:
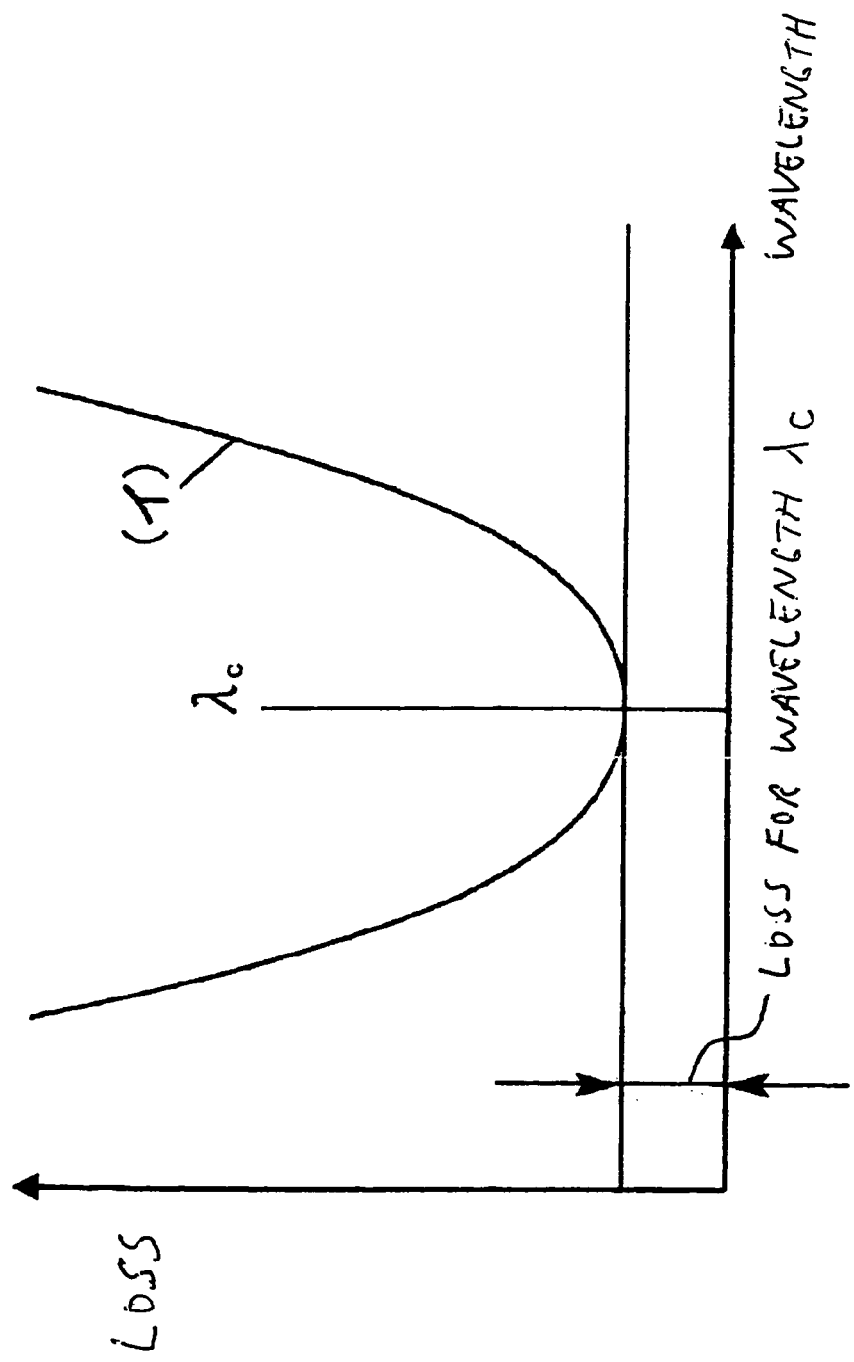
FIG. 7 (prior art) shows the loss with respect to wavelengths of light outputted from the output waveguide.

Therefore, in the embodiments in FIGS. 11 through 13, subsequent channel waveguides channeling light of different wavelength bands, respectively, are not formed on slab substrate 100 after output slab waveguide 6. In comparison, FIG. 5 and FIG. 8 show conventional configurations where output channel waveguides 610 channeling light of different wavelength bands, respectively, are formed on the same substrate as an output slab waveguide.

Figure 14A:
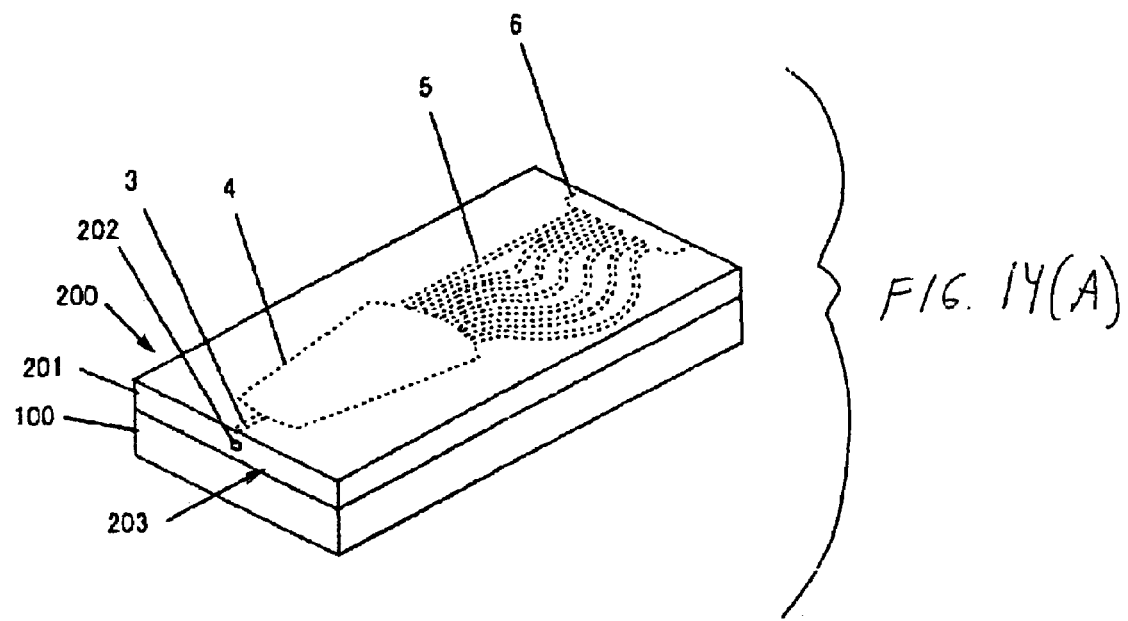
FIG. 14 shows an example of the end face of the wavelength combining/branching filter of the present invention.
Figure 14B:
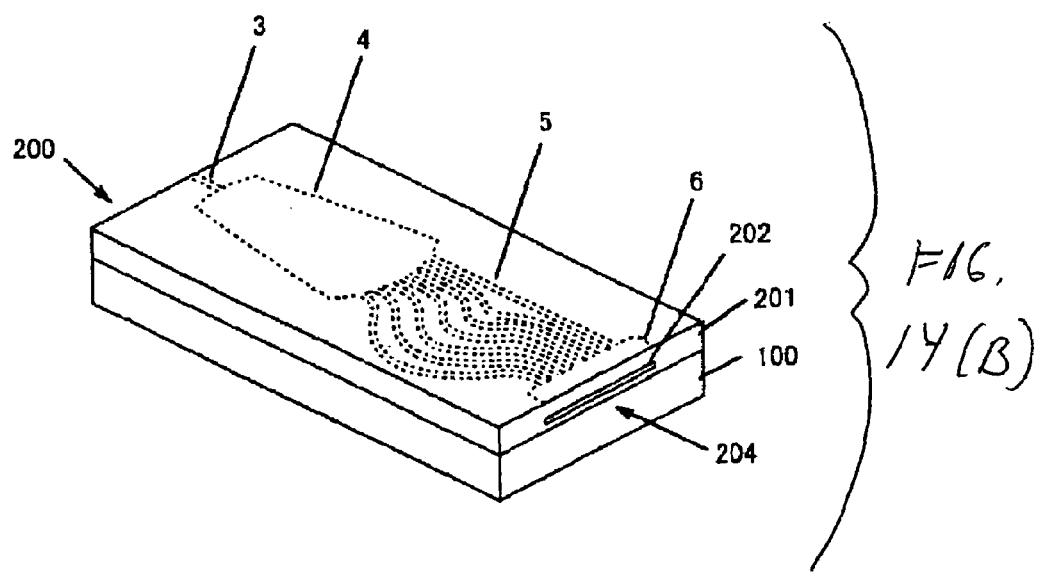

FIG. 14 shows an example of the end face of the wavelength combining/branching filter of the present invention.

FIG. 14(*a*) is an example of the configuration of waveguide end face 203 on the input waveguide side, and FIG. 14(*b*) is an example of the configuration of waveguide end face 204 on the output slab waveguide side. The waveguide end faces are formed such that both of them share a face with the end face of slab substrate 100. In general, optical fibers are connected to waveguide end face 203 on the input waveguide side.

As can be seen from FIG. 14(*a*) and FIG. 14(*b*), there are no additional channel waveguides for cutting or channeling light of specific wavelength bands, respectively, on slab substrate 100 between channel array waveguide 5 and waveguide end face 204. By comparison, FIG. 5 and FIG. 8 show a conventional arrangements where output channel waveguides 610 are on a substrate between a channel array waveguide 5 and waveguide end face 204.

Moreover, in cases in which it is necessary to attenuate the reflected light of the waveguide end faces that returns to the optical fibers or waveguides, the waveguide end faces may be inclined from a vertical surface with respect to the optical fibers or waveguides.

Next, a concrete configuration of the combining/branching filter of this example of embodiment will be explained. For example, using the CVD (Chemical Vapor Deposition) method, on a silicon substrate with a thickness of 1 mm (equivalent to slab substrate 100), silica glass for clad with a thickness of 20 μm and silica glass for the core with a thickness of 6 μm are stacked on one another.

Photoresist is applied to this, and through a photolithography process a photoresist pattern having approximately the same shape as the core pattern is formed. Next, using the photoresist pattern as a mask, reactive ion etching (RIE) is performed and a core pattern is formed.

Through this process, only the core patterns of input waveguide 3, input slab waveguide 4, channel waveguide array 5, and output slab waveguide 6 are left behind, and core 202 is removed.

Next, using the CVD method, for example, silica glass for clad with a thickness of 20 μm is stacked upon the core pattern. Then, waveguide end faces 203 and 204 are simultaneously formed by cutting with a cutting machine (dicing machine) that is used for the cutting of semiconductor devices. As described above, the combining/branching filter of this example of embodiment is formed.

The concrete dimensions are, for example, as follows: the width of input waveguide 3 is 6 μm and the length is 5 mm, the radius R of the boundary between input slab waveguide 4 and channel waveguide array 5 is 17 mm, the widths of the channel waveguides that constitute channel waveguide array 5 are 6 μm, the differences of the effective light path lengths of adjacent channel waveguides from the input apertures to the output apertures are 45 μm, and the spacing of the input apertures and the output apertures of the core pattern of each channel waveguide is 14 μm. All core thicknesses are 6 μm and the core/clad specific refraction index difference=0.8%.

Also, other materials such as quartz glass or borosilicate glass may be used for slab substrate 100.

Moreover, light guides may be produced with manufacturing processes other than the CVD method or with materials other than silica glass—for example, silica glass materials formed with the FHD (Flame Hydrolysis Deposition), or plastic materials formed with a coating method.

The optical system illustrated in FIG. 11 is constructed with the wavelength combining/branching filter that is configured in this way, and the spectrum measured when light is reflected with mirror 801 is illustrated by curve (c) in FIG. 12.

In FIG. 11, when the focal length of lens 12 was set to 58 mm and the width of the reflection surface of mirror 801 was set to 100 μm, the spectrum width in which the loss increases by 0.5 dB from the minimum was 0.8 nm.

Moreover, when the width of the reflection surface of mirror 801 was set to 50 μm, the spectrum width in which the loss increases by 0.5 dB from the minimum was 0.4 nm. The insertion loss at this time was 6 dB. Therefore, the loss decreased by ½ in comparison to, for example, the case in which the conventional AWGs illustrated in FIG. 8 are used.

In this way, through the combining/branching device of this example of embodiment, flattop and low-loss properties are obtained. Moreover, because it is compact and there are few parts to assemble, it is possible to realize low-loss optical functional devices—wavelength combining/branching filters for wavelength selective switches, for example—without troublesome assembly.

Moreover, in this example of embodiment, the concrete numeric values were given for the dimensions of waveguides and the focal lengths of optical parts such as lenses, but it is obvious that the effects of the present invention can be obtained even when the configuration of this example of embodiment is applied without depending on these values.

Example of Embodiment 2

Figure 16:
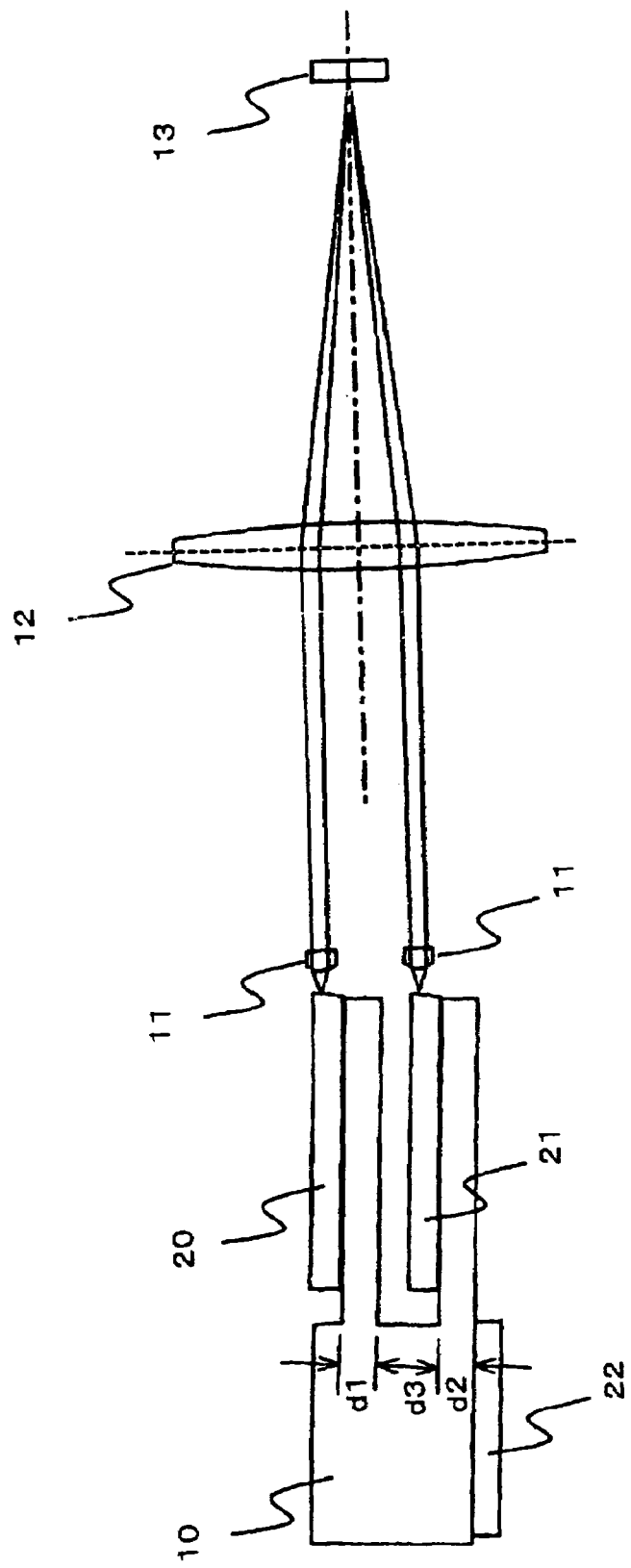
FIG. 16 is a side view of the wavelength selective switch of Embodiment 2.

FIG. 15 and FIG. 16 show an example of embodiment of the optical functional device of the present invention. FIG. 15 shows a plan view of a wavelength selective switch that is applied to 40-channel wavelength division multiplexed light with frequency intervals of 100 GHz, and FIG. 16 shows the side view thereof.

Figure 17:
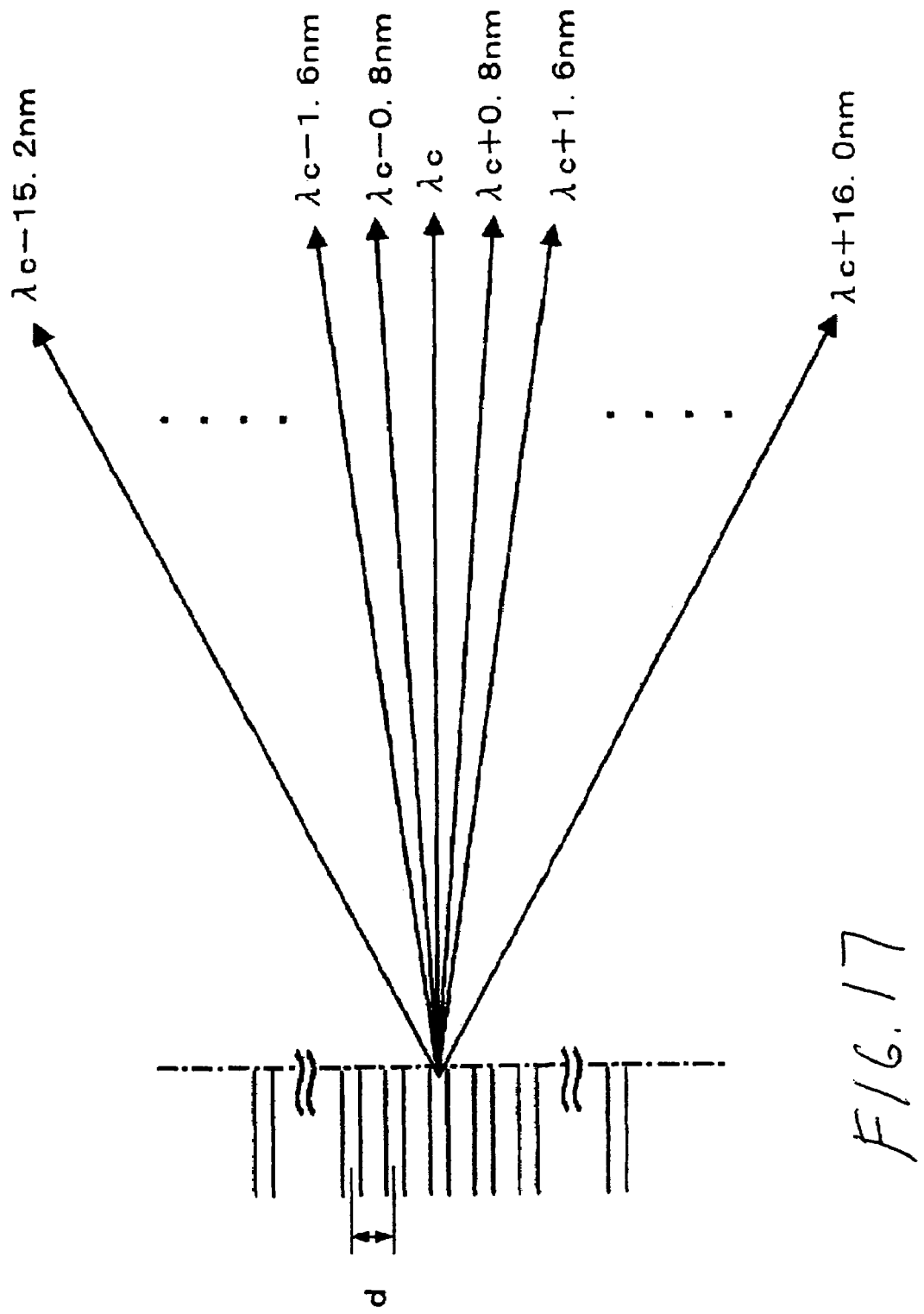
FIG. 17 is an enlarged drawing of part A of FIG. 15.

FIG. 17 is an enlarged drawing of part A of FIG. 15, and it schematically shows the exit directions of light with each wavelength when light that is wavelength-multiplexed with 100 GHz frequency intervals (equivalent to wavelength intervals of approximately 0.8 nm in the 1.5 μm wavelength region) is emitted from channel waveguide array 5.

In FIG. 15 and FIG. 16, the first combining/branching device 20 and the second combining/branching device 21 for 100 GHz frequency intervals are mounted on thermal conduction fin 10, which is mounted on heater 22.

These combining/branching devices 20 and 21 have identical structures, and they are comprised of input slab waveguide 4, input waveguide 3 as an input terminal that inputs light into this input slab waveguide 4, and channel waveguide array 5 comprising multiple channel waveguides with different lengths in which light is inputted from input slab waveguide 4.

When wavelength multiplexed light of 40 channels with 100 GHz frequency intervals enters input waveguide 3 of the first combining/branching device 20, it freely propagates through input slab waveguide 4, reaches channel waveguide array 5, and optically couples. Therefore, the power of the input light is distributed to each channel waveguide that constitutes channel waveguide array 5.

The light within each channel waveguide that constitutes channel waveguide array 5 causes phase shifts corresponding to its wavelength and it is outputted from the output terminal, and due to interference, as shown in FIG. 17, it exits as parallel light in an angular dispersion direction based on each wavelength.

Light that is branched into each wavelength by channel waveguide array 5 in this way is led to cylindrical lens 11, and becomes parallel light with respect to the vertical direction (equivalent to the vertical direction of the page surface in FIG. 16).

This is the same for the case in which wavelength-multiplexed light is sent to the second combining/branching device 21.

Lens 12 is established as an optical device that (a) focuses light, having each wavelength generating angular dispersion with the first combining/branching device 20, into different positions based on the angular dispersion directions, and (b) focuses light, having each wavelength generating angular dispersion with the second combining/branching device 21, into different positions based on the angular dispersion directions.

Furthermore, this lens 12 is arranged such that (a) the position in which light of a given frequency generating angular dispersion with the first combining/branching device 20 is focused and (b) the position in which the light of the same frequency generating angular dispersion with the second combining/branching device 21 are in agreement.

Moreover, mirror array 13 comprising multiple mirrors is arranged as a light reflection device that is established in at least one position in which light of each frequency generating this angular dispersion is nearly focused, and light of each frequency branched by the first combining/branching device is fed into this array.

Mirrors corresponding to each branched wavelength are arranged on mirror array 13. The angle of each mirror is adjusted as necessary, and light from the first combining/branching device 20 is either returned to the first combining/branching device 20 or it is reflected to the second combining/branching device 21.

In other words, regarding light with a wavelength in which switching is not performed from among wavelength division multiplexed light sent to the first combining/branching device 20, the reflection angle of the mirror in the position corresponding to that wavelength is adjusted such that the light from the first combining/branching device 20 returns to the first combining/branching device 20.

On the other hand, regarding light with a wavelength in which switching is performed, the reflection angle of the mirror in the position corresponding to that wavelength is adjusted such that the light from the first combining/branching device 20 is led to the second combining/branching device 21. At this time, light with the same wavelength from the second combining/branching device 21 is reflected with this mirror and led to the first combining/branching device 20.

In this way, the function of a wavelength selective switch, which is an optical functional device that can (a) drop light of prescribed wavelength from among wavelength division multiplexed light that entered the first combining/branching device 20 and lead it to the second combining/branching device 21, and (b) add light with the same wavelength as the dropped wavelength from among wavelength division multiplexed light that entered the second combining/branching device 21 and return it to the first combining/branching device 20 as wavelength division multiplexed light, is fulfilled.

Moreover, the input and output of light is conducted with input waveguides 3 of combining/branching device 20 and combining/branching device 21, but as an optical device for the purpose of separating input light and output light—for example, an optical device that outputs to a second port the light that was inputted into the first port and outputs to a third port the light that was inputted into this second port, such as an optical circulator—may be arranged on the input terminal of input waveguide 3 of each combining/branching device. This is the same for other examples of embodiment as well.

In this way, through this example of embodiment, flattop and low-loss properties can be obtained. Moreover, because it is compact and there are few parts to assemble, it is possible to realize wavelength selective switches as low-loss optical functional devices without troublesome assembly.

Here, as an example, each of the combining/branching devices 20 and 21 are created on a silicon substrate using quartz waveguides (specific refraction index difference: 0.8%).

Moreover, as an example, they are designed such that the input terminal of input waveguide 3 and the output terminal of channel waveguide array 5 form 90° angles, and as shown in FIG. 17, they are created such that each channel waveguide is aligned in parallel at the output terminal.

In the example of FIG. 15, the number of channel waveguides that constitute channel array 5 is approximately 300, and in the example of FIG. 17, the spacing d between each channel waveguide at the output terminal of channel waveguide array 5 is 14 μm. At this time, the diffraction angle difference between channels (ch) of diffracted light emitted from the output terminal on the channel waveguide array 5 side is 0.0017 rad/ch. The diameter of cylindrical lens 11 is 2 mm, and the focal length is approximately 10 mm.

The focal length f of lens 12 is approximately 58.3 mm, and it is mounted at a position that is distanced from the output terminal of channel waveguide array 5 by focal length f. Its effective diameter is 9 mm.

Furthermore, mirror array 13 is mounted on the opposite side as cylindrical lens 11 in a position that is distanced from lens 12 by focal length f.

Figure 18A:
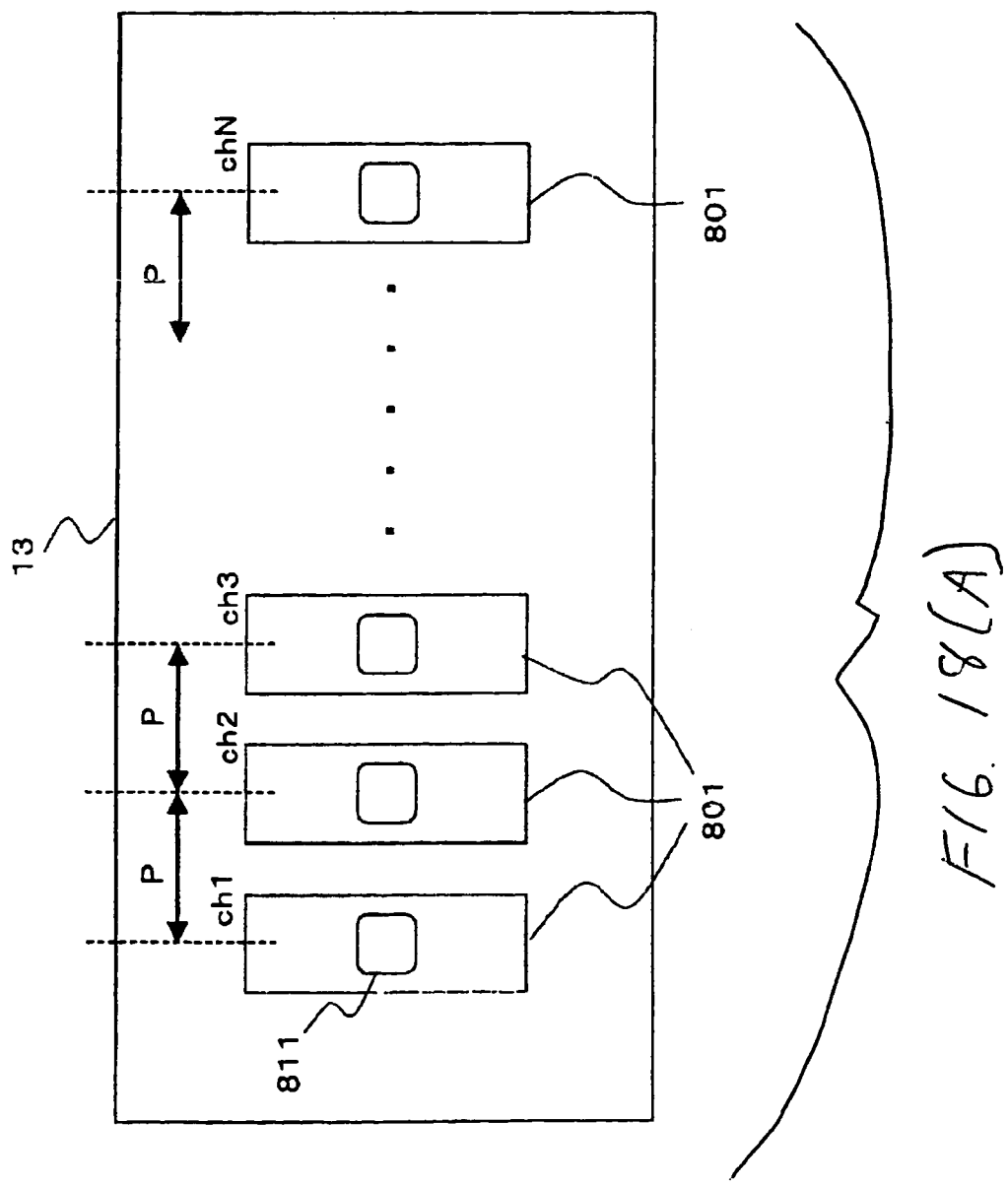
FIG. 18 shows a mirror array configuration example.
Figure 18B:
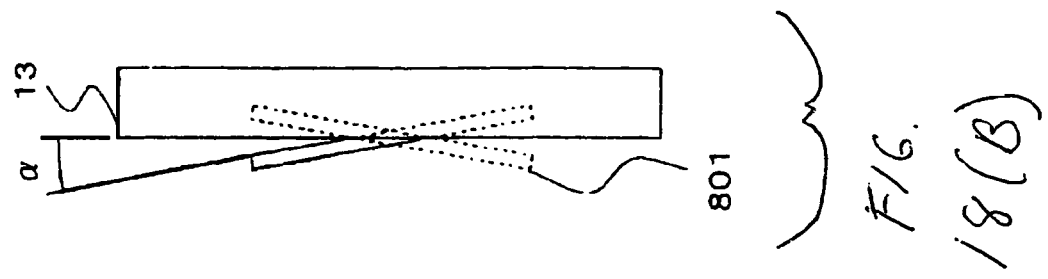

FIG. 18 is an example of the configuration of mirror array 13. More specifically, FIG. 18(*a*) is a plan view and FIG. 18(*b*) is a side view as seen from the right side, and N mirrors are aligned from ch1 to chN with a nearly constant pitch P. In this example of embodiment, N is 40. Moreover, as illustrated in the side view of FIG. 18(*b*), each mirror can be electrically controlled and tilted. Pitch P of mirrors 801 is 100 μm, and the size of reflection surfaces 811 is 50 μm×50 μm.

In FIG. 16, thicknesses d1 and d2 of the combining/branching device mounted parts of thermal conduction fin 10 are both 1 mm, and the distance d3 between combining/branching mounted parts is 5 mm. Therefore, the two combining/branching devices 20 and 21 are mounted distanced by 6 mm in the vertical direction.

The mirror swing angle α is 0.12 rad when light is returned from combining/branching device 20 to combining/branching device 20 and when light is guided to combining/branching device 21.

Moreover, in this example of embodiment, by (a) configuring such that wavelength division multiplexed light is inputted into combining/branching device 20, and light that is branched into each wavelength is reflected by mirrors corresponding to each wavelength constituting mirror array 13 and is guided to combining/branching device 21, and (b) adjusting the mirror reflection angles to control the quantity of light guided to combining/branching device 21, it is possible to independently change the intensity of light of each wavelength constituting the wavelength division multiplexed light.

In other words, with the configuration of this example of embodiment, it is possible to realize a device that dynamically controls the light power level of each channel (wavelength) corresponding to 40-channel wavelength division multiplexed light with 100 GHz frequency intervals (hereafter, such a device is called a Dynamic Gain Equalizer, abbreviated DGEQ).

Moreover, with a DGEQ of this configuration, the input of wavelength division multiplexed light becomes combining/branching device 20 and the output becomes combining/branching device 21, so an optical device (such as an optical circulator, for example) for the purpose separating the input light and the output light becomes unnecessary.

Furthermore, in other examples of embodiment of wavelength selective switches configured using the combining/branching devices of the present invention as well, it is obvious that utilization as a DGEQ is possible by appropriately adjusting the angles of the mirrors corresponding to each wavelength.

Example of Embodiment 3

Figure 20:
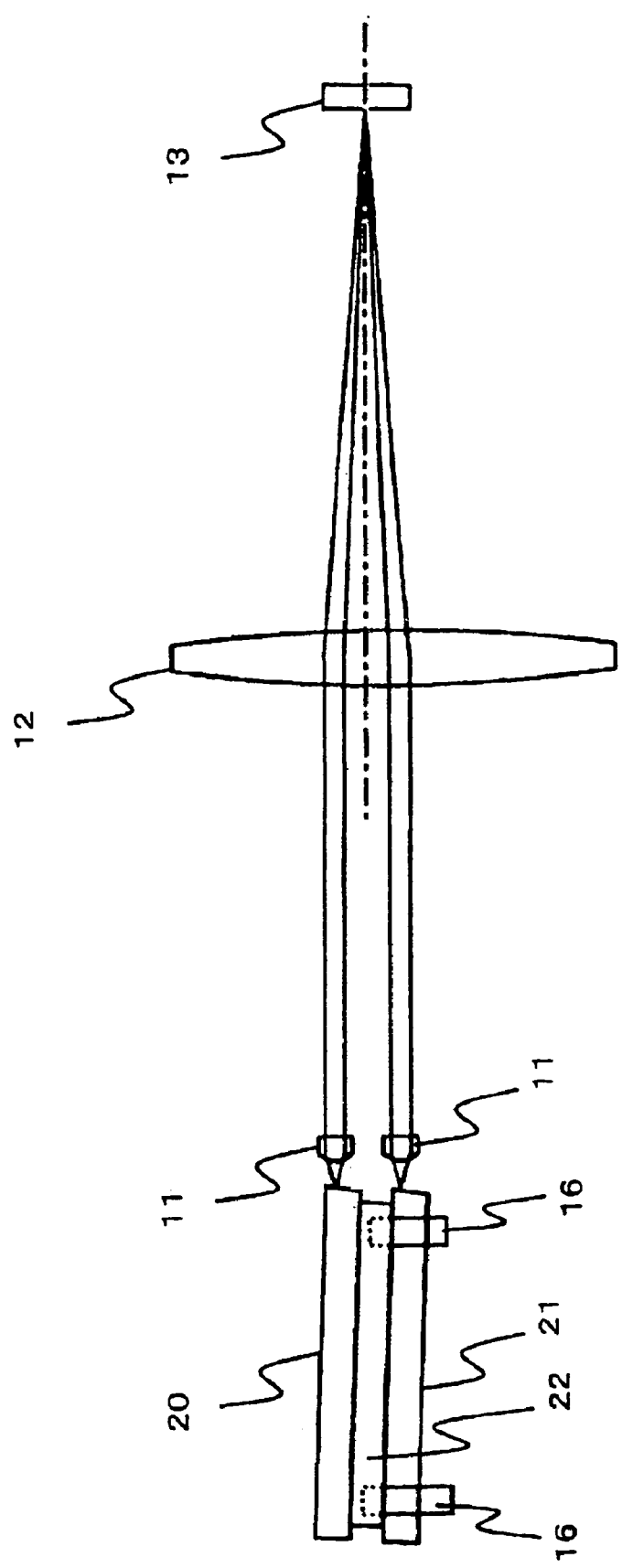
FIG. 20 is a side view of the wavelength selective switch of Embodiment 3.

FIG. 19 and FIG. 20 show an example of embodiment of the optical functional device of the present invention. FIG. 19 shows a plan view of a wavelength selective switch that is applied to 40-channel wavelength division multiplexed light with frequency intervals of 100 GHz, and FIG. 20 shows the side view thereof.

Figure 21:
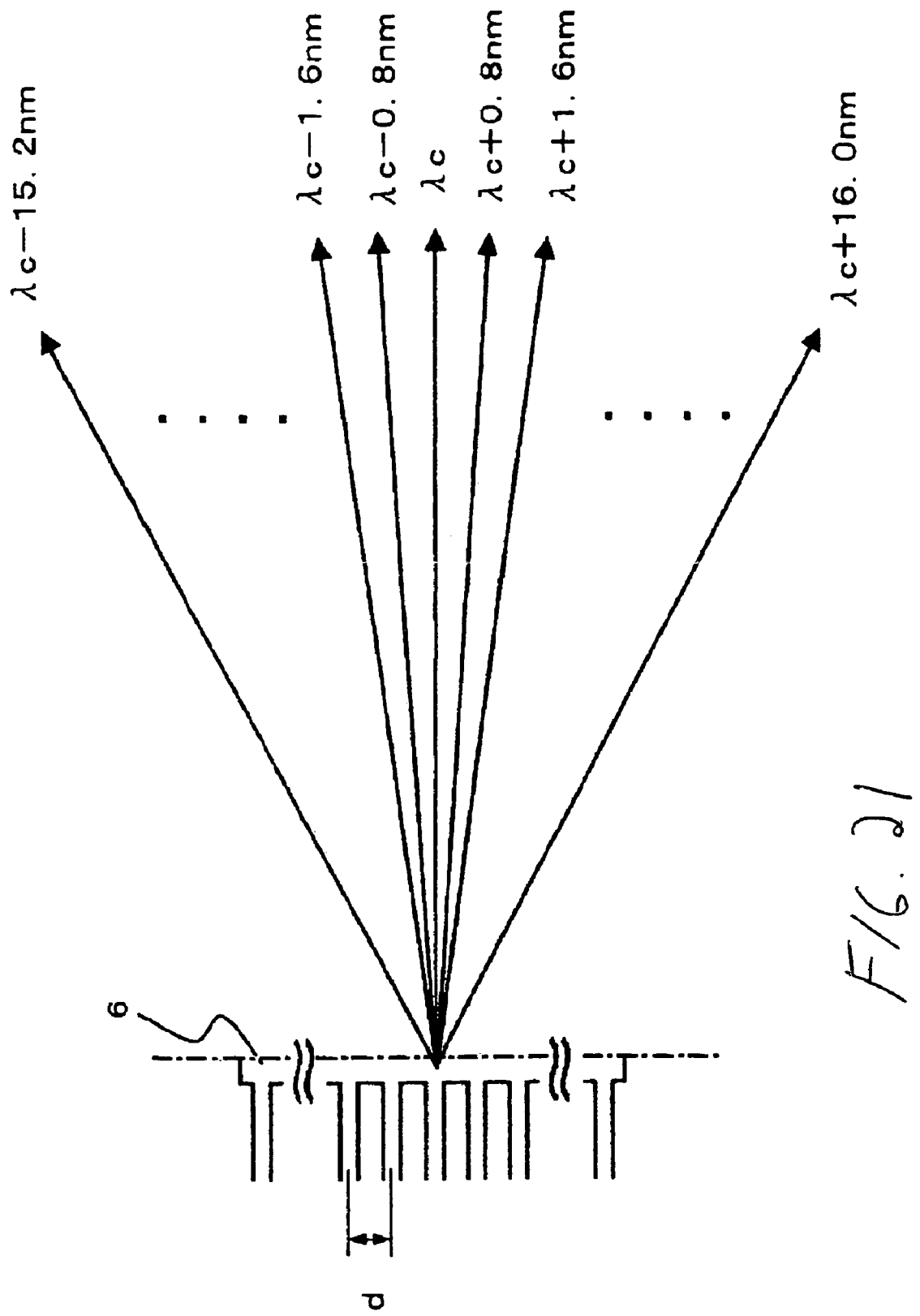
FIG. 21 is an enlarged drawing of part A of FIG. 19.

FIG. 21 is an enlarged drawing of part A of FIG. 19, and it schematically shows the exit directions of light with each wavelength when light that is wavelength-multiplexed with 100 GHz frequency intervals (equivalent to wavelength intervals of approximately 0.8 nm in the 1.5 μm wavelength region) is emitted from output slab waveguide 6.

This example of embodiment is a configuration that is similar to Example of Embodiment 2, but it differs in that (a) the combining/branching device is directly mounted on heater 22, without establishing a thermal conduction fin on which to mount the combining/branching device, and (b) a short output slab waveguide 6 having an output terminal is established on the end of channel waveguide array 5 on the opposite side as input slab waveguide 4.

Specifically, in FIG. 19 and FIG. 20, a first combining/branching device 20 and second combining/branching device 21 for 100 GHz frequency intervals are respectively mounted on both sides of heater 22, and heater 22 is supported by brace 16.

These combining/branching devices 20 and 21 have identical structures, and they are comprised of input slab waveguide 4, input waveguide 3 as an input terminal that inputs light into this input slab waveguide 4, output slab waveguide 6 having an output terminal, and channel waveguide array 5 comprising multiple channel waveguides with different lengths in which light is inputted from input slab waveguide 4 and light is outputted to output slab waveguide 6.

Here, the length of the output slab waveguide in this example of embodiment is 500 µm.

In this example of embodiment as well, as with the example of Embodiment 2 described above, the function of a wavelength selective switch, which is an optical functional device that can (a) drop light of prescribed wavelength from among wavelength division multiplexed light that entered the first combining/branching device 20 and lead it to the second combining/branching device 21, and (b) add light with the same wavelength as the dropped wavelength from among wavelength division multiplexed light that entered the second combining/branching device 21 and return it to the first combining/branching device 20 as wavelength division multiplexed light, is fulfilled.

In this way, through this example of embodiment, flattop and low-loss transmission properties can be obtained. Moreover, because it is compact and there are few parts to assemble, it is possible to realize wavelength selective switches as low-loss optical functional devices without troublesome assembly.

Furthermore, in this example of embodiment, by directly mounting the combining/branching devices on the heater, it is possible to realize a wavelength selective switch that has even fewer components than Example of Embodiment 2, and has thinner wavelength combining/branching filter parts.

Moreover, by establishing output slab waveguide 6, it is possible to restrict the variation of channel waveguide lengths with the precision of the photomask used at the time of core processing, and it is also possible to restrict nonadjacent crosstalk.

Example of Embodiment 4

Figure 22:
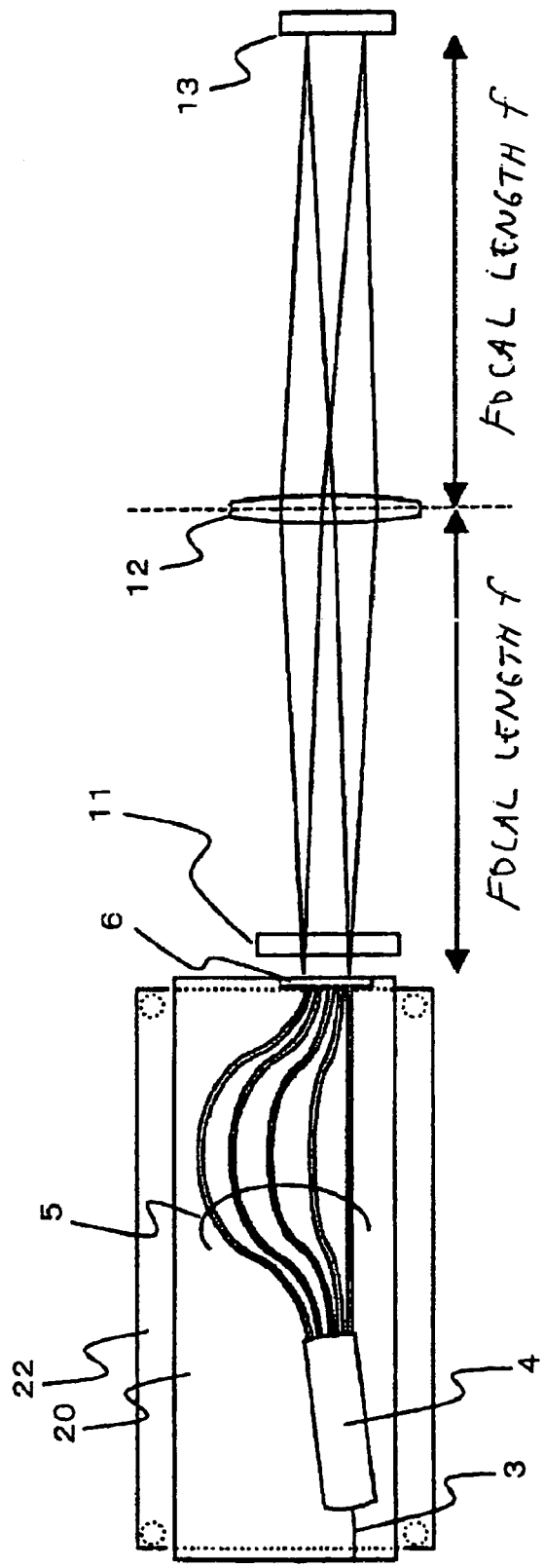
FIG. 22 is a plan view of the wavelength selective switch of Embodiment 4.
Figure 23:
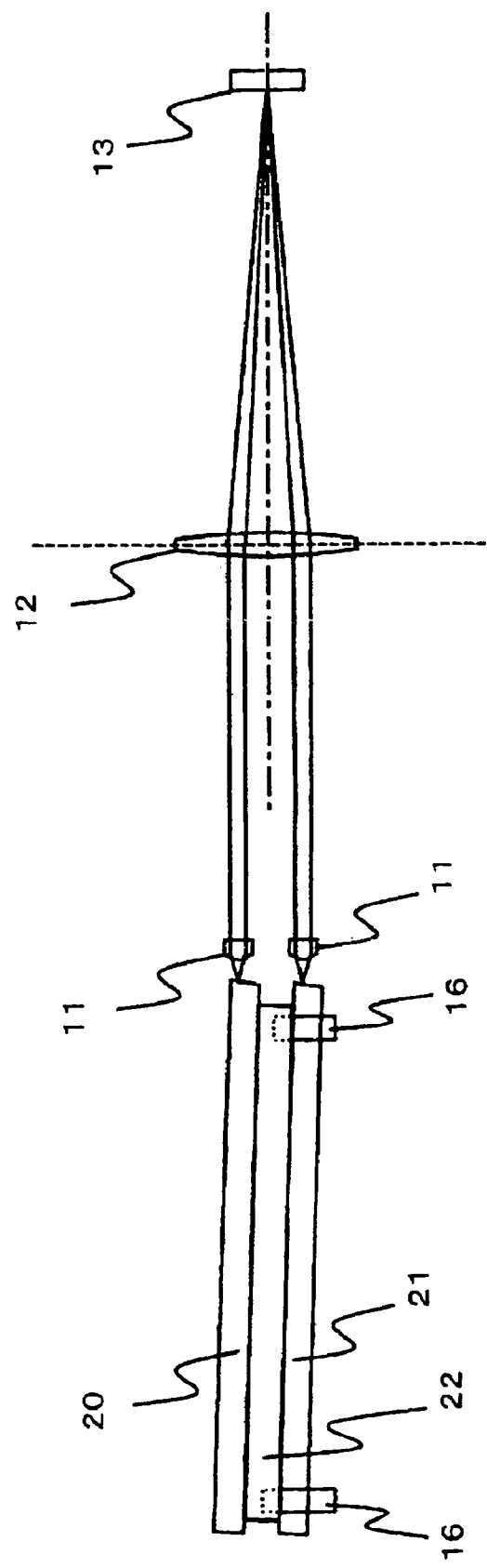
FIG. 23 is a side view of the wavelength selective switch of Embodiment 4

FIG. 22 and FIG. 23 show an example of embodiment of the optical functional device of the present invention. FIG. 23 shows a plan view of a wavelength selective switch that is applied to 40-channel wavelength division multiplexed light with frequency intervals of 100 GHz, and FIG. 23 shows the side view thereof.

This example of embodiment is a configuration that is similar to the example of Embodiment 3, and it differs in that it is configured such that the input terminal face to input waveguide 3 of light signals and the output terminal face from output slab waveguide 6 are parallel.

In this example of embodiment as well, as with the example of Embodiment 2 described above, flattop and low-loss properties can be obtained. Moreover, because it is compact and there are few parts to assemble, it is possible to realize wavelength selective switches as low-loss optical functional devices without troublesome assembly.

Furthermore, in this example of embodiment, by directly mounting the combining/branching devices on the heater, it is possible to realize a wavelength selective switch that has even fewer components than the example of Embodiment 2, and has thinner wavelength combining/branching filter parts.

Moreover, by establishing output slab waveguide 6, it is possible to restrict the variation of channel waveguide length with the precision of the photomask used at the time of core processing, and it is also possible to restrict nonadjacent crosstalk.

Example of Embodiment 5

Figure 24:
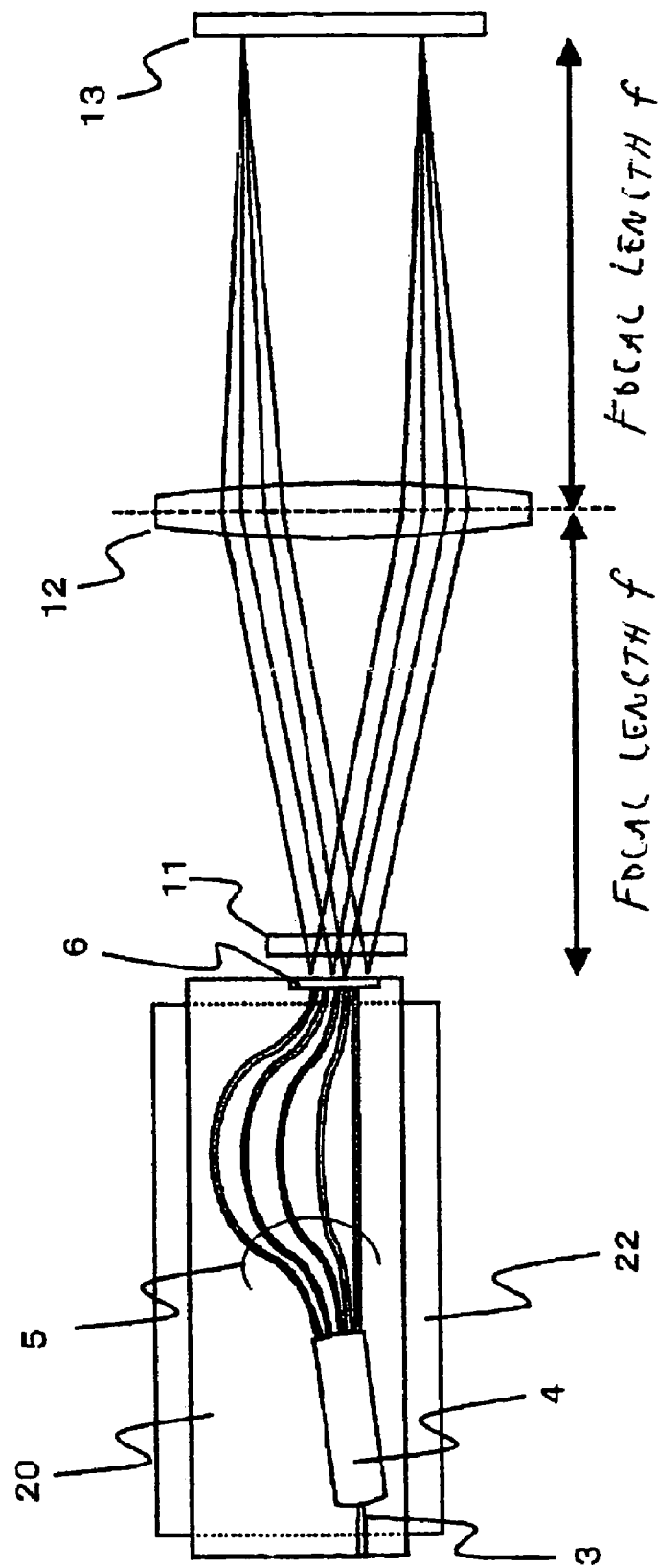
FIG. 24 is a plan view of the dynamic gain equalizer (DGEQ) of Embodiment 5.
Figure 25:
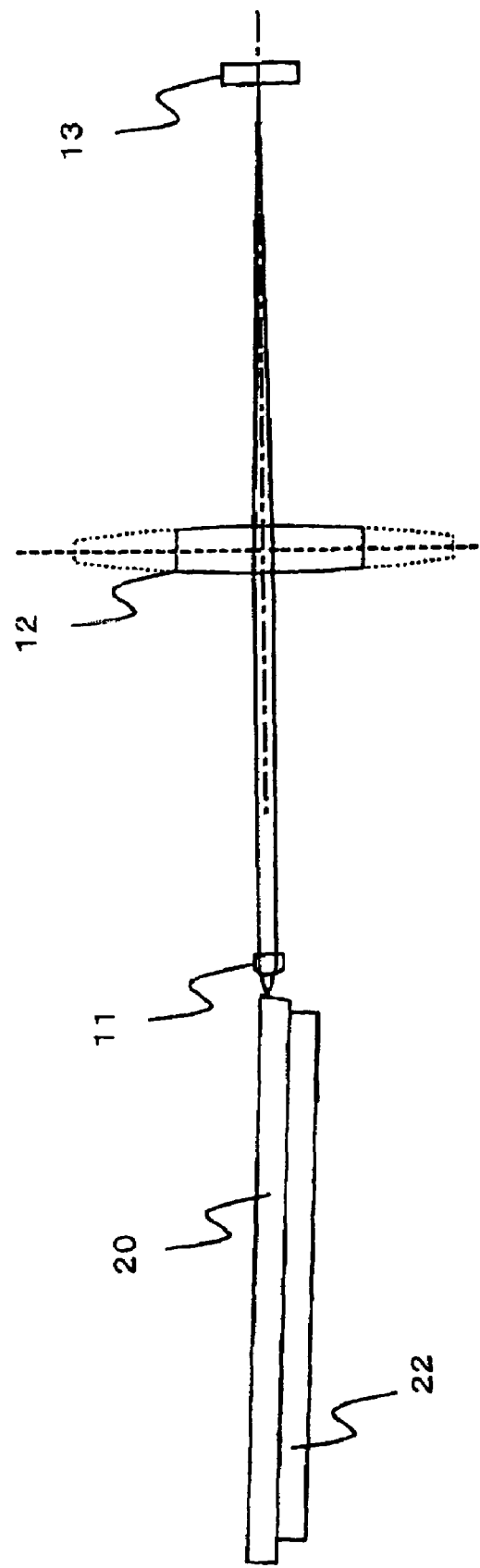
FIG. 25 is a side view of the DGEQ of Embodiment 5.

FIG. 24 and FIG. 25 show an example of embodiment of the optical functional device of the present invention. FIG. 24 shows a plan view of a wavelength DGEQ that is applied to 40-channel wavelength division multiplexed light with frequency intervals of 100 GHz, and FIG. 25 shows the side view thereof.

The DGEQ of this example of embodiment uses only one of the combining/branching devices from among the components of the wavelength selective switch of the example of Embodiment 4 described above, and it is configured such that the intensity of light that returns to the combining/branching device is regulated by changing the angles of the mirrors corresponding to each wavelength.

In FIG. 24 and FIG. 25, combining/branching device 20 for 40 channels with 100 GHz frequency intervals is mounted on heater 22.

This combining/branching device 20 is comprised of input slab waveguide 4, input waveguide 3 as an input terminal that inputs light into this input slab waveguide 4, output slab waveguide 6 having an output terminal, and channel waveguide array 5 comprising multiple channel waveguides with different lengths in which light is inputted from input slab waveguide 4 and light is outputted to output slab waveguide 6.

Here, the length of the output slab waveguide in this example of embodiment is 500 µm.

When wavelength multiplexed light of 40 channels with 100 GHz frequency intervals enters input waveguide 3 of combining/branching device 20, it freely propagates through input slab waveguide 4, reaches channel waveguide array 5, and optically couples. Therefore, the power of the input light is distributed to each channel waveguide that constitutes channel waveguide array 5.

The light within each channel waveguide that constitutes channel waveguide array 5 causes phase shifts corresponding to its wavelength and it is outputted from the output terminal, and due to interference, it exits as parallel light in an angular dispersion direction based on each wavelength.

Light that is branched into each wavelength by channel waveguide array 5 in this way is led to cylindrical lens 11, and becomes parallel light with respect to the vertical direction (equivalent to the vertical direction of the page surface in FIG. 25).

Moreover, lens 12 is established as an optical device that focuses light, having each wavelength generating angular dispersion with combining/branching device 20, into different positions based on the angular dispersion directions.

Furthermore, mirror array 13 comprising multiple mirrors is arranged as a light reflection device that is established in at least one position in which light of each frequency generating this angular dispersion is nearly focused, and light of each frequency branched by combining/branching device 20 is fed into this array.

As shown in FIG. 18, forty mirrors corresponding to each branched wavelength are arranged on mirror array 13. Light is reflected with these mirrors, the angle of each mirror is adjusted as necessary, and all of the light is either returned to the output terminal of output slab waveguide 6 of combining/branching device 20 along the same light path, or the quantity of light that returns to the output terminal of output slab waveguide 6 is reduced. In this way, the quantity of light to be returned can be adjusted by the angle of the mirror.

Therefore, by using a mirror for which the angle of the reflection surface can be electrically controlled, for example, with respect to wavelength division multiplexed light that is fed into combining/branching device 20, it functions as a DGEQ that is able to independently and dynamically attenuate the intensity of light of each wavelength.

In this way, through this example of embodiment, flattop and low-loss transmission properties can be obtained. Moreover, because it is compact and there are few parts to assemble, it is possible to realize DGEQs as low-loss optical functional devices without troublesome assembly.

Example of Embodiment 6

Figure 26:
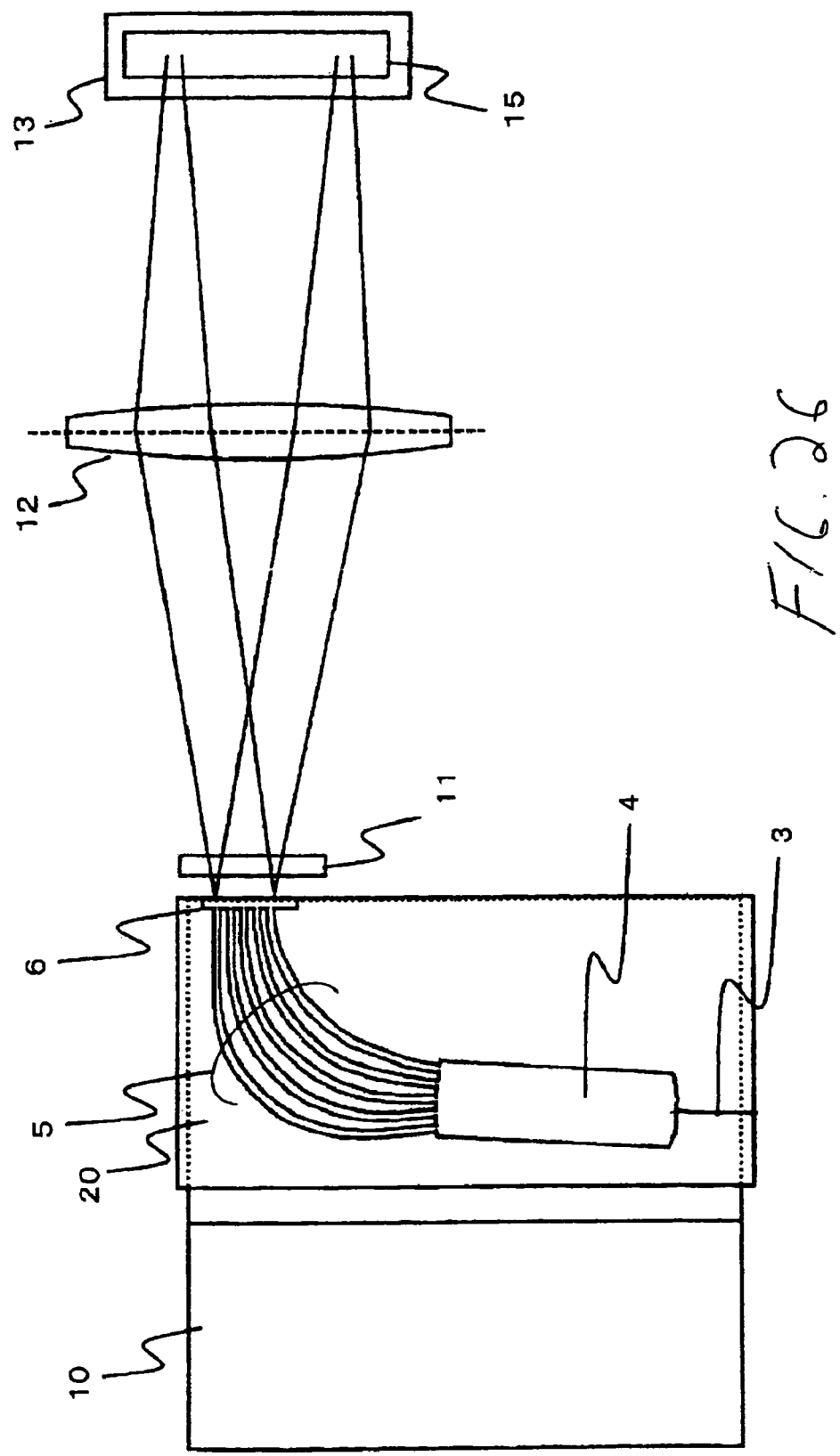
FIG. 26 is a plan view of the wavelength selective switch of Embodiment 6.
Figure 27:
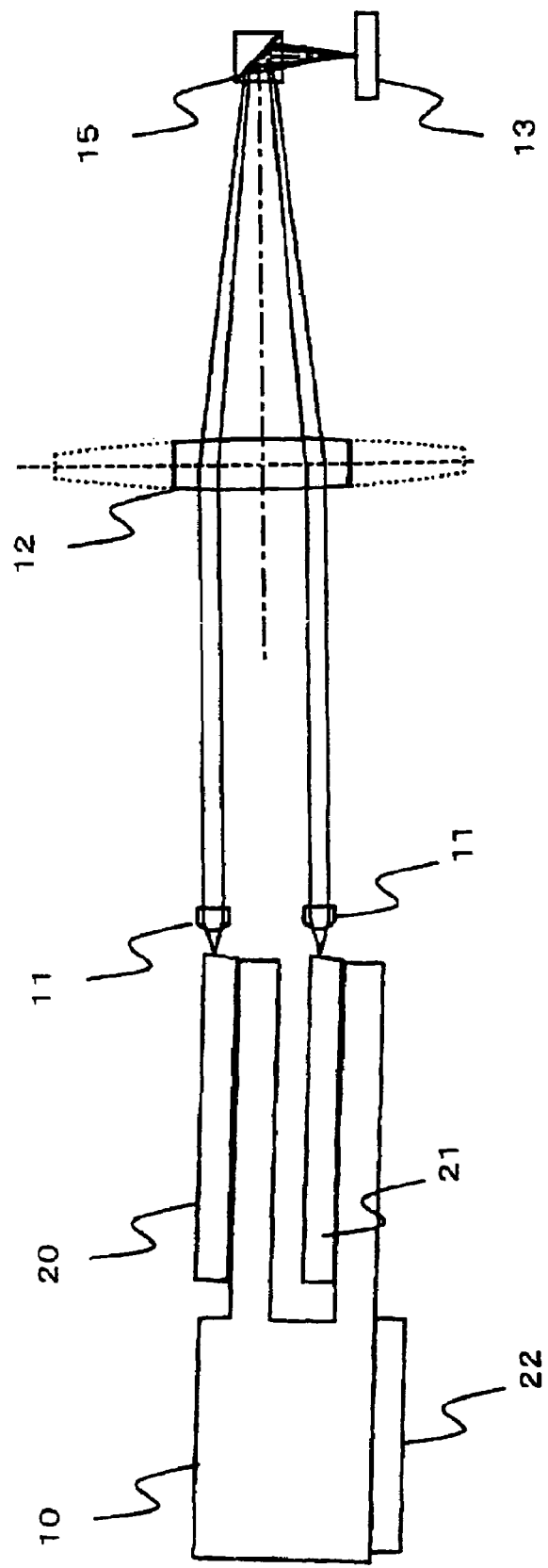
FIG. 27 is a side view of the wavelength selective switch of Embodiment 6.

FIG. 26 and FIG. 27 show an example of embodiment of the optical functional device of the present invention. FIG. 26 shows a plan view of a wavelength selective switch that is applied to 40-channel wavelength division multiplexed light with frequency intervals of 100 GHz, and FIG. 27 shows the side view thereof.

This example of embodiment is a configuration that is similar to the example of Embodiment 2, and it differs in that (a) 45-degree mirror 15 is inserted between lens 12 and mirror array 13 as a device for converting light paths by 90 degrees, and it is configured such that the mounting surfaces of combining/branching devices 20 and 21 and the mounting surface of mirror array 13 are parallel to one another, and (b) a short output slab waveguide 6 is established on the emitting end part of the combining/branching device.

In this example of embodiment as well, flattop and low-loss transmission properties can be obtained. Moreover, because it is compact and there are few parts to assemble, it is possible to realize wavelength selective switches as low-loss optical functional devices without troublesome assembly.

Furthermore, through this example of embodiment, because the light path between lens 12 and mirror array 13 is changed by 90 degrees by 45-degree mirror 15, it is possible to reduce the dimensions in the longitudinal direction. Moreover, because it is configured such that the mounting surfaces of combining/branching devices 20 and 21 and the mounting surface of mirror array 13 are parallel to one another, in FIG. 27, for example, it is also possible to efficiently mount heater 22 and mirror array 13 on the same substrate.

Moreover, by establishing output slab waveguide 6, it is possible to restrict the variation of channel waveguide lengths with the precision of the photomask used at the time of core processing, and it is also possible to restrict nonadjacent crosstalk.

Example of Embodiment 7

Figure 28:
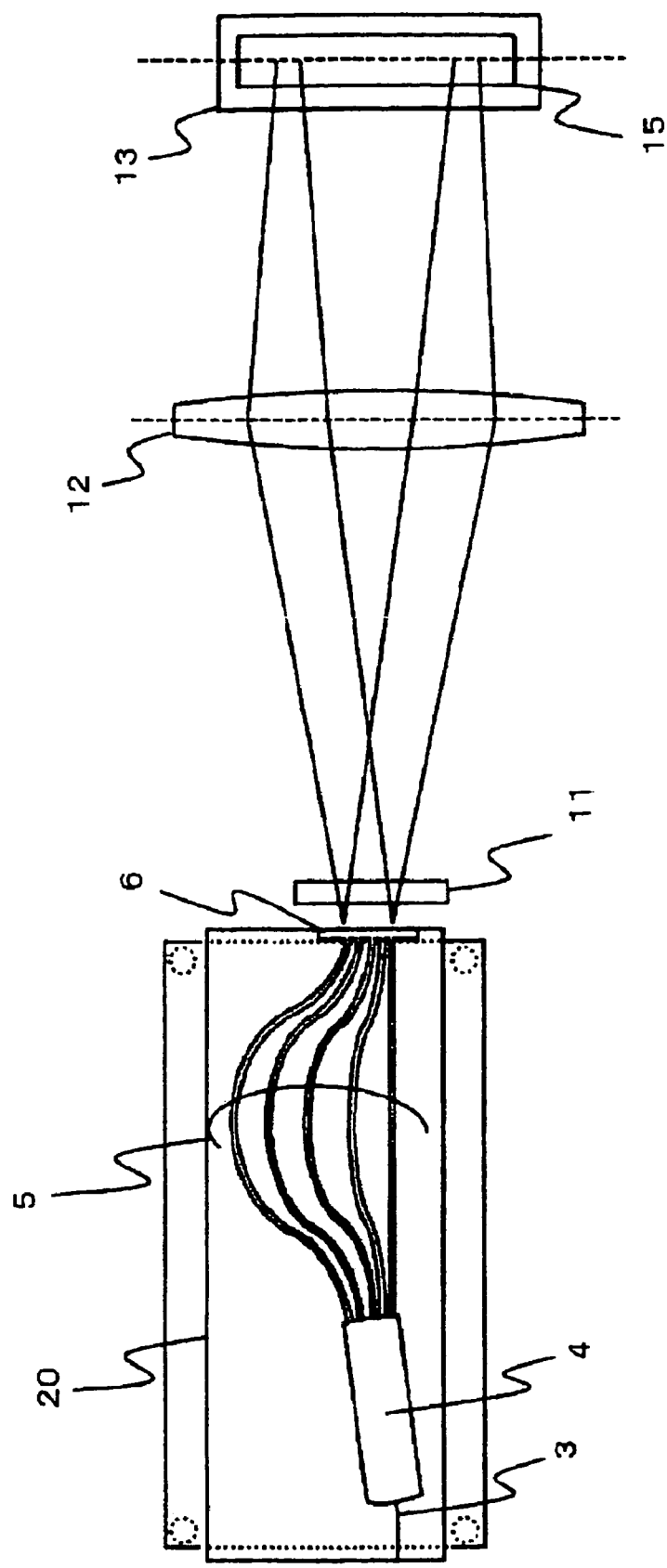
FIG. 28 is a plan view of the wavelength selective switch of Embodiment 7.
Figure 29:
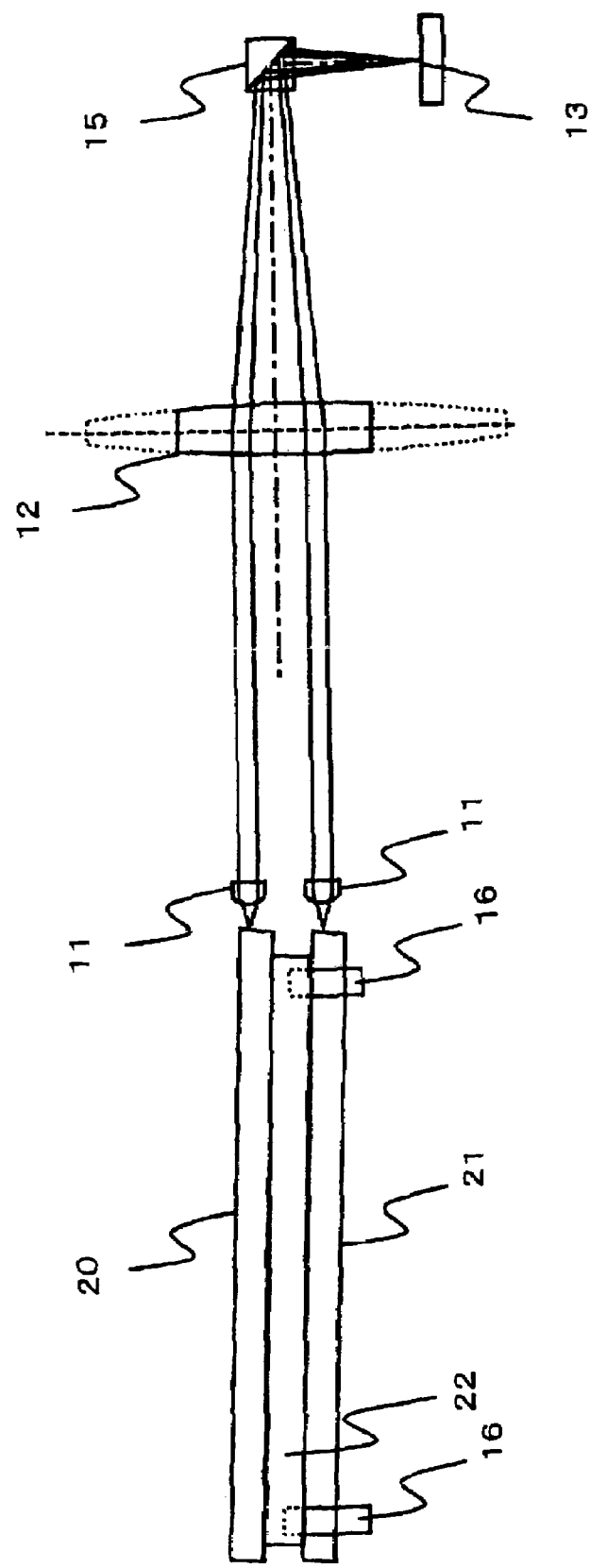
FIG. 29 is a side view of the wavelength selective switch of Embodiment 7.

FIG. 28 and FIG. 29 show an example of embodiment of the optical functional device of the present invention. FIG. 28 shows a plan view of a wavelength selective switch that is applied to 40-channel wavelength division multiplexed light with frequency intervals of 100 GHz, and FIG. 29 shows the side view thereof.

This example of embodiment is a configuration that is similar to the example of Embodiment 4, and it differs in that 45-degree mirror 15 is inserted between lens 12 and mirror array 13 as an element for converting light paths by 90 degrees, and it is configured such that the mounting surfaces of combining/branching devices 20 and 21 and the mounting surface of mirror array 13 are parallel to one another.

In this example of embodiment as well, as with the example of Embodiment 4 described previously, flattop and low-loss transmission properties can be obtained. Moreover, because it is compact and there are few parts to assemble, it is possible to realize wavelength selective switches as low-loss optical functional devices without troublesome assembly.

Furthermore, through this example of embodiment, because the light path between lens 12 and mirror array 13 is changed by 90 degrees, it is possible to reduce the dimensions in the longitudinal direction. Moreover, because it is configured such that the mounting surfaces of combining/branching devices 20 and 21 and the mounting surface of mirror array 13 are parallel to one another, in FIG. 27, for example, it is also possible to efficiently mount heater 22 and mirror array 13 on the same substrate.

Moreover, by establishing output slab waveguide 6, it is possible to restrict the variation of channel waveguide lengths with the precision of the photomask used at the time of core processing, and it is also possible to restrict nonadjacent crosstalk.

Example of Embodiment 8

Figure 30:
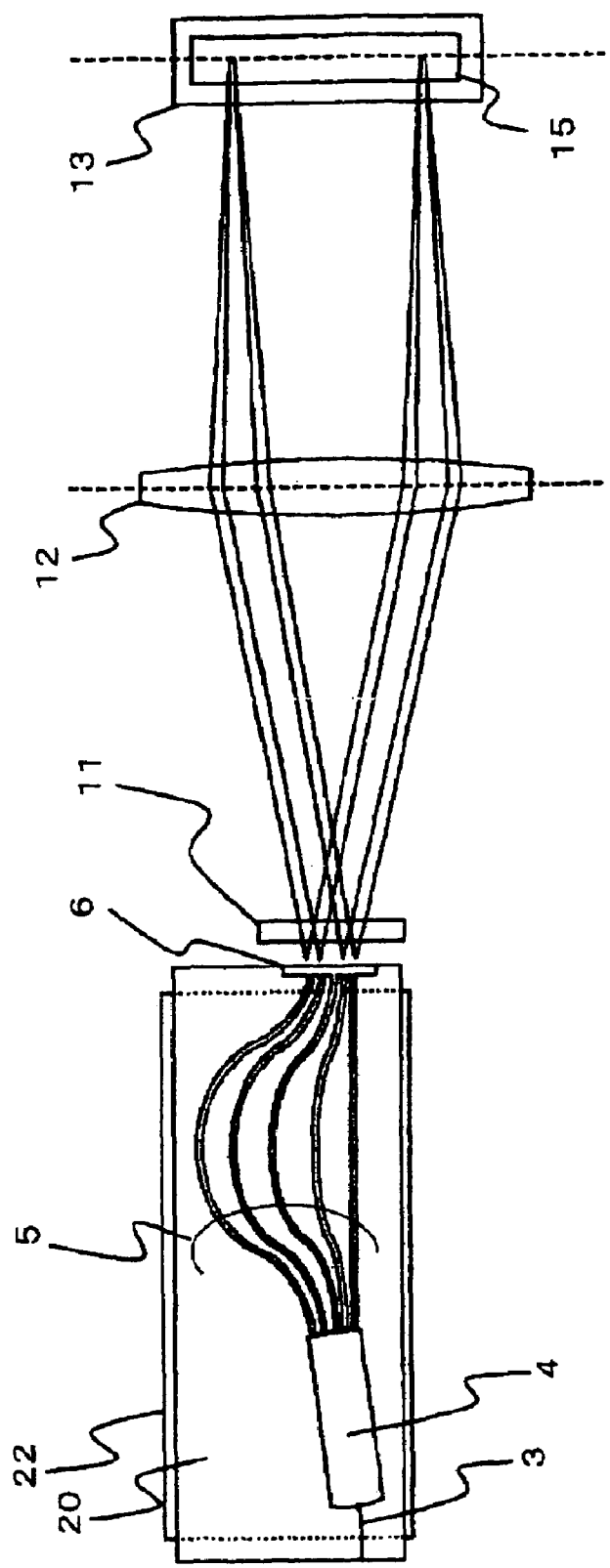
FIG. 30 is a plan view of the DGEQ of Embodiment 8.
Figure 31:
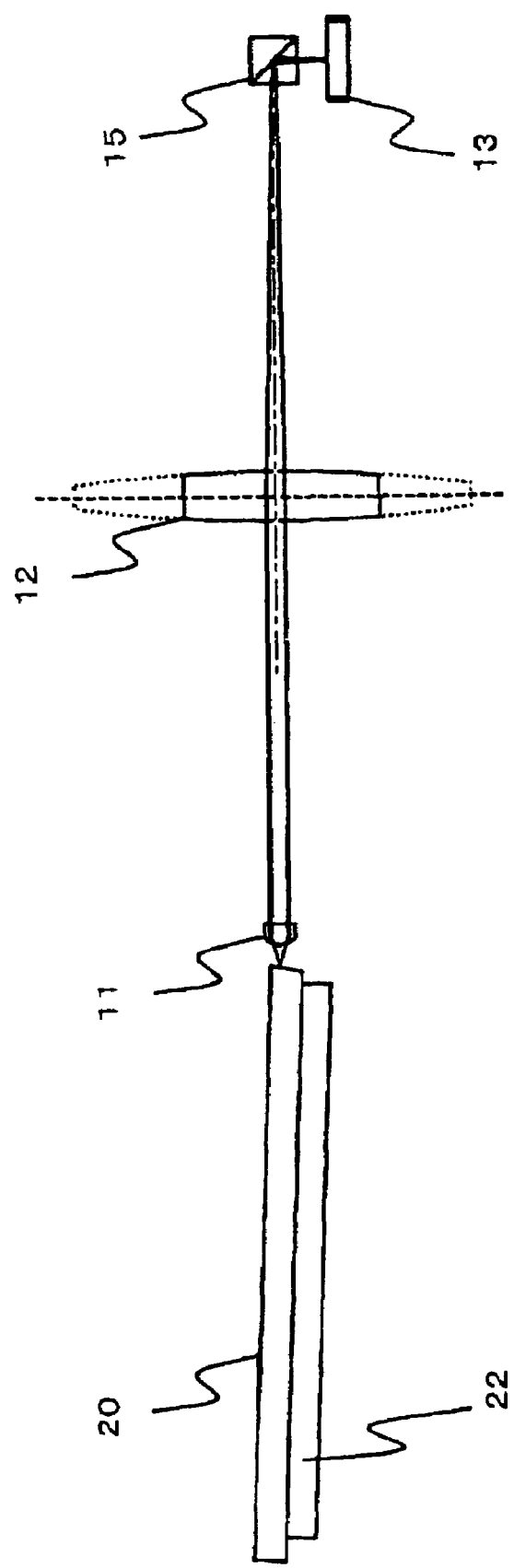
FIG. 31 is a side view of the DGEQ of Embodiment 8

FIG. 30 and FIG. 31 show an example of embodiment of the optical functional device of the present invention. FIG. 30 shows a plan view of a DGEQ that is applied to 40-channel wavelength division multiplexed light with frequency intervals of 100 GHz, and FIG. 31 shows the side view thereof.

This example of embodiment is a configuration that is similar to the example of Embodiment 5, and it differs in that 45-degree mirror 15 is inserted between lens 12 and mirror array 13 as an element for converting light paths by 90 degrees, and it is configured such that the mounting surface of combining/branching device 20 and the mounting surface of mirror array 13 are parallel to one another.

In this example of embodiment as well, as in the example of Embodiment 5 described previously, flattop and low-loss properties can be obtained. Moreover, because it is compact and there are few parts to assemble, it is possible to realize DGEQs as low-loss optical functional devices without troublesome assembly.

Furthermore, through this example of embodiment, because the light path between lens 12 and mirror array 13 is changed by 90 degrees by 45-degree mirror 15, it is possible to reduce the dimensions in the longitudinal direction. Moreover, because it is configured such that the mounting surface of combining/branching device 20 and the mounting surface of mirror array 13 are parallel to one another, in FIG. 31, for example, it is possible to efficiently mount heater 22 and mirror array 13 on the same substrate.

Moreover, by establishing output slab waveguide 6, it is possible to restrict the variation of channel waveguide lengths with the precision of the photomask used at the time of core processing, and it is also possible to restrict nonadjacent crosstalk.

Example of Embodiment 9

Figure 32:
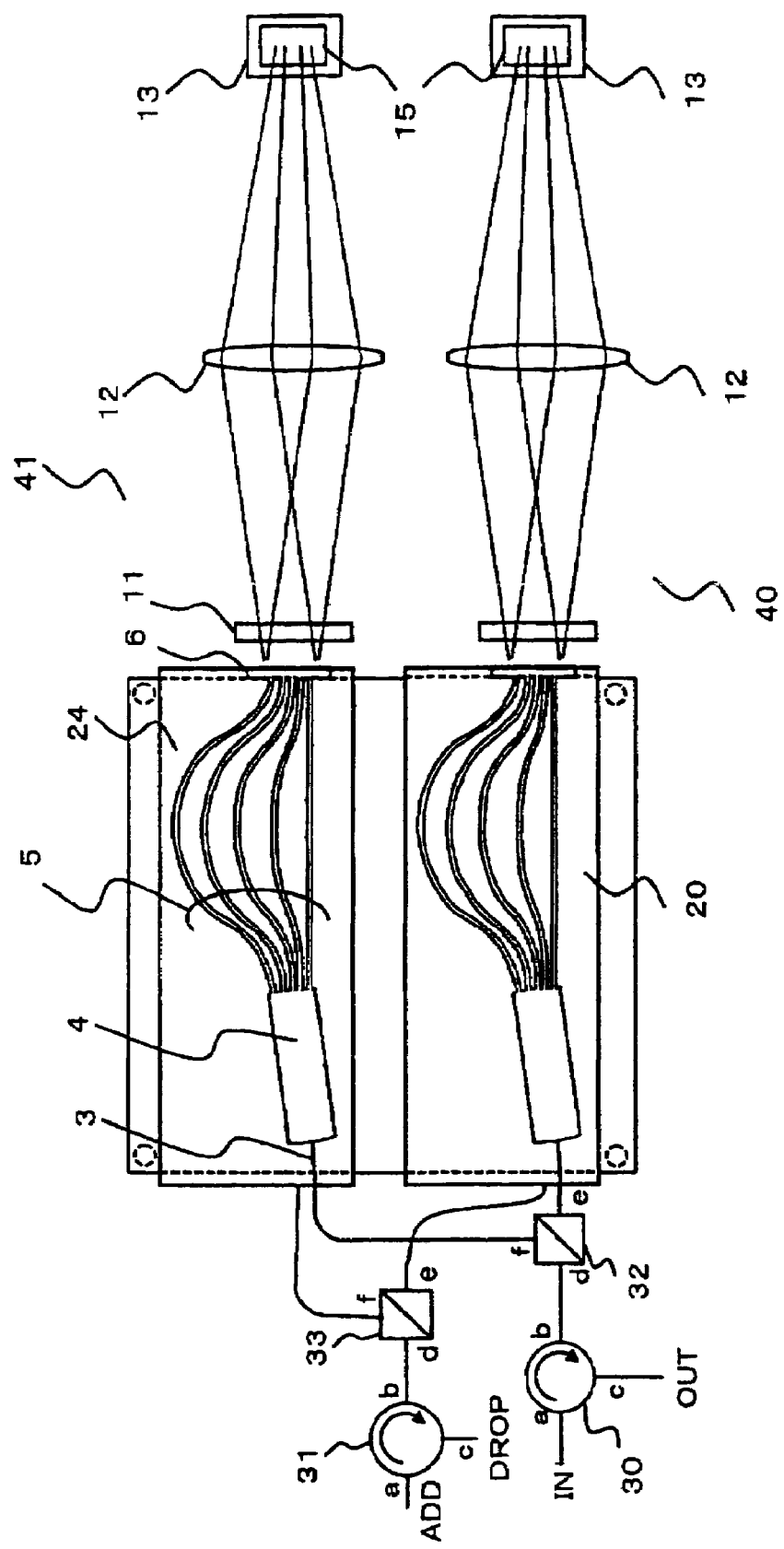
FIG. 32 is a plan view of the wavelength selective switch of Embodiment 9.
Figure 33:
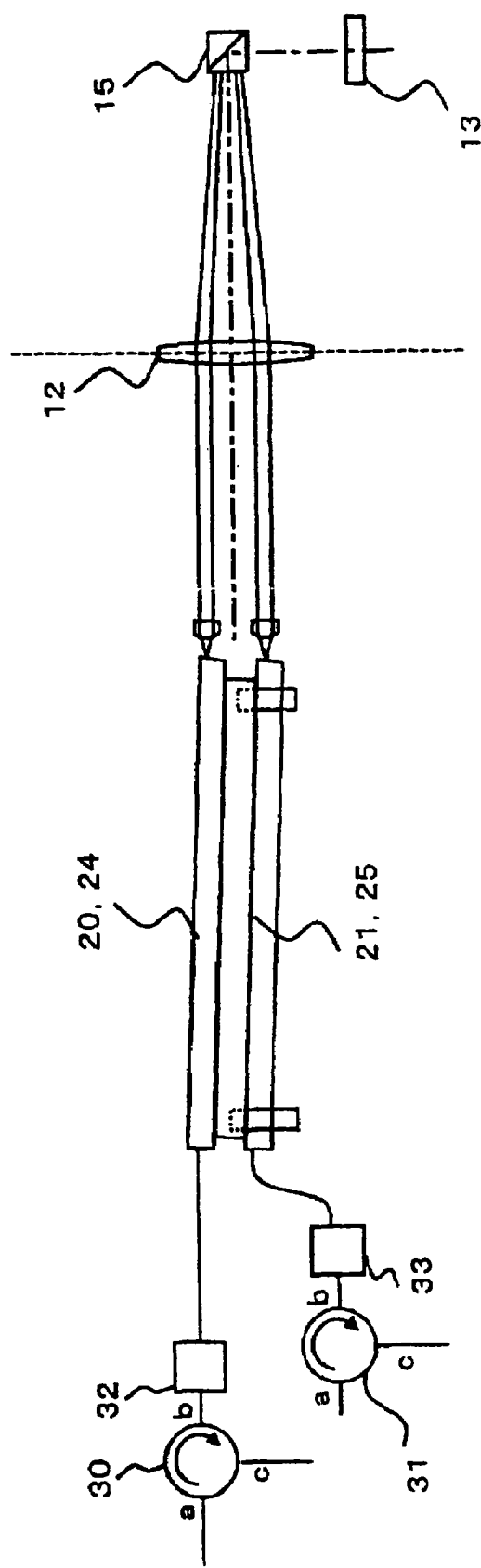
FIG. 33 is a side view of the wavelength selective switch of Embodiment 9.

FIG. 32 and FIG. 33 show an example of embodiment of the optical functional device of the present invention. FIG. 33 shows a plan view of a frequency selection switch that is applied to 40-channel wavelength division multiplexed light with frequency intervals of 100 GHz, and FIG. 33 shows the side view thereof. In FIG. 32 and FIG. 33, optical circulators 30 and 31 and filters 32 and 33 are schematically represented.

In FIG. 32 and FIG. 33, optical circulators 30 and 31 are an example of an optical device that outputs to a second port (b) light that was inputted to the first port (a), and outputs to a third port (c) light that was inputted to the second port (b).

In FIG. 32, if 40-channel wavelength division multiplexed light with 100 GHz frequency intervals is inputted from port a (IN port) of optical circulator 30, then the light reaches filter 32 by way of port b.

Moreover, if wavelength division multiplexed light comprising light of wavelengths added to the wavelength division multiplexed light described above is inputted from port a (ADD port) of optical circulator 31, then the light reaches filter 33 by way of port b.

Here, filters 32 and 33 are configured such that if 40-channel wavelength division multiplexed light with 100 GHz frequency intervals is inputted from input/output terminal d, then light from the wavelength spectrum of the 20 channels on the short wavelength side is outputted from input/output terminal e, and light from the wavelength spectrum of the 20 channels on the long wavelength side is outputted from input/output terminal f. Conversely, if light from the wavelength spectrum of the 20 channels on the short wavelength side and light from the wavelength spectrum of the 20 channels on the long wavelength side are inputted from input/output terminals e and f, respectively, then the light from these frequency spectrums combines and is outputted from input/output terminal d.

Wavelength division multiplexed light of the 20 channels on the short wavelength side is guided into wavelength selective switch 40 and branched into each channel by combining/branching device 20 and combining/branching device 21 that is mounted below combining/branching device 20, respectively, and it is led to either combining/branching device 20 or combining/branching device 21 according to the angle of the mirror corresponding to each wavelength constituting mirror array 13.

The light of each wavelength that is guided to combining/branching device 20 and combining/branching device 21 is combined, and it is outputted to port c of optical circulator 30 (OUT port) and port c of optical circulator 31 (DROP port), respectively, by way of filter 32 and filter 33, respectively.

On the other hand, wavelength division multiplexed light of the 20 channels on the long wavelength side is guided into wavelength selective switch 41 and branched into each channel by combining/branching device 24 and combining/branching device 25 that is mounted below combining/branching device 24, respectively, and it is led to either combining/branching device 24 or combining/branching device 25 according to the angle of the mirror corresponding to each wavelength constituting mirror array 13.

The light of each wavelength that is guided to combining/branching device 24 and combining/branching device 25 is combined. It is then combined with light that was combined by combining/branching device 20 and combining/branching device 21 described above by way of filter 32 and filter 33, respectively, and it is outputted to port c of optical circulator 30 (OUT port) and port c of optical circulator 31 (DROP port), respectively.

Here, from among the spectrum of 40 channels with 100 GHz frequency intervals, which is the spectrum of input light, wavelength selective switch 40 is configured to be applied to wavelength division multiplexed light of the wavelength spectrum of the 20 channels on the short wavelength side, and wavelength selective switch 41 is configured to be applied to wavelength division multiplexed light of the wavelength spectrum of the 20 channels on the long wavelength side. Twenty mirrors corresponding to each branched wavelength are arranged on mirror array 13 of each of the wavelength selective switches.

In this way, through this example of embodiment, flattop and low-loss properties can be obtained. Moreover, because it is compact and there are few parts to assemble, it is possible to realize wavelength selective switches as low-loss optical functional devices without troublesome assembly.

Furthermore, through this example of embodiment, it is possible to configure the wavelength selective switch applied to 40 channels with 100 GHz frequency intervals as four combining/branching devices applied to 20 channels with 100 GHz frequency intervals. As for the combining/branching devices applied to 20 channels with 100 GHz frequency intervals, because it is possible to use combining/branching devices with diffraction orders that are higher than combining/branching devices applied to 40 channels with 100 GHz frequency intervals, it is possible to enlarge the diffraction angles. Furthermore, it is possible to make the focal distance f of lens 12 short, and miniaturization in this focal length direction is also possible.

Here, each of the combining/branching devices that constitute wavelength selective switches 40 and 41 is comprised of input slab waveguide 4, input waveguide 3 as an input terminal that inputs light into this input slab waveguide 4, output slab waveguide 6 having an output terminal, and channel waveguide array 5 comprising multiple channel waveguides with different lengths in which light is inputted from input slab waveguide 4 and light is outputted to output slab waveguide 6.

Moreover, the length of the output slab waveguides in this example of embodiment is 500 μm.

The channel waveguide spacing at the output terminal is 14 μm. The diffraction angle difference between channels (100 GHz frequency intervals) of diffracted light emitted from the output terminal on the channel waveguide side at this time is 0.0034 rad/ch (diffraction order 60).

The diameter of cylindrical lens 11 is 2 mm, and the focal length is approximately 10 mm. The focal length of the convex lens is approximately 29.2 mm, and it is mounted in a position that is distanced from the combining/branching device output terminal by this focal length. The effective diameter of the lens is 9 mm.

Moreover, in FIG. 32, each combining/branching device is a configuration having output slab waveguides, but it is clear that the same functionality and effects are fulfilled by a configuration in which a channel waveguide array forms the output terminal rather than output slab waveguides.

Example of Embodiment 10

Figure 34:
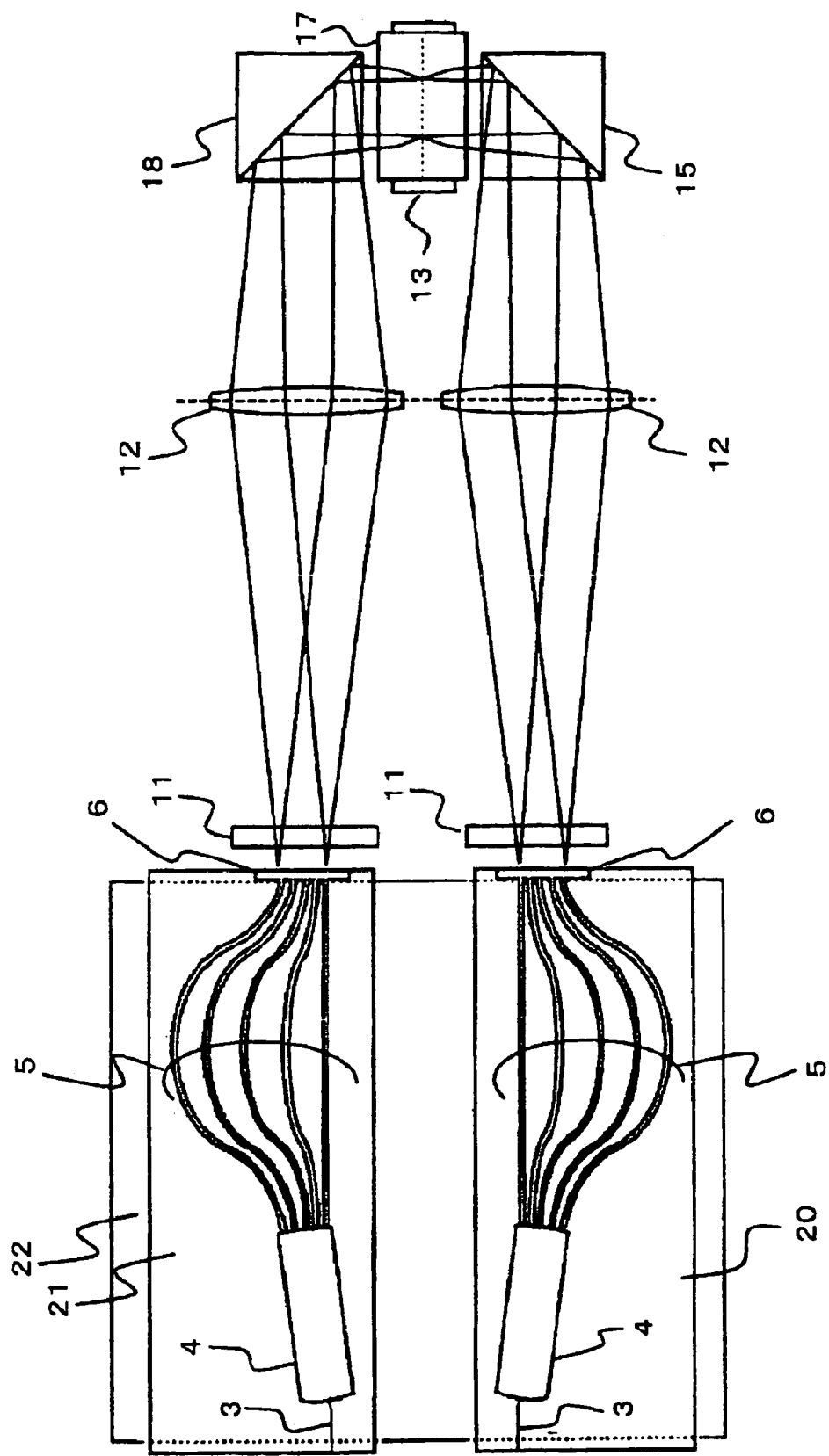
FIG. 34 is a plan view of the wavelength selective switch of Embodiment 10.
Figure 35:
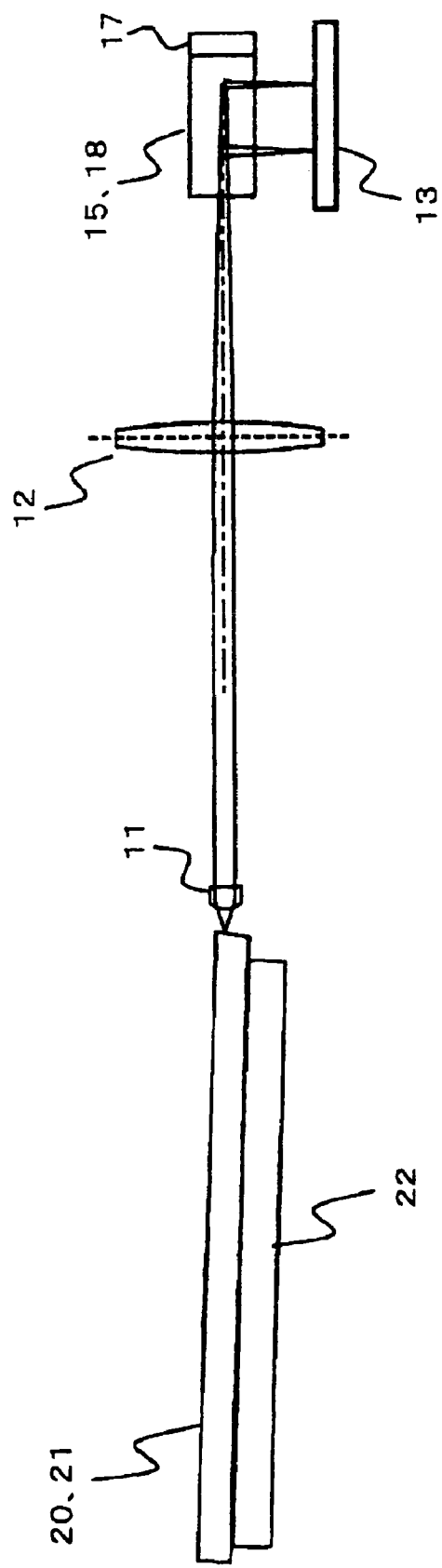
FIG. 35 is a side view of the wavelength selective switch of Embodiment 10.

FIG. 34 and FIG. 35 show an example of embodiment of the optical functional device of the present invention. FIG. 34 shows a plan view of a frequency selection switch that is applied to 40-channel wavelength division multiplexed light with frequency intervals of 100 GHz, and FIG. 35 shows the side view thereof.

In FIG. 34, the two combining/branching devices 20 and 21 for 40-channel multiplexing with 100 GHz frequency intervals are mounted in a line on the top face of heater 22.

Each mounted combining/branching device is comprised of input slab waveguide 4, input waveguide 3 as an input terminal that inputs light into this input slab waveguide 4, output slab waveguide 6 having an output terminal, and channel waveguide array 5 comprising multiple channel waveguides with different lengths in which light is inputted from input slab waveguide 4 and light is outputted to output slab waveguide 6.

Moreover, the length of the output slab waveguides in this example of embodiment is 500 μm.

Wavelength division multiplexed light is inputted to combining/branching device 20, light that was branched into each wavelength is sent to cylindrical lens 11, and the vertical direction is made into parallel light. This is focused with lens 12 and sent to mirror array 13, which is arranged in the position in which the light is focused.

At this time, the light is bent 90 degrees using 45-degree mirror 15. Furthermore, the light is bent to the diagonal lower side using one of the faces of 45-degree mirror 17, which has two reflection surfaces, and it is sent to mirror array 13 that is mounted on the bottom.

Mirrors 40 are arranged on mirror array 13 corresponding to at each wavelength at a pitch of 100 μm.

As necessary, the angle of the reflection surface with respect to the incident light of the mirror is changed, this is bent in the direction of 45-degree mirror 18 using a reflection surface of the double-faced 45-degree mirror 17 that is different from the surface to which light was sent from combining/branching device 20, and light of appropriate wavelengths is bent 90 degrees with this 45-degree mirror 18 and sent to combining/branching device 21.

Alternatively, the angle of the reflection surface with respect to the incident light of the mirror is changed, and light of appropriate wavelengths is returned to combining/branching device 20 using the same light path as the incident light path.

Here, each combining/branching device may be created separately with the same method as with the example of Embodiment 3 described previously, or two combining/branching devices may be created simultaneously on the same slab substrate.

In this example of embodiment as well, as with the example of Embodiment 4 described previously, flattop and low-loss properties can be obtained. Moreover, because it is compact and there are few parts to assemble, it is possible to realize wavelength selective switches as low-loss optical functional devices without troublesome assembly.

Furthermore, through this embodiment, it is possible to efficiently mount combining/branching device 20 and combining/branching device 21 on the same flat surface, and in order to change the light path between lens 12 and mirror array 13, it is possible to shorten the dimensions in the lengthwise direction.

Example of Embodiment 11

Figure 36:
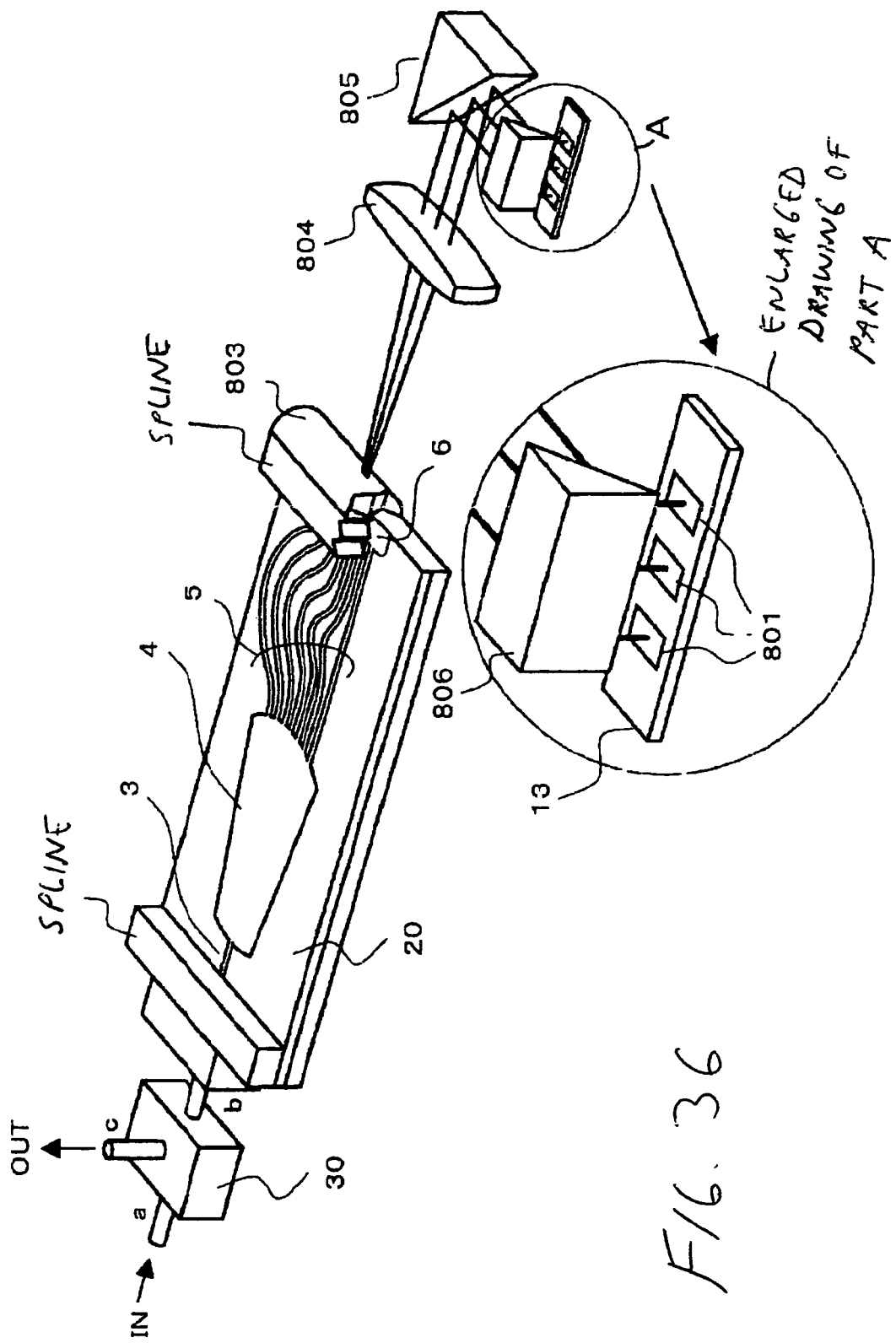
FIG. 36 shows a configuration example of the DGEQ of Embodiment 11.

FIG. 36 is an example of embodiment of the optical functional device of the present invention, a DGEQ that can dynamically control the light power levels of each channel (wavelength) in WDM communications.

In FIG. 36, the DGEQ of this example of embodiment is equipped with optical circulator 30 as an optical device that outputs to a second port (b) light that was inputted to the first port (a), and outputs to a third port (c) light that was inputted to the second port (b).

Combining/branching device 20 of this example of embodiment is comprised of input slab waveguide 4, input waveguide 3 as an input terminal that inputs light into this input slab waveguide 4, output slab waveguide 6, and channel waveguide array 5 comprising multiple channel waveguides with different lengths in which light is inputted from input slab waveguide 4 and light is outputted to output slab waveguide 6.

If wavelength division multiplexed light is inputted from the IN port (port (a)) of optical circulator 30, the input light generates angular dispersion with combining/branching device 20 and is branched into each wavelength. With an optics system that is comprised of cylindrical lens 803, lens 804 as an optical device for focusing light of each wavelength generating this angular dispersion into different positions based on the angular dispersion directions, and mirrors 805 and 806 as a device for changing light paths, the light is focused on multiple mirrors 801 corresponding to each wavelength (these light routes are called forward paths hereafter).

Here, if the angles of mirrors 801 are adjusted such that the reflection surfaces are nearly perpendicular to the incident light, then the light reflected with mirrors 801 when the reflection surfaces are precisely perpendicular to the incident light is sent back along the same route as the forward path, and the loss of light outputted from the OUT port of optical circulator 30 (this is called the return path) reaches a minimum. If it deviates from this angle, the intensity of light outputted from the OUT port of optical circulator 30 by way of the return path becomes small as the deviation becomes large.

In this way, it is possible to realize a device that can control the intensity of light of each wavelength that constitutes incident wavelength division multiplexed light by adjusting the angles of mirrors 801—in other words, it is possible to realize a DGEQ.

Through this example of embodiment, flattop and low-loss properties can be obtained. Moreover, because it is compact and there are few parts to assemble, it is possible to realize DGEQs as low-loss optical functional devices without troublesome assembly.

The concrete composition of the DGEQ of this example of embodiment will be explained hereinafter.

In FIG. 36, after a block (spline) made of, for example, borosilicate glass is adhered to the tip of combining/branching device 20, cylindrical lens 803 with a focal length of 10 mm is adhered, and the vertical direction of the output light is made into parallel light.

Lens 804 is arranged such that its focal point coincides with the boundary of the core pattern for channel waveguide array 5 and the core pattern for output slab waveguide 6 of combining/branching device 20. The light path is bent with mirrors 805 and 806, and mirror array 13 in which multiple mirrors 801 illustrated in FIG. 18 are arranged is established at the other focal point of lens 804.

Optical circulator 30 is connected to the input waveguide 3 side through a block (spline) made of, for example, borosilicate glass and signal mode fibers that are sandwiched by the borosilicate glass block.

Moreover, for the sake of convenience in FIG. 36, the light paths of light of three branched wavelengths are shown and only three mirrors 801 corresponding to these are shown, but it is obvious that the number of branched wavelengths and the number of mirrors 801 are not limited to these numbers.

Example of Embodiment 12

Figure 37:
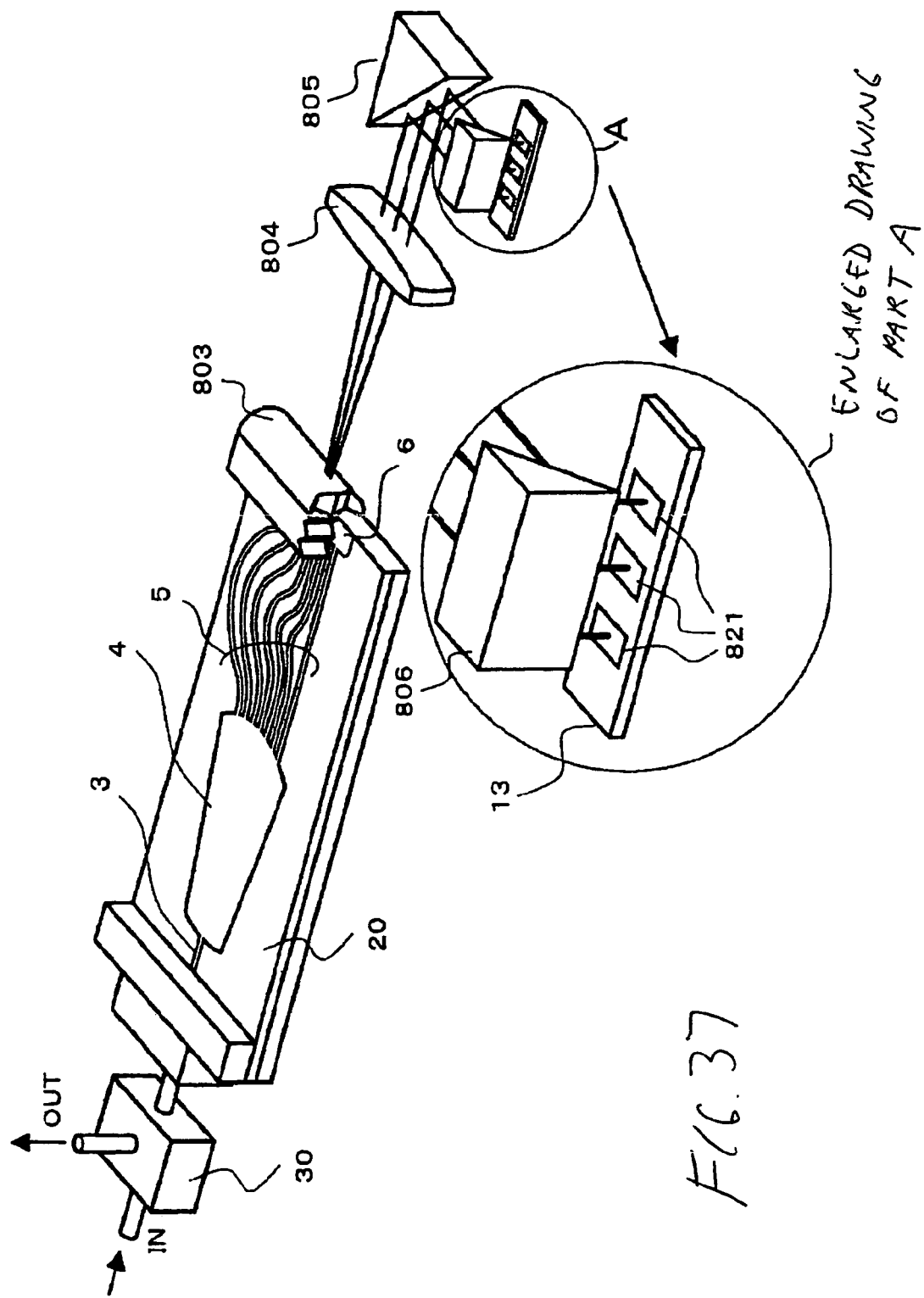
FIG. 37 shows a configuration example of the wavelength dispersion compensation device of Embodiment 12.

FIG. 37 is an example embodiment of the optical functional device of the present invention as a wavelength dispersion compensation device in WDM communications.

The configuration of the wavelength dispersion compensation device shown in FIG. 37 is almost the same as the configuration of the DGEQ shown in FIG. 36, and it differs in that each mirror that constitutes mirror array 13 is different from those shown in FIG. 18.

In other words, mirror array 13 shown in FIG. 37 is established in at least one position in which light of each wavelength generating angular dispersion with combining/branching device 20 is nearly focused, and it is arranged as a light reflection device in which the positions of the reflection surface normal line directions differ.

Figure 38A:
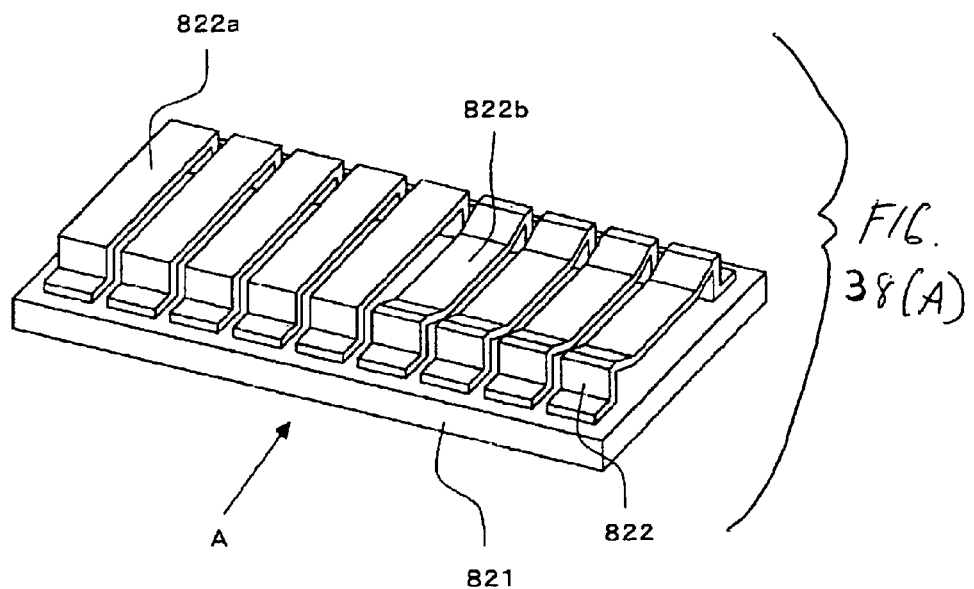
FIG. 38 shows a mirror configuration example.
Figure 38B:
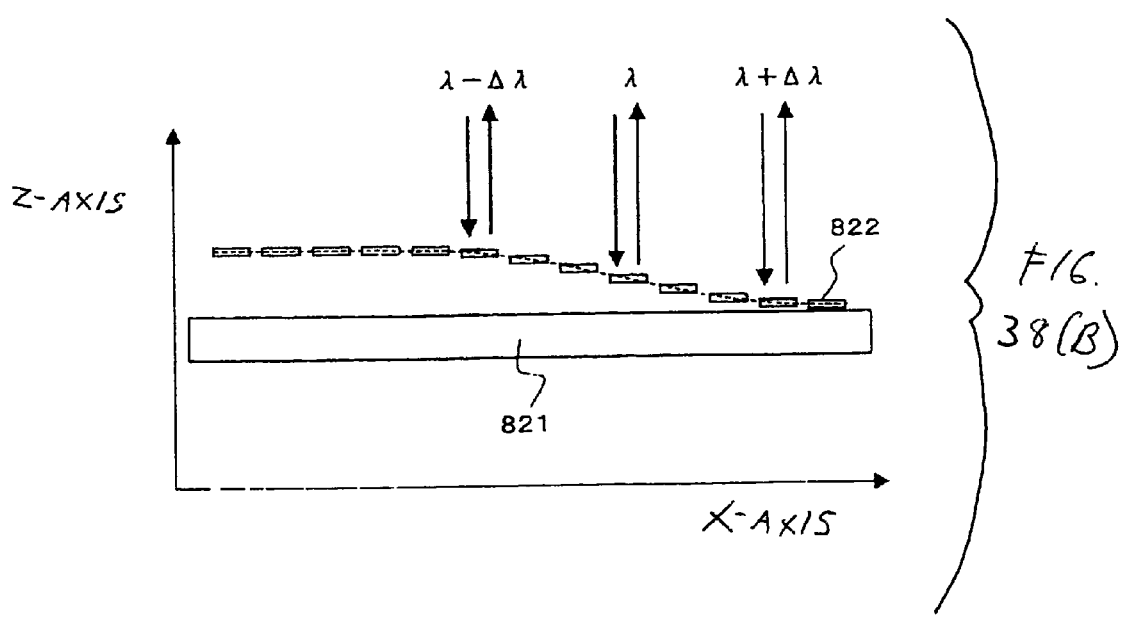

FIG. 38 is an example of the configuration of mirrors 821 that constitute mirror array 13 in FIG. 37. FIG. 38(a) is a block diagram of the entire mirror, and FIG. 38(b) is a diagram that cuts the mirror of FIG. 38(a) in the center of the reflection surface and schematically shows the cross section as viewed from the direction of A.

In FIG. 38, mirror 821 is comprised of multiple mirror elements 822, and the reflection surface of each mirror element is movable in the direction of its normal line. For example, the reflection surface of mirror element 822a is flat, and the reflection surface of mirror element 822b is concave, and the reflection surface has moved in the direction of the normal line.

The quantity of subduction when it has become concave is controlled—that is, the amount of reflection surface movement in the normal line direction is controlled. For example, it is controlled as illustrated in FIG. 38(b).

In FIG. 37, the wavelength dispersion compensation device of this embodiment is equipped with optical circulator 30 as an optical device that outputs to a second port (b) light that was inputted to the first port (a), and outputs to a third port (c) light that was inputted to the second port (b).

Combining/branching device 20 of this embodiment is comprised of input slab waveguide 4, input waveguide 3 as an input terminal that inputs light into this input slab waveguide 4, output slab waveguide 6, and channel waveguide array 5 comprising multiple channel waveguides with different lengths in which light is inputted from input slab waveguide 4 and light is outputted to output slab waveguide 6.

If wavelength division multiplexed light is inputted from the IN port (port (a)) of optical circulator 30, the input light generates angular dispersion with combining/branching device 20 and is branched into each wavelength. With an optics system that is comprised of cylindrical lens 803, lens 804 as an optical device for focusing light of each wavelength generating this angular dispersion into different positions based on the angular dispersion directions, and mirrors 805 and 806 as a device for changing light paths, the light is focused on multiple mirrors 821 corresponding to each wavelength (these light routes are called forward paths hereafter).

The light of each wavelength that is focused at this time has a constant wavelength spectrum, and if the center wavelength is $\lambda$, then light with wavelength $\lambda-\Delta\lambda$ that is slightly shorter than $\lambda$ and light with wavelength $\lambda+\Delta\lambda$ that is slightly longer than $\lambda$ also generate angular dispersion with the combining/branching device, and based on its wavelength, this light is focused at different positions than the light with wavelength $\lambda$.

Furthermore, the multiple mirror elements 822 are arranged in the line of the direction in which the angular dispersion is generated by the combining/branching device 20 (the x-axis direction in FIG. 38(b)). Regarding light of each wavelength within the aforementioned wavelength spectrum, by controlling each mirror element 822 such that the distances of the optical axis directions of the light are different, it is possible to control the delay time with each wavelength within this wavelength spectrum, and functionality as a wavelength dispersion compensation device is realized.

Through this embodiment, flattop and low-loss transmission properties can be obtained. Moreover, because it is compact and there are few parts to assemble, it is possible to realize wavelength dispersion compensation devices as low-loss optical functional devices without troublesome assembly.

Moreover, in the embodiment of the DGEQ configured using the combining/branching device of the present invention, it is obvious that utilization as a wavelength dispersion compensation device is possible by using the configuration illustrated in FIG. 38 for the mirrors corresponding to each branched wavelength.

Furthermore, for the sake of convenience in FIG. 37, the light paths of the light of three branched wavelengths are shown and only three mirrors 821 corresponding to these are shown, but it is obvious that the number of branched wavelengths and the number of mirrors 821 are not limited to these numbers.

Embodiment 13

Figure 39:
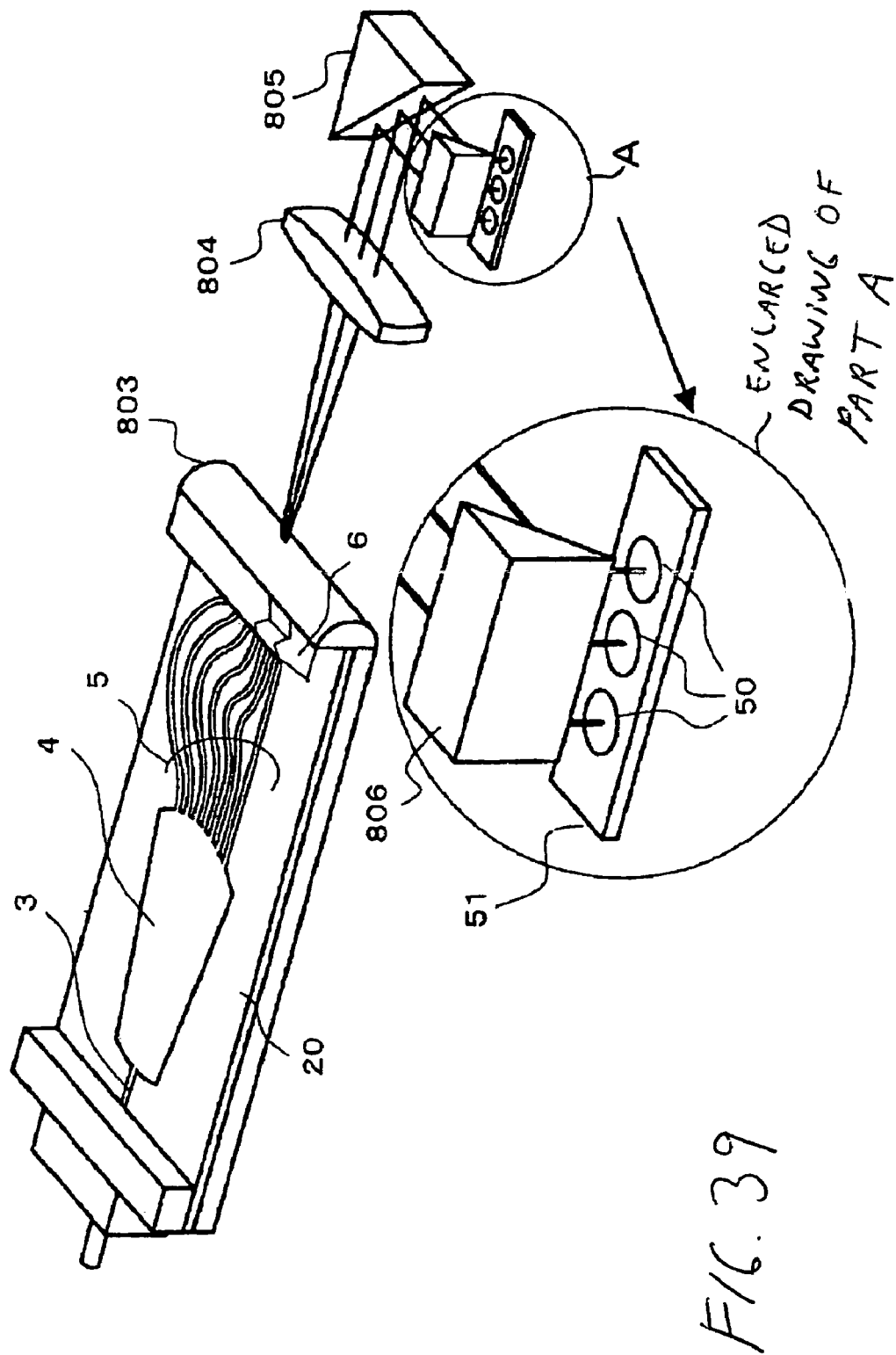
FIG. 39 shows a configuration example of the optical power monitor (OPM) of Embodiment 13.

FIG. 39 is an example embodiment of the optical functional device of the present invention as a monitoring device for the light power levels of each channel (wavelength) in WDM communications (hereafter, such a device is called an optical power monitor, abbreviated OPM).

The OPM shown in FIG. 39 is a configuration in which mirror array 13 of the DGEQ shown in FIG. 36 is replaced by photoelectric conversion element array 51 equipped with multiple photoelectric conversion elements 50 as a photoelectric conversion device, and optical circulator 30 is removed. Other than these parts, it is identical to the configuration shown in FIG. 36.

In FIG. 39, combining/branching device 20 is comprised of input slab waveguide 4, input waveguide 3 as an input terminal that inputs light into this input slab waveguide 4, output slab waveguide 6, and channel waveguide array 5 comprising multiple channel waveguides with different lengths in which light is inputted from input slab waveguide 4 and light is outputted to output slab waveguide 6.

Furthermore, photoelectric conversion elements 50 are arranged as a photoelectric conversion device established in at least one position in which the light of each wavelength generating angular dispersion with combining/branching device 20 is nearly focused.

If wavelength division multiplexed light is inputted from input waveguide 3, the input light generates angular dispersion with combining/branching device 20 and is branched into each wavelength. With an optical system that is comprised of cylindrical lens 803, lens 804 as an optical device for focusing light of each wavelength generating this angular dispersion into different positions based on the angular dispersion directions, and mirrors 805 and 806 as a device for changing light paths, the light is focused on multiple photoelectric conversion elements 50 corresponding to each wavelength. This enables the monitoring of the light power levels of each wavelength, thus fulfilling functionality as an OPM.

As for the photoelectric conversion element array 51 in this embodiment, the pitch of the optical receiver part is 100 $\mu$m and the diameter of the optical receiver part is 50 $\mu$m.

Through this embodiment, flattop and low-loss transmission properties can be obtained. Moreover, because it is compact and there are few parts to assemble, it is possible to realize OPMs as low-loss optical functional devices without troublesome assembly.

Furthermore, this can be created using almost all of the components of the DGEQ shown in Embodiment 11 in common.

Moreover, for the sake of convenience in FIG. 39, the light paths of light of three branched wavelengths are shown and only three photoelectric conversion elements 50 corresponding to these are shown, but it is obvious that the number of branched wavelengths and the number of photoelectric conversion elements 50 are not limited to these numbers.

Embodiment 14

Figure 40:
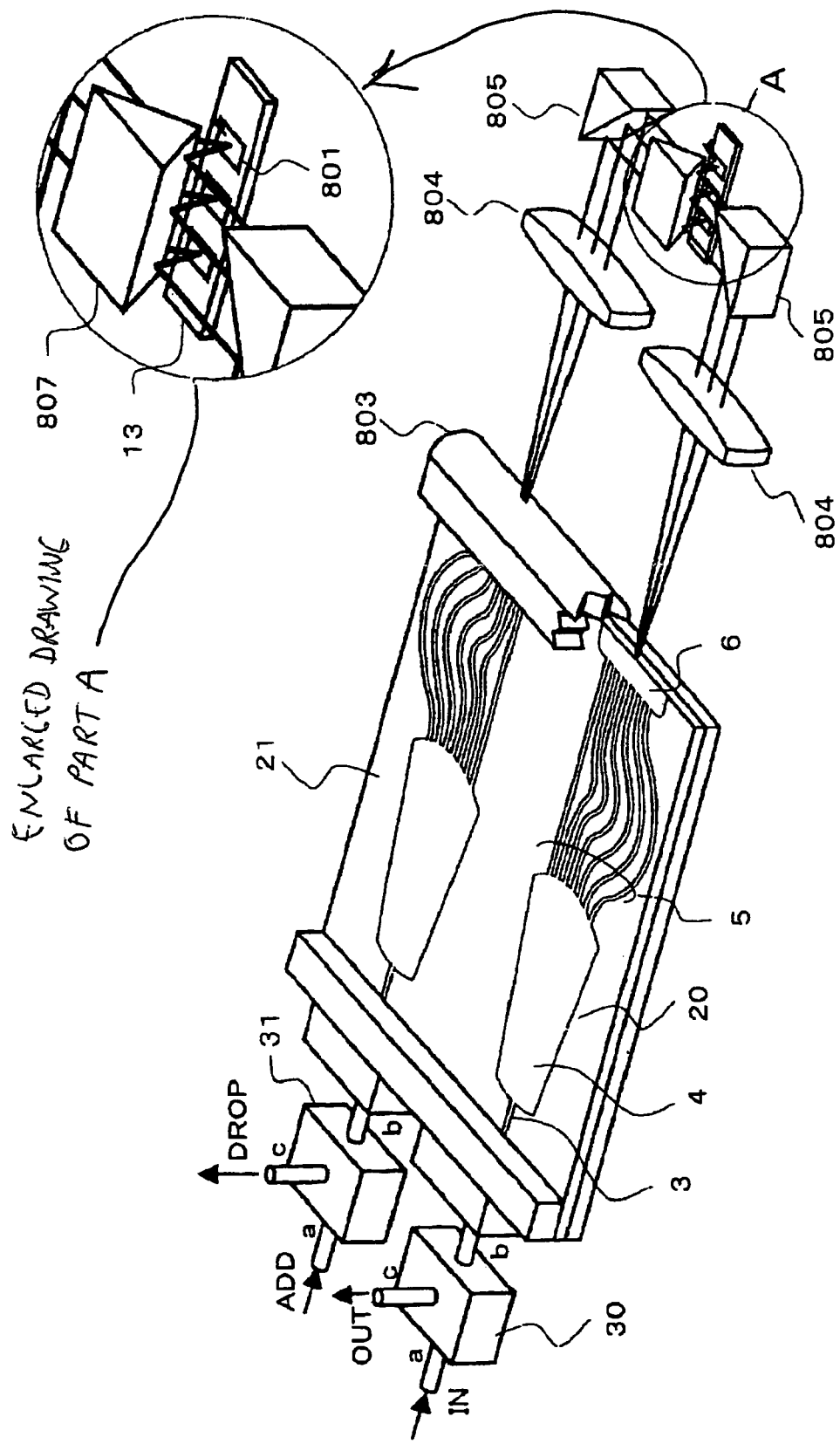
FIG. 40 shows a configuration example of the wavelength selective switch of Embodiment 14.

FIG. 40 is an embodiment of the optical functional device of the present invention as a wavelength selective switch in a WDM communications system.

In FIG. 40, the wavelength selective switch of this embodiment is equipped with optical circulators 30 and 31 as an optical device that output to a second port (b) light that was inputted to the first port (a), and outputs to a third port (c) light that was inputted to the second port (b), and these optical circulators 30 and 31 are connected to the input terminals of combining/branching devices 20 and 21, respectively.

Furthermore, combining/branching devices 20 and 21 of this embodiment are comprised of input slab waveguide 4, input waveguide 3 as an input terminal that inputs light into this input slab waveguide 4, output slab waveguide 6, and channel waveguide array 5 comprising multiple channel waveguides with different lengths in which light is inputted from input slab waveguide 4 and light is outputted to output slab waveguide 6.

In FIG. 40, if wavelength division multiplexed light is sent to the IN port of optical circulator 30, it is guided to input waveguide 3 of the first combining/branching device 20. The light freely propagates through input slab waveguide 4, reaches channel waveguide array 5, and optically couples, so the power of the input light is distributed to all of the channel waveguides that constitute channel waveguide array 5.

The light within each channel waveguide that constitutes channel waveguide array 5 causes phase shifts corresponding to its wavelength and it is outputted from the output terminal, and exits as parallel light in an angular dispersion direction based on each wavelength.

Light that is branched into each wavelength by channel waveguide array 5 in this way is led to cylindrical lens 803, and becomes parallel light with respect to the vertical direction.

This is the same for the case in which wavelength division multiplexed light is sent to the ADD port of optical circulator 31.

Moreover, lenses 804 are respectively established as a device for focusing (a) light of each wavelength that generates angular dispersion with the first combining/branching device 20 and (b) light of the same wavelength that generates angular dispersion with the second combining/branching device 21 into different positions based on the angular dispersion directions.

Furthermore, these lenses 804 and mirrors 805 and 807 are arranged such that (a) the position in which light of a frequency generating angular dispersion with the first combining/branching device 20 is focused and (b) the position in which the light of the same frequency generating angular dispersion with the second combining/branching device 21 is focused are in agreement.

Moreover, mirror array 13 comprising multiple mirrors 801 is arranged as a light reflection device that is established in at least one position in which light of each frequency generating this angular dispersion is nearly focused, and light of each frequency branched by the first combining/branching device is fed into this array.

Mirrors 801 corresponding to each branched wavelength are arranged on mirror array 13. The angle of each mirror is adjusted as necessary, and light from the first combining/branching device 20 is either returned to the first combining/branching device 20 or it is reflected to the second combining/branching device 21.

In other words, regarding light with a wavelength in which switching is not performed from among wavelength division multiplexed light sent to the first combining/branching device 20, the reflection angle of the mirror in the position corresponding to that wavelength is adjusted such that the light from the first combining/branching device 20 returns to the first combining/branching device 20.

On the other hand, regarding light with a wavelength in which switching is performed, the reflection angle of the mirror in the position corresponding to that wavelength is adjusted such that the light from the first combining/branching device 20 is led to the second combining/branching device 21. At this time, light with the same wavelength from the second combining/branching device 21 is reflected with this mirror and led to the first combining/branching device 20.

In this way, the function of a wavelength selective switch, which is an optical functional device that can (a) drop light of prescribed wavelength from among wavelength division multiplexed light that entered the IN port of optical circulator 30 and lead it to the DROP port of optical circulator 31, and (b) add light with the same wavelength as the dropped wavelength from among wavelength division multiplexed light that entered the ADD port of optical circulator 31 and output it from the OUT port of optical circulator 30 as wavelength division multiplexed light, is fulfilled.

In this way, through this embodiment, flattop and low-loss transmission properties can be obtained. Moreover, because it is compact and there are few parts to assemble, it is possible to realize wavelength selective switches as low-loss optical functional devices without troublesome assembly.

Furthermore, because it is possible to use a configuration resembling those of Embodiments 10~13 for an optical system comprised of combining/branching devices, cylindrical lens 803, lenses 804, and mirrors 805 and 807, there is no need to separately develop this part for a wavelength selective switch, and there is also the effect of reducing costs due to mass production of common parts.

For example, the wavelength selective switch shown in this embodiment is configured such that the DGEQ shown in FIG. 36 is axisymmetrically arranged and array 13 of mirrors 801 and mirror 806 are shared.

Moreover, for the sake of convenience in FIG. 40, the light paths of light of three branched wavelengths are shown and only three mirrors 801 corresponding to these are shown, but it is obvious that the number of branched wavelengths and the number of mirrors 801 are not limited to these numbers.

Embodiment 15

Figure 41:
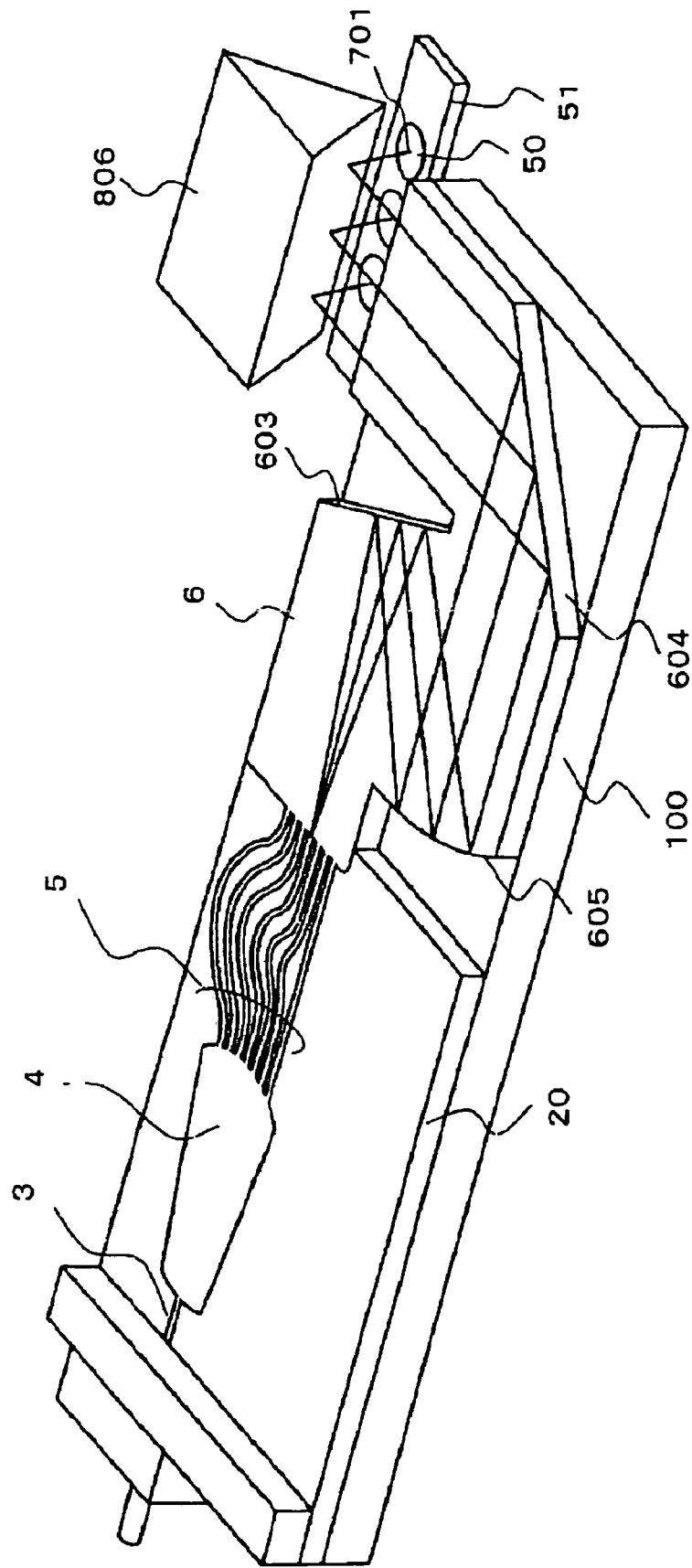
FIG. 41 shows a configuration example of the OPM of Embodiment 15.

FIG. 41 is an embodiment of the optical functional device of the present invention as an OPM in a WDM communications system, and it fulfills the same function as the OPM shown in FIG. 39.

The difference between the configuration of FIG. 41 and the configuration of FIG. 39 is that a portion of the functionality of the components of the free-space optical system in FIG. 39 is realized inside of output slab waveguide 6.

In FIG. 41, slab waveguide interior end faces 603 and 604, in which the lines drawn by the edges when the end faces inside the slab waveguide are projected against the primary plane of slab substrate 100 are straight lines, are formed such that they are approximately perpendicular to the primary plane of slab substrate 100, such that the light that freely propagates within the core pattern of output slab waveguide 6 is reflected in a direction that is parallel to the primary plane of slab substrate 100, thus fulfilling the function of mirror 805 in FIG. 39.

Here, "the line drawn by the edge when the end face inside the slab waveguide is projected against the primary plane of the slab substrate" refers to, "the line drawn by the slab waveguide interior end face (for example, 603) when viewed from directly above slab substrate 100."

Slab waveguide interior end face 605, in which the line drawn by the edge when projected against the primary plane of the slab substrate is a curve, is established inside output slab waveguide 6. It is the reflection surface that focuses light of each wavelength generating angular dispersion with combining/branching device 20 into different positions based on the angular dispersion directions, and it thus fulfills the function of lens 804 in FIG. 39.

Moreover, as stated previously, output slab waveguide 6 encloses a core having a relatively high index of refraction with a clad having a relatively low index of refraction, so light is trapped within the core. This shows that the functionality of cylindrical lens 803 of FIG. 39 is also realized in the configuration of FIG. 41.

Furthermore, by configuring slab waveguide interior end face 605 such that the line drawn by the edge when projected against the primary plane of the slab substrate is a parabola, it is possible to realize functionality that concentrates parallel light beams onto a single point without aberration, and transforms light beams emitted from a light source that can be considered a point source into parallel light with no aberration.

In other words, as shown in FIG. 13, light outputted from channel waveguide array 5 propagates through the inside of output slab waveguide 6 as parallel light facing a different direction based on each wavelength. By reflecting with end face 605, in which the line drawn by the edge when this parallel light is projected against the primary plane of the slab substrate is a parabola, it is possible to cause the light to converge.

Furthermore, by arranging photoelectric conversion element array 51 such that photoelectric conversion elements 50 are arranged as a photoelectric conversion device corresponding to positions in which of this light of each wavelength is nearly focused, it functions as an OPM that monitors the light power level of each channel (wavelength).

Moreover, by changing light paths by 90 degrees with mirror 806, this embodiment enables the mounting of slab substrate 100 and photoelectric element array 51 on the same plane.

In this way, in this embodiment as well, as with Embodiment 14 described previously, flattop and low-loss transmission properties can be obtained. Moreover, because it is compact and there are few parts to assemble, it is possible to realize OPMs as low-loss optical functional devices without troublesome assembly.

Moreover, optical systems having slab interior waveguide end faces on output slab waveguide 6 in this way are called slab optical systems hereafter, and slab optical systems having slab interior waveguide end faces resulting from curved surfaces such as that illustrated by slab interior waveguide end face 605 in FIG. 41 are called focusing type slab optical systems.

Here, (a) the core that constitutes input waveguide 3, input slab waveguide 4, and channel waveguide array 5, and (b) the core that constitutes output slab waveguide 6 as a focusing type slab optical system can be formed simultaneously with the same materials in the thickness direction, so it has the effect in which they are automatically aligned.

Furthermore, slab interior waveguide end faces 603, 604, and 605 can be formed by printing images of patterns formed on photomasks in the same manner as in semiconductor manufacturing processes.

For example, for the realization of free-space optical systems configured with the cylindrical lens 803, lens 804, and mirror 805 of FIG. 39, because it is required that these parts are precisely aligned and fixated, assembly and adjustment require labor and time.

In contrast to this, by using a slab optical system, an optical system having the same functionality can be realized by simply designing mask patterns, and this generates the effect that manufacturing becomes easy.

Figure 42:
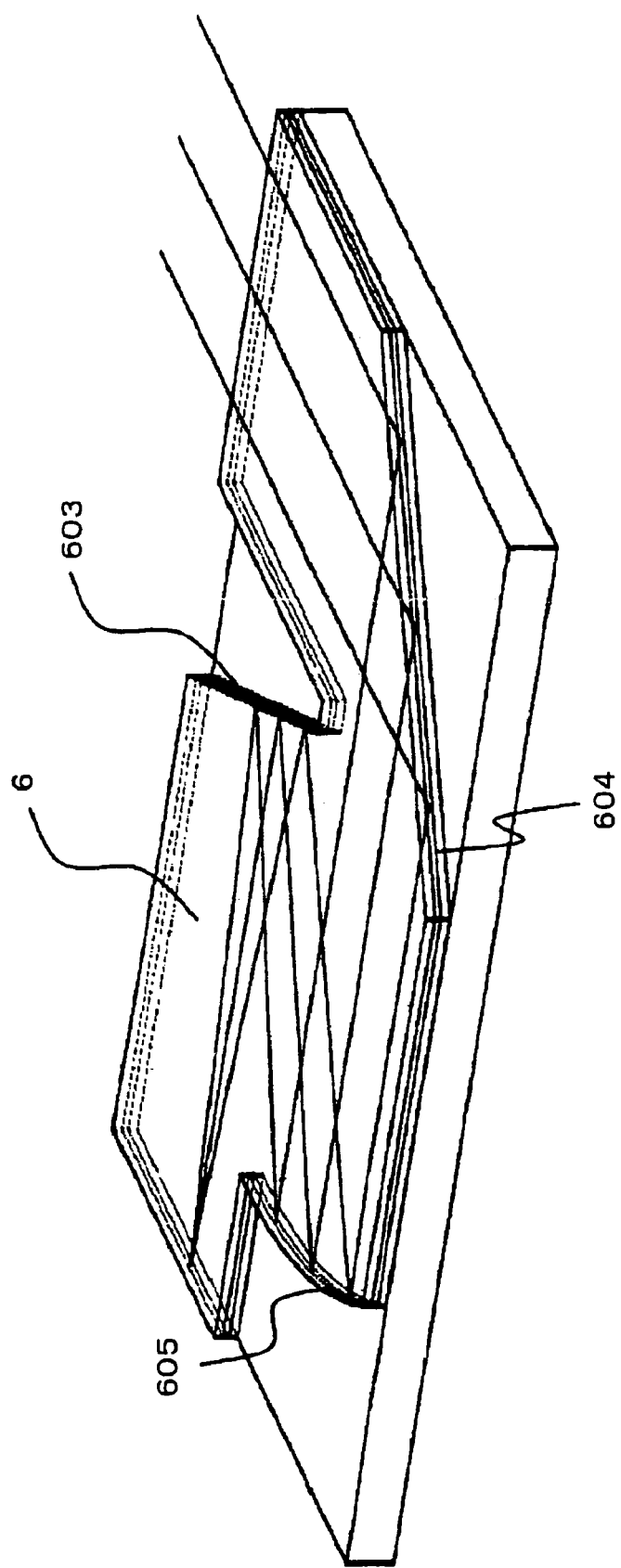
FIG. 42 shows a configuration example of a slab optical system.

FIG. 42 is a diagram that shows an example of a slab optical system, and it has the same configuration as the part of output slab waveguide 6 of FIG. 41.

As shown in FIG. 42, in the method that separately manufactures the output slab waveguide only and joins and optically couples the combining/branching device parts illustrated in FIG. 39, for example, the effect is generated that manufacturing becomes easier than when an optical system is configured by separately using cylindrical lens 803, lens 804, and mirror 805.

Furthermore, the number, shape, and arrangement of the reflection surfaces comprised of slab waveguide end faces can, of course, be changed as necessary.

Figure 43:
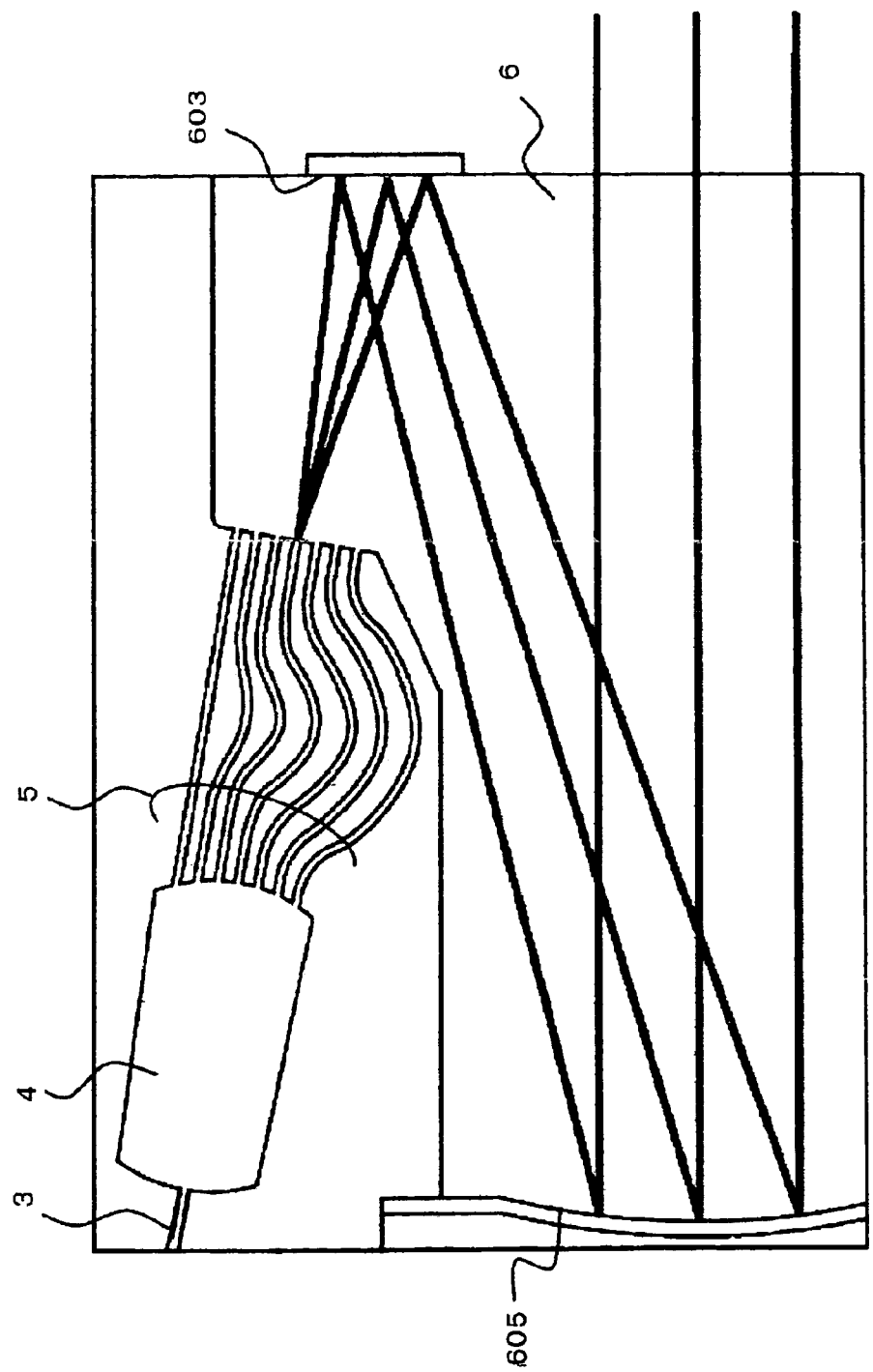
FIG. 43 shows another configuration example of a slab optical system.

FIG. 43 is an example of another configuration of a slab optical system. It is a configuration in which the reflection surface that constitutes the slab waveguide end face is broken into two slab waveguide end faces, 603 and 605, and this reflection surface is arranged on the end face or in the vicinity of the end face of the slab substrate. This configuration generates the effect that the formation of high-reflectivity films and low-reflectivity films on the reflection surface becomes easy.

Next, the concrete structure of the OPM shown in FIG. 41 will be explained.

The core that constitutes output slab waveguide 6 in FIG. 41 can be manufactured simultaneously and with the same materials as the core that constitutes a wavelength combining/branching filter, so its index of refraction and thickness are the same as the core that constitutes a wavelength combining/branching filter, and it is formed consecutively with the core pattern for the channel waveguide array.

Slab waveguide interior end faces 603, 604, and 605 are formed through reactive ion etching after the core is embedded by clads. A photolithography process is used for this manufacturing process, so the shapes and relative positions of slab waveguide interior end faces 603, 604, and 605 are determined by patterns formed on glass masks.

The thickness, width, and length of waveguides and the core/clad index of refraction difference are the same as in Embodiment 1.

The dimensions of the slab optical system are as follows. The distance from the output apertures of the core pattern for the channel waveguide array to slab waveguide interior end face 603 is approximately 45 mm, the distance along the light path from the output apertures of the core pattern for the channel waveguide array to slab waveguide interior end face 605 is 85 mm, and the curvature radius of slab waveguide interior end face 605 is 200 mm.

The distance along the light path from slab waveguide interior end face 605 to focus position 701 is approximately 100 mm. The pitch between the optical receiver parts of each photoelectric conversion element 50 of photoelectric conversion element array 51 is 100 μm, and the diameter of optical receiver parts is 50 μm.

Moreover, a cylindrical lens for the purpose of focusing on focus position 701 light that radiates in directions perpendicular to the primary plane of the slab substrate may be arranged on the part in which the light propagates through the slab optical system.

Moreover, for the sake of convenience in FIG. 41, the light paths of light of three branched wavelengths are shown and only three photoelectric conversion elements 50 corresponding to these are shown, but it is obvious that the number of branched wavelengths and the number of photoelectric conversion elements 50 are not limited to these numbers.

Embodiment 16

Figure 44:
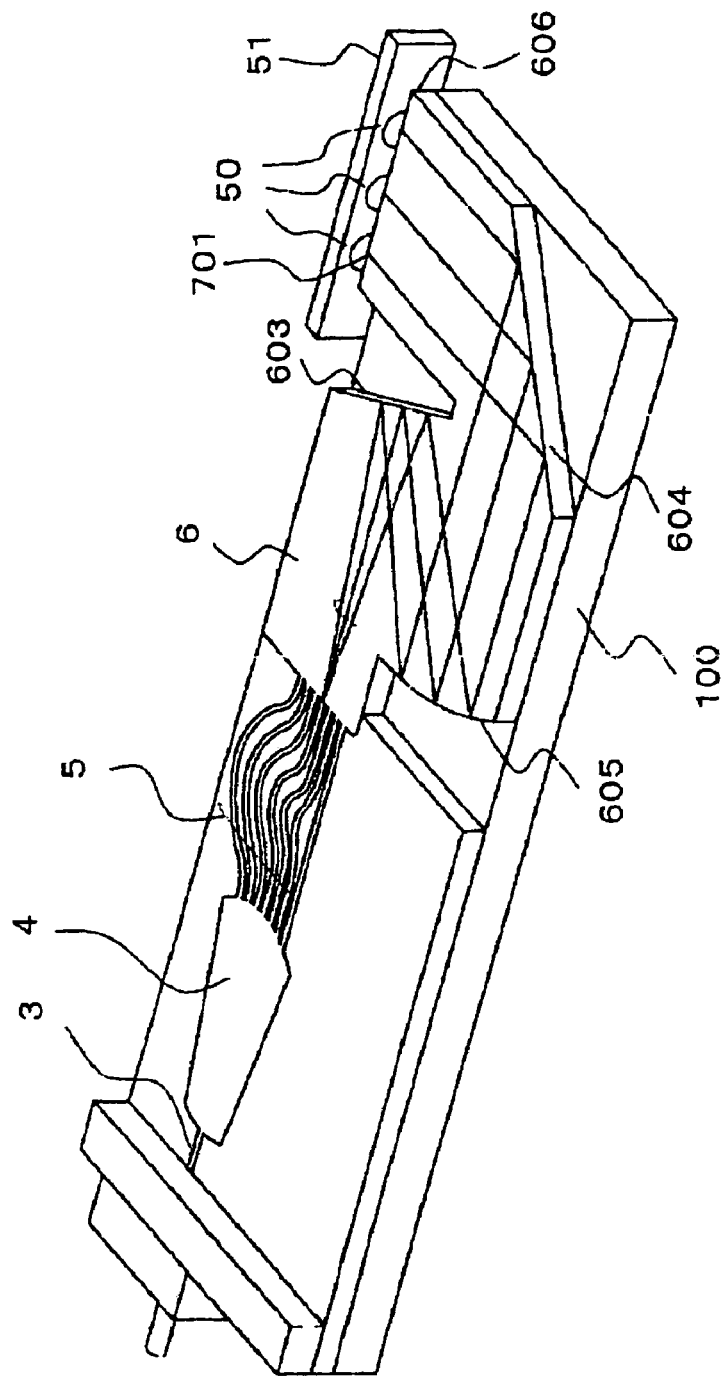
FIG. 44 shows a configuration example of the OPM of Embodiment 16.

FIG. 44 is an embodiment of the optical functional device of the present invention as an OPM in a WDM communications system, and it fulfills the same function as the OPM shown in FIG. 41.

The difference between the configuration of FIG. 44 and the configuration of FIG. 41 is that FIG. 44 of this embodiment is a configuration in which (a) mirror 806, which is a component of the free-space optical system in FIG. 41, is not established, (b) position 701 in which light that generates angular dispersion is focused is brought together with the last end face 606 of the focusing type slab optical system, and (c) photoelectric conversion element array 51 is attached to this end face.

In this embodiment as well, as with Embodiment 15 described previously, flattop and low-loss transmission properties can be obtained. Moreover, because it is compact and there are few parts to assemble, it is possible to realize OPMs as low-loss optical functional devices without troublesome assembly.

Furthermore, through this embodiment, effects are generated in which, in comparison to Embodiment 15, the number of parts is further reduced and the cost decreases, the number of necessary points for part alignment decreases and the configuration of the optical system becomes easy, the stability of the optical system improves due to the fact that position misalignment of parts is less likely to occur, and it becomes compact.

Moreover, in FIG. 44, the curvature radius of slab waveguide interior end face 605 is approximately 180 mm.

Moreover, for the sake of convenience in FIG. 44, the light paths of light of three branched wavelengths are shown and only three photoelectric conversion elements 50 corresponding to these are shown, but it is obvious that the number of branched wavelengths and the number of photoelectric conversion elements 50 are not limited to these numbers.

Embodiment 17

Figure 45:
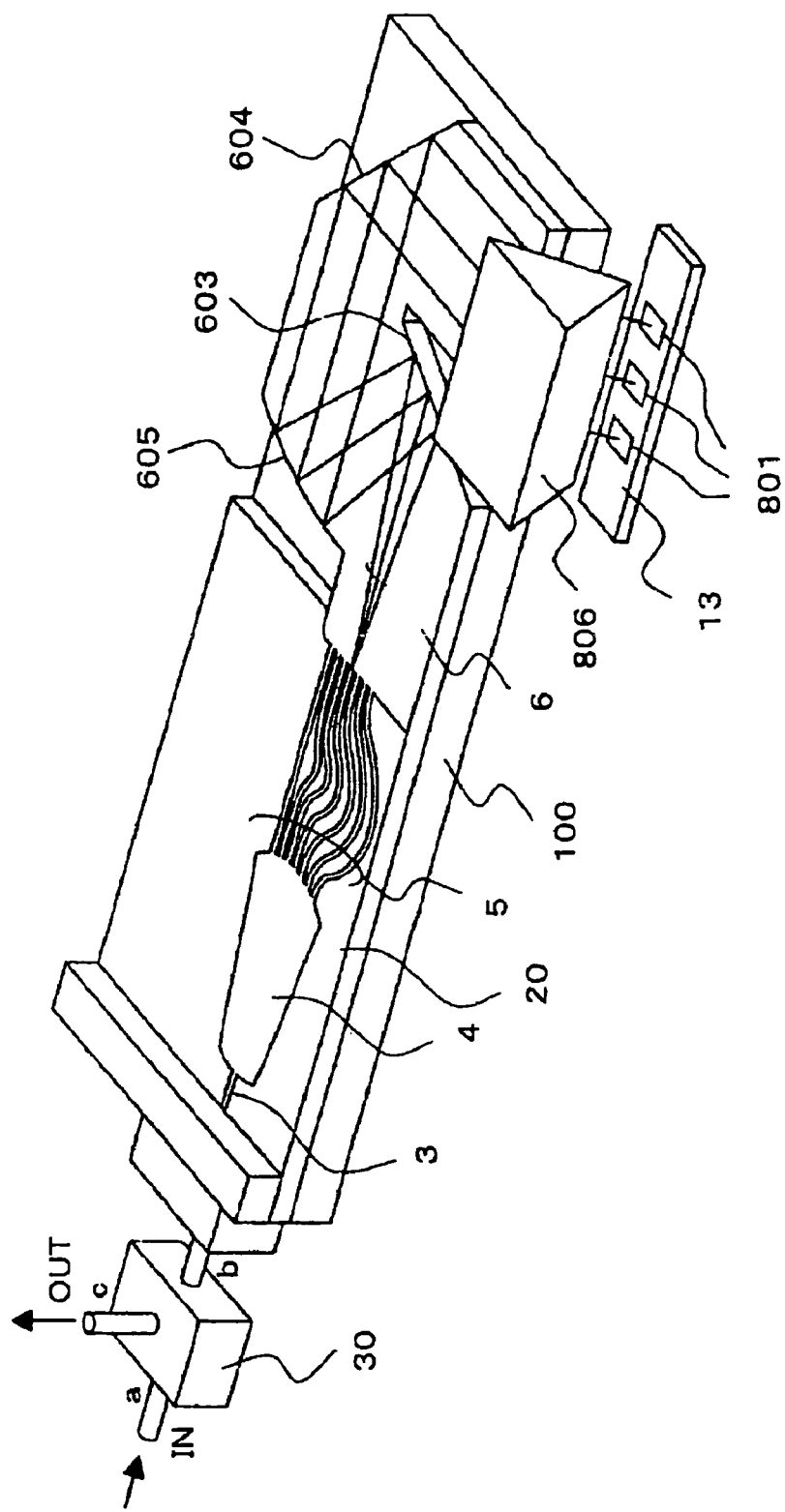
FIG. 45 shows a configuration example of the DGEQ of Embodiment 17.

FIG. 45 is an embodiment of the optical functional device of the present invention, a DGEQ in a WDM communications system, and it fulfills the same function as the DGEQ shown in FIG. 36.

The relationship between this embodiment and Embodiment 11 is the same as the relationship between Embodiment 15 and Embodiment 13.

In other words, the difference between the configuration of this embodiment shown in FIG. 45 and the configuration shown in FIG. 36 is that a portion of the functionality of the components of the free-space optical system in FIG. 36 is realized inside of output slab waveguide 6.

In FIG. 45, slab waveguide interior end faces 603 and 604 are formed such that they are approximately perpendicular to the primary plane of slab substrate 100, such that the light that freely propagates within the core pattern of output slab waveguide 6 is reflected in a direction that is parallel to the primary plane of slab substrate 100, thus fulfilling the function of mirror 805 in FIG. 36.

Slab waveguide interior end face 605, in which the line drawn by the edge when projected against the primary plane of slab substrate 100 is a curve, is established inside output slab waveguide 6. It is the reflection surface that focuses light of each wavelength generating angular dispersion with combining/branching device 20 into different positions based on the angular dispersion directions, and it thus fulfills the function of lens 804 in FIG. 36.

Furthermore, it operates in the same manner as Embodiment 11, and fulfills the function as a DGEQ.

In this embodiment as well, as with Embodiment 14 described previously, flattop and low-loss transmission properties can be obtained. Moreover, because it is compact and there are few parts to assemble, it is possible to realize DGEQs as low-loss optical functional devices without troublesome assembly.

Furthermore, through this embodiment, due to the fact that the combining/branching device and the focusing type slab optical system are formed as a unit, effects are generated in which the number of parts is reduced and the cost decreases, the number of necessary points for part alignment decreases and the configuration of the optical system becomes easy, the stability of the optical system improves due to the fact that position misalignment of parts is less likely to occur, and it becomes compact.

Moreover, for the sake of convenience in FIG. 45, the light paths of light of three branched wavelengths are shown and only three mirrors 801 corresponding to these are shown, but it is obvious that the number of branched wavelengths and the number of mirrors 801 are not limited to these numbers.

Embodiment 18

Figure 46:
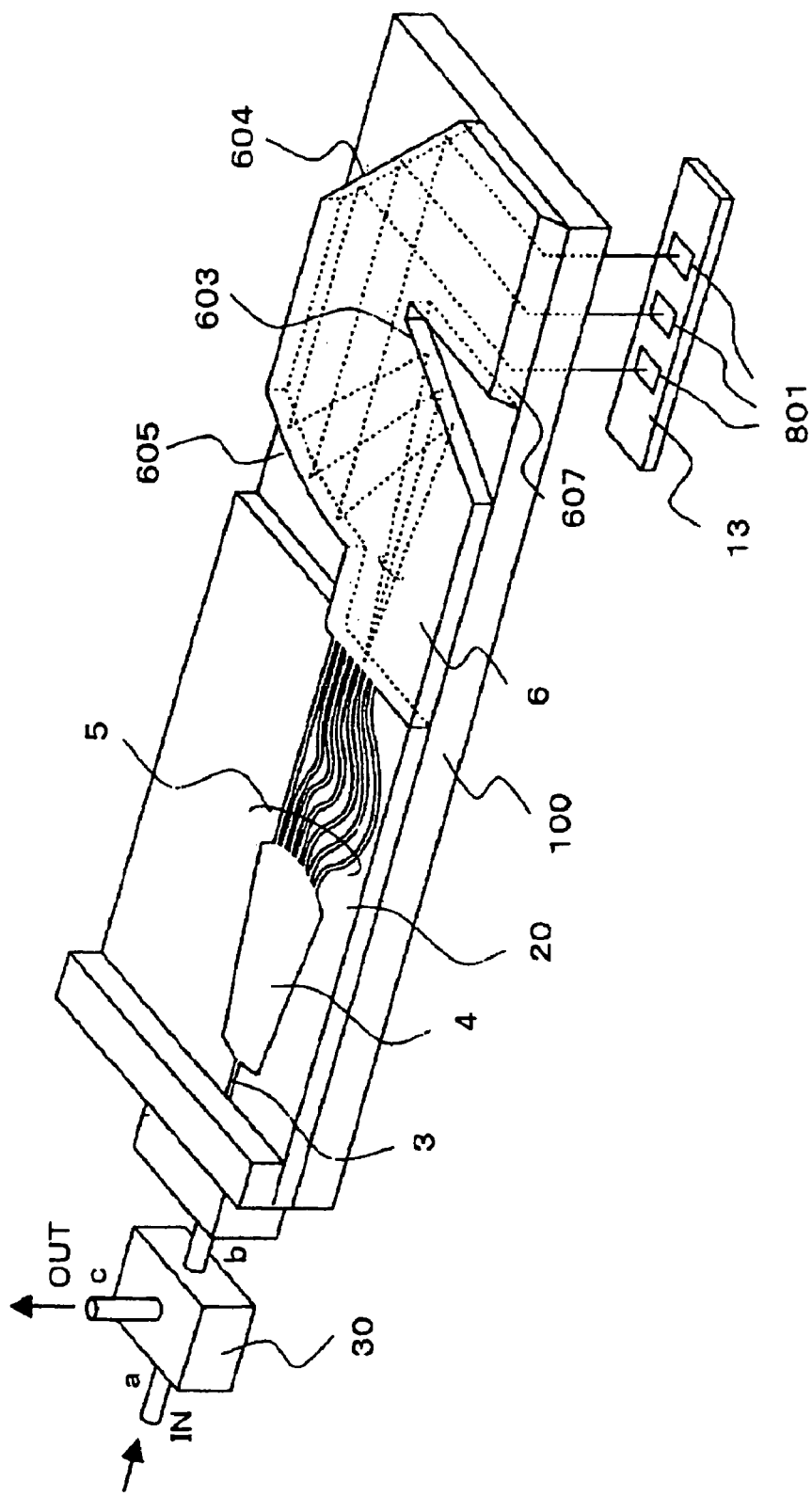
FIG. 46 shows a configuration example of the DGEQ of Embodiment 18.

FIG. 46 is an embodiment of the optical functional device of the present invention as a DGEQ in a WDM communications system, and it fulfills the same function as the DGEQ shown in FIG. 45.

The difference between the configuration of this embodiment shown in FIG. 46 and the configuration shown in FIG. 45 is that the function of mirrors 805 that constitute the free-space optical system in FIG. 45 is realized inside of output slab waveguide 6, and other components are identical to FIG. 45.

In other words, mirror 806, which was necessary in FIG. 45, is made unnecessary by establishing slab waveguide interior end face 607, which is inclined with respect to the primary plane of slab substrate 100, inside output slab waveguide 6 in FIG. 46, and guiding light that propagates through the output slab waveguide with this inclined plane in a direction perpendicular to slab substrate 100. As with the configuration shown in FIG. 45, it is possible to simplify mounting by making parallel the primary plane of mirror array 13 and the primary plane of slab substrate 100.

Furthermore, in this embodiment as well, it operates in the same manner as Embodiment 11, and is obvious that it fulfills the function as a DGEQ.

Moreover, in this embodiment as well, flattop and low-loss transmission properties can be obtained. Moreover, because it is compact and there are few parts to assemble, it is possible to realize DGEQs as low-loss optical functional devices without troublesome assembly.

Furthermore, through this embodiment, due to the fact that the combining/branching device and the focusing type slab optical system are formed as a unit, effects are generated in which the number of parts is reduced and the cost decreases, the number of necessary points for part alignment decreases and the configuration of the optical system becomes easy, the stability of the optical system improves due to the fact that position misalignment of parts is less likely to occur, and it becomes compact.

Moreover, for the sake of convenience in FIG. 46, the light paths of light of three branched wavelengths are shown and only three mirrors 801 corresponding to these are shown, but it is obvious that the number of branched wavelengths and the number of mirrors 801 are not limited to these numbers.

Embodiment 19

Figure 47:
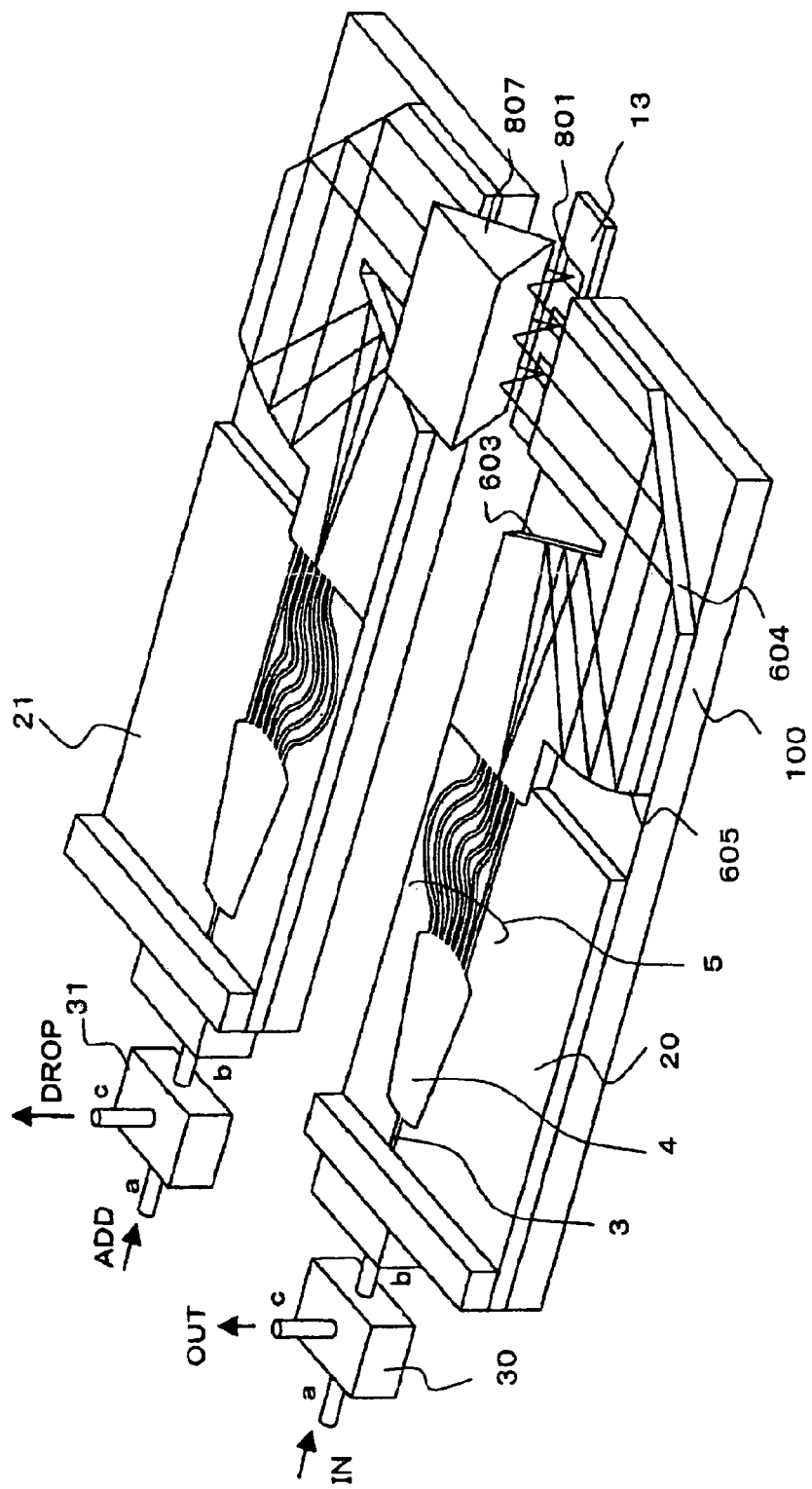
FIG. 47 shows a configuration example of the wavelength selective switch of Embodiment 19.

FIG. 47 is an embodiment of the optical functional device of the present invention as a wavelength selective switch in a WDM communications system, and it fulfills the same function as the wavelength selective switch shown in FIG. 40.

The relationship between this embodiment and Embodiment 14 is the same as the relationship between Embodiment 15 and Embodiment 13.

In other words, the difference between the configuration of this embodiment shown in FIG. 47 and the configuration shown in FIG. 40 is that a portion of the functionality of the components of the free-space optical system in FIG. 40 is realized inside of output slab waveguide 6.

In FIG. 47, slab waveguide interior end faces 603 and 604 are formed such that they are approximately perpendicular to the primary plane of slab substrate 100, such that the light that freely propagates within the core pattern of output slab waveguide 6 is reflected in a direction that is parallel to the primary plane of slab substrate 100, thus fulfilling the function of mirror 805 in FIG. 40.

Slab waveguide interior end face 605, in which the line drawn by the edge when projected against the primary plane of slab substrate 100 is a curve, is established inside output slab waveguide 6. It is the reflection surface that focuses light of each wavelength generating angular dispersion with combining/branching device 20 into different positions based on the angular dispersion directions, and it thus fulfills the function of lens 804 in FIG. 40. This is the same with respect to the output slab waveguide of combining/branching device 21.

Moreover, it operates in the same manner as Embodiment 15, and fulfills the function as a wavelength selective switch.

In this embodiment as well, flattop and low-loss transmission properties can be obtained. Moreover, because it is compact and there are few parts to assemble, it is possible to realize wavelength selective switches as low-loss optical functional devices without troublesome assembly.

Furthermore, through this embodiment, the combining/branching device and the focusing type slab optical system are formed as a unit, so effects are generated in which the configuration of the optical system becomes easy, the stability of the optical system improves due to the fact that position misalignment of parts is less likely to occur, and it becomes compact.

Moreover, a portion or all of the waveguides that constitute this embodiment may be simultaneously created on the same slab substrate.

Moreover, for the sake of convenience in FIG. 47, the light paths of light of three branched wavelengths are shown and only three mirrors 801 corresponding to these are shown, but it is obvious that the number of branched wavelengths and the number of mirrors 801 are not limited to these numbers.

Embodiment 20

Figure 48:
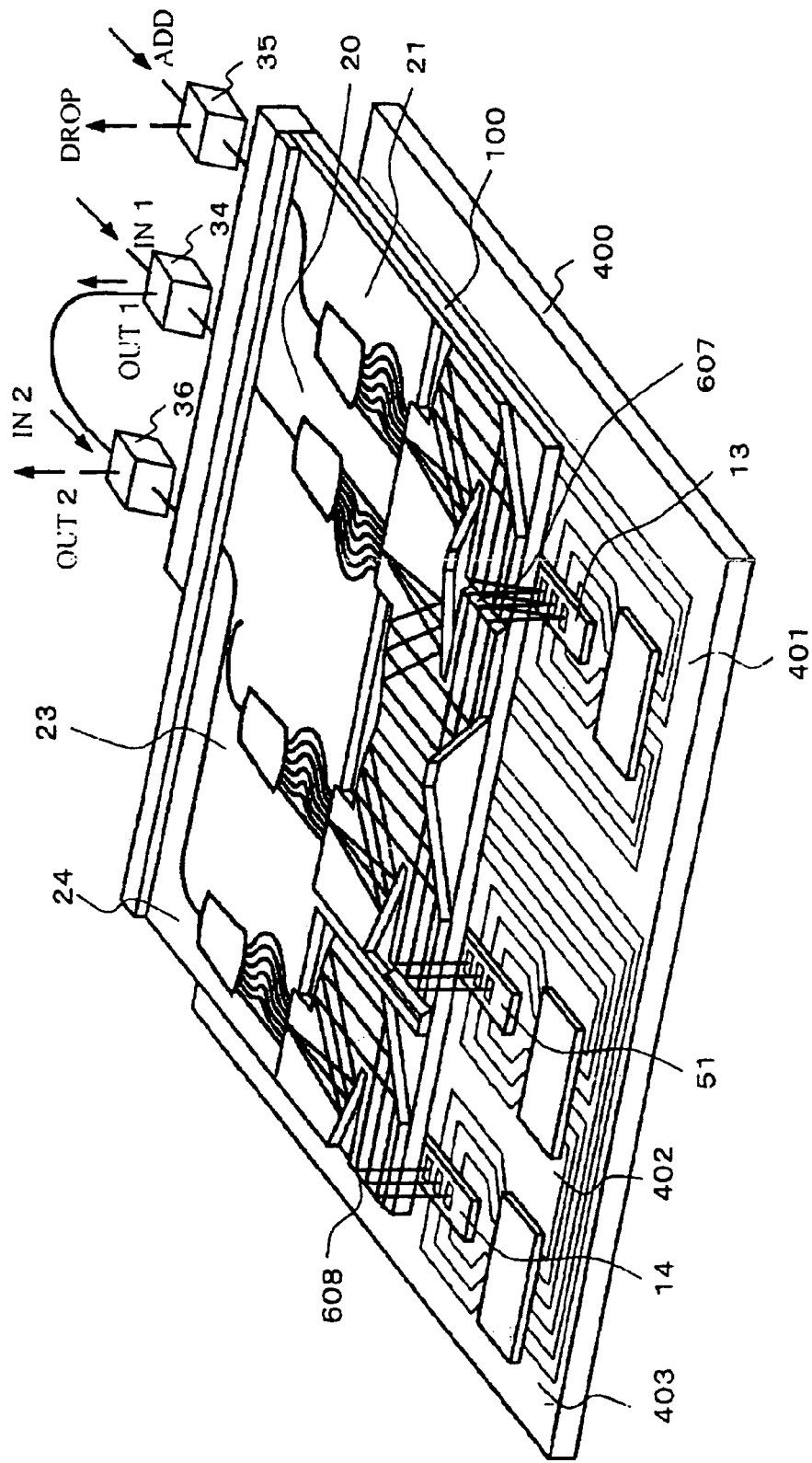
FIG. 48 shows a configuration example of the optical functional device of Embodiment 20.

FIG. 48 is an embodiment of the optical functional device of the present invention as a wavelength selective switch in a WDM communication system, DGEQ, and OPM composite device. Fulfilling each function, it is a configuration in which the combining/branching device and the slab optical system of the present invention are formed as a unit.

In FIG. 48, combining/branching device 20, combining/branching device 21, the slab optical systems of these, mirror array 13, and auxiliary circuit 401 that controls the mirrors form a wavelength selective switch that is approximately the same as the configuration shown in FIG. 47.

Here, slab waveguide interior end face 607 of the output terminal of the slab optical system is inclined with respect to the primary plane of slab substrate 100, and it is arranged such that light of each wavelength branched by combining/branching device 20 and light of each wavelength branched by combining/branching device 21 are respectively guided to the corresponding mirrors of mirror array 13 that is mounted on substrate 400, which is roughly parallel to the primary plane of slab substrate 100, and light of the same wavelength is focused on the same mirror, thus fulfilling the function of mirror 807 in FIG. 47.

Light of a prescribed wavelength from among wavelength division multiplexed light that is inputted to the IN1 port of optical circulator 34 is outputted from the DROP port of optical circulator 35. Light of other wavelengths is combined with light having the same wavelength as this prescribed wavelength that is inputted from the ADD port of optical circulator 35, and it is outputted from the OUT1 port of optical circulator 34, thus fulfilling the function of a wavelength selective switch.

Wavelength division multiplexed light that is outputted from the OUT1 port of optical circulator 35 is inputted to the IN2 port of optical circulator 36.

Combining/branching device 23, the slab optical system of combining/branching device 23, photoelectric conversion element array 51, and auxiliary circuit 402, which processes electrical signals from each photoelectric conversion element and controls the photoelectric conversion elements, form an OPM that is approximately the same as the configuration shown in FIG. 41.

A portion of wavelength division multiplexed light that is inputted to the IN2 port of optical circulator 36 is guided to combining/branching device 23 for monitoring, where it generates angular dispersion and is branched. It is focused on the photoelectric conversion element corresponding to each wavelength of photoelectric conversion element array 51 and its intensity is monitored, thus realizing the function of an OPM.

Combining/branching device 24, the slab optical system of combining/branching device 24, mirror array 14, and auxiliary circuit 403, which controls mirror array 14, form a DGEQ that is approximately the same as the configuration shown in FIG. 41.

Here, slab waveguide interior end face 608 of the output terminal of the slab optical system of combining/branching device 24 is inclined with respect to the primary plane of slab substrate 100, and it is arranged such that light of each wavelength branched by combining/branching device 24 is respectively guided to the corresponding mirrors of mirror array 14 that is mounted on substrate 300, which is roughly parallel to the primary plane of slab substrate 100, thus fulfilling the function of mirror 806 in FIG. 41.

Light other than the aforementioned light that is branched for monitoring from among wavelength division multiplexed light that is inputted to the IN2 port of the aforementioned optical circulator 36 is guided to combining/branching device 24, where it generates angular dispersion and is branched into each wavelength.

It is focused on the corresponding mirrors of mirror array 14, causing prescribed attenuation, and it is outputted as wavelength division multiplexed light from the OUT2 port of optical circulator 36. The function of a DGEQ can thus be realized.

As described above, by using the optical functional device of this embodiment, it is possible to (a) add and drop prescribed wavelengths with respect to wavelength division multiplexed light transmitted from a terminal, for example, (b) monitor the resulting wavelength division multiplexed light for each wavelength, and (c) regulate each wavelength to prescribed light levels.

In this embodiment as well, flattop and low-loss transmission properties can be obtained. Moreover, because it is compact and there are few parts to assemble, it is possible to realize low-loss optical functional devices without troublesome assembly.

Furthermore, through this embodiment, the alignment of parts configured with light guides and mirrors and photoelectric conversion elements can be performed together at once, which results in the effect that the labor of alignment is reduced. Additionally, it is also possible to perform optical fiber connections together at once, which result in the effect that the labor of fiber connection is reduced.

Moreover, for the sake of convenience in FIG. 48, the light paths of light of three branched wavelengths are shown and only three mirrors that constitute mirror array 13, 3 photoelectric conversion elements that constitute photoelectric conversion element array 51, and 3 mirrors that constitute mirror array 14 are shown, but it is obvious that the number of branched wavelengths and the numbers of mirrors and photoelectric conversion elements are not limited to these numbers.

Moreover, this embodiment is configured such that the functions of the wavelength selective switch, the OPM, and the DGEQ are realized one by one in this order, but the combination of these functions, the number realized, and their order can be selected as necessary.

Embodiment 21

Figure 49:
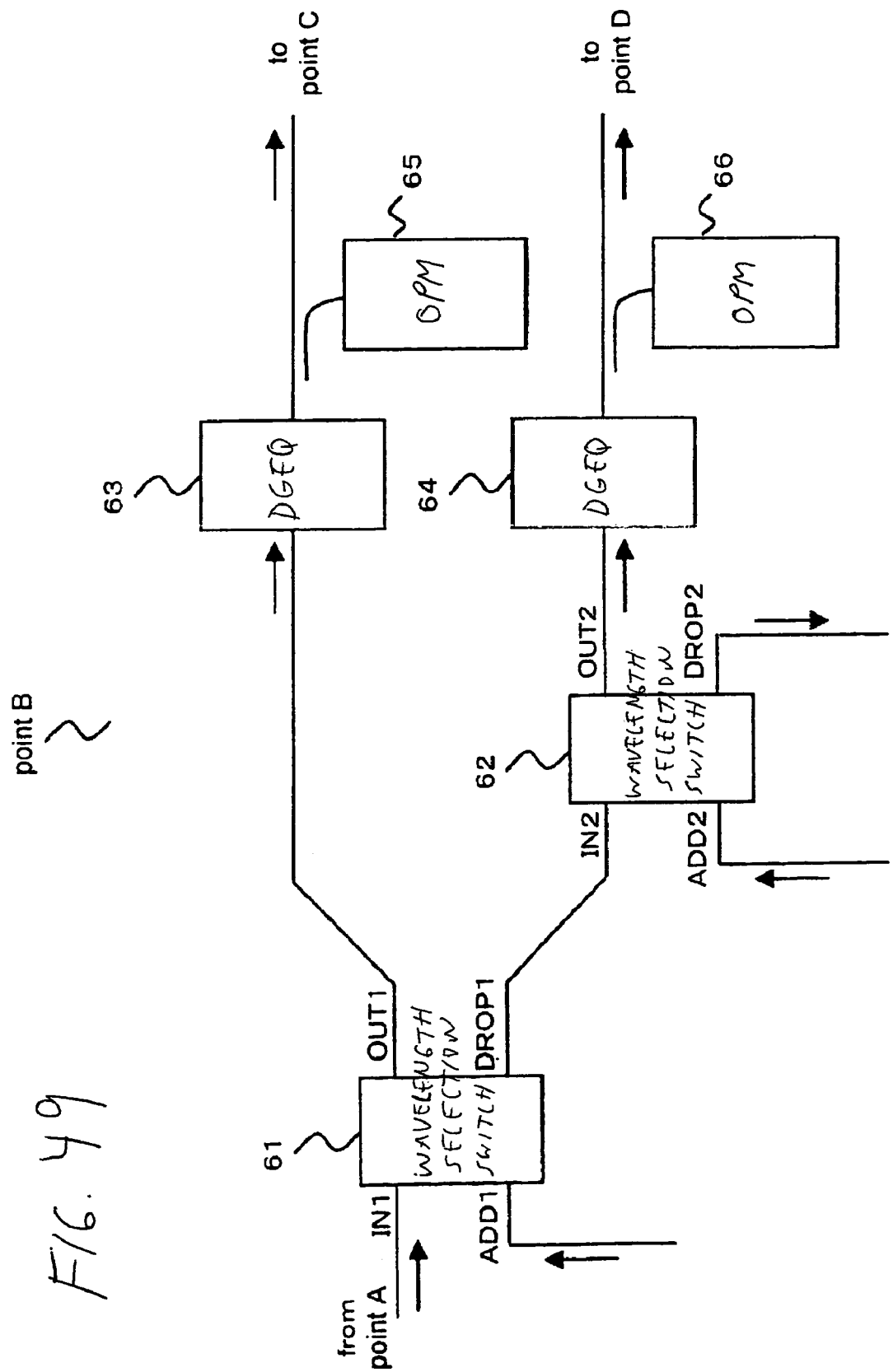
FIG. 49 shows a configuration example of the WDM transmission system of Embodiment 21.

FIG. 49 is an embodiment applied to a WDM transmission system using the optical functional device of the present invention, and it shows the configuration of point B having the function of dividing each channel (wavelength) of wavelength division multiplexed light from point A into the directions of point C and point D.

Moreover, this configuration of point B has (a) the function of adding and dropping specific channels to, and from wavelength division multiplexed light heading towards points C and D, (b) the function of an OPM that monitors the light intensity of each channel that constitutes the wavelength division multiplexed light, and (c) the function of a DGEQ that adjusts the attenuation of light of each channel.

In FIG. 49, wavelength division multiplexed light from point A is inputted to the IN1 port of wavelength selective switch 61. Light from specific channels is outputted from the OUT1 port and divided into the direction of point C, while light from the other channels is outputted from the DROP1 port and divided into the direction of point D.

At this time, it is possible to input wavelength division multiplexed light to the ADD1 port, add light of the same channels (wavelength) as the channels that were divided into the direction of point D to wavelength division multiplexed light that is outputted from the OUT1 port, and transmit it towards point C.

This wavelength division multiplexed light heading towards point C approaches point C by way of DGEQ 63, and a portion of this is inputted to OPM 65. The intensity of light of each channel that constitutes the wavelength division multiplexed light can be measured with OPM 65, and the intensity of light of specific channels can be adjusted as necessary with DGEQ 63.

For example, each channel of wavelength division multiplexed light heading towards point C is comprised of a channel that uses point A as a transmission source and an additional channel that uses point B as a transmission source, and cases in which the intensities of light significantly differ due to this difference in transmission sources and differences in transmission routes, for example, can be considered. However, through this embodiment, it is possible to monitor and regulate the intensities of light of each channel, and it is possible to transmit light in the direction of point C after making the intensities of light of each channel roughly equivalent.

Moreover, wavelength division multiplexed light heading towards point D that is outputted from the DROP1 port of wavelength selective switch 61 is inputted to the IN2 port of wavelength selective switch 62. It is possible to output light of specific channels from the DROP2 port, and utilization at point B—for example, converting it into electrical signals, or transferring it to other points—is possible.

Furthermore, light of channels other than the channels outputted from this DROP2 port is outputted from the OUT2 port towards point D, but at this time it is possible to input wavelength division multiplexed light to the ADD2 port, add light of the same channels as the channels that were outputted from the DROP2 port to wavelength division multiplexed light that is outputted from the OUT2 port, and transmit it towards point D.

Moreover, DGEQ 64 and OPM 66 are able to provide to wavelength division multiplexed light heading towards point D the same operations and effects as the aforementioned DGEQ 63 and OPM 65.

The optical functional devices shown in all of the aforementioned embodiments are applicable to the wavelength selective switch, DGEQ, and OPM of this embodiment. For example, they may assume the configurations shown in FIG. 40, FIG. 36, and FIG. 39, respectively, or they may assume the configuration shown in FIG. 48.

By using this embodiment, it becomes possible to directly distribute light arbitrary channels (wavelengths) to multiple routes, and it generates the effect in which the cost of the system reduces in comparison to the case in which the light is first converted into electrical signals.

According to above embodiments of the present invention, an optical functional device comprises a first light combining/branching device and a second combining/branching device including an input waveguide, a slab waveguide, and a channel waveguide array comprising multiple channel waveguides with differing lengths. An optical device focuses light that is branched by the first and second light combining/branching devices. A light reflector is arranged in the position of convergence of the branched light, having a variable reflection angle. Based on the reflection angle of the light reflector, the light path in which light of at least one wavelength radiated from the first light combining/branching device enters the second light combining/branching device and the light path in which this light returns to the first light combining/branching device can be selected.

According to embodiments of the present invention, an optical functional device comprises a light combining/branching device containing an input waveguide, a slab waveguide, and a channel waveguide array comprising multiple channel waveguides with differing lengths. An optical device focuses light that is branched by the light combining/branching device. A light reflector is arranged in the position of convergence of the branched light, and has a variable reflection angle.

According to embodiments of the present invention, an optical functional device comprises a light combining/branching device containing an input waveguide, a slab waveguide, and a channel waveguide array comprising multiple channel waveguides with differing lengths. An optical device focuses light that is branched by the light combining/branching device. A light reflector is arranged in the position of convergence of the branched light, and is able to move the reflection position in the traveling direction of the incident light. It is possible to regulate the light path length of light that returns to the light combining/branching device within the wavelength spectrum of incident light by changing the reflection position of the light reflector within the wavelength spectrum of the incident light.

According to embodiments of the present invention, an optical axis conversion device transforms the light path by 90 degrees between the light combining/branching device and the light reflector, where the primary surfaces of the substrates on which the light combining/branching device and the light reflector are mounted are parallel.

According to embodiments of the present invention, an optical functional device comprises a light combining/branching device that divides light of each wavelength that constitutes wavelength division multiplexed light into two or more wavelength groups, and multiplexes the wavelength division multiplexed light of each of the wavelength groups.

According to embodiments of the present invention, optical functional devices are connected to each of the branching side ports of a light combining/branching device.

According to embodiments of the present invention, an optical functional device includes a planar light guide comprising a slab substrate having a primary plane, a clad formed on the primary plane of the slab substrate, a core that has a higher index of refraction than the clad and is enclosed by the clad, and a waveguide end face in which the cross sections of the clad and the core are exposed by a surface that is perpendicular to the slab substrate. Core patterns for a channel waveguide array in which (A) the light guide is comprised of (a) a core pattern for input waveguides in which one end of the core reaches the waveguide end face, and (b) multiple independent core patterns in which one side is used as input apertures and the other side is used as output apertures, and (B) the core patterns are configured such that the light path differences between the input apertures and the output apertures of adjacent core patterns are constant. Core patterns for the input slab are connected to the input waveguide core pattern and the input apertures of the channel waveguide array core patterns. The input apertures of the channel waveguide array core patterns are arranged on the arc of a first circle having radius R, the input waveguide core pattern is formed on a Rowland circle of the first circle, and the output apertures of the channel waveguide array core patterns are arranged in a straight line at constant intervals. Light that enters the input waveguide core pattern of the light guide end face passes through the input waveguide core pattern and reaches an input slab core pattern, after which the light freely propagates within the input slab core pattern in the direction of the primary plane of the slab substrate, and optically couples with the plurality of the channel waveguide array core patterns. The input waveguide core pattern, the input slab core pattern, and the channel waveguide array core patterns are arranged such that, after light passes through the channel waveguide array core patterns, it becomes approximately parallel light and is diffracted from the output apertures of the channel waveguide array core patterns in the direction of the primary plane of the slab substrate and in directions corresponding to the wavelengths.

According to various embodiments of the present invention, an output slab core pattern formed connected to the output apertures of the channel waveguide array core patterns is established. According to various embodiments of the present invention, a slab interior waveguide end face, which is a waveguide end face for the purpose of reflecting light that is transmitted in the direction of the primary plane of the slab substrate, is on the inside of the output slab core pattern. Further, according to various embodiments of the present invention, the slab interior waveguide end face focuses almost all light, which generates angular dispersion and is outputted as parallel light from the output apertures of the channel waveguide array core patterns, in a direction that is parallel to the primary plane of the slab substrate.

According to additional embodiments of the present invention, a slab interior waveguide end face in which the line drawn by the edge when the slab interior waveguide end face is projected against the primary plane of the slab substrate is a curved line.

According to various embodiments of the present invention, the line drawn by the edge when the slab interior waveguide end face is projected against the primary plane of the slab substrate is an arc.

Further, according to embodiments of the present invention, the line drawn by the edge when the slab interior waveguide end face is projected against the primary plane of the slab substrate is a parabola.

According to embodiments of the present invention, a slab interior waveguide end face in which the line drawn by the edge when the slab interior waveguide end face is projected against the primary plane of the slab substrate is a straight line. A slab interior waveguide end face in which the line drawn by the edge when the slab interior waveguide end face is projected against the primary plane of the slab substrate is a curved line. The end faces are arranged such that they focus almost all light, which generates angular dispersion and is outputted as parallel light from output apertures of the channel waveguide array core patterns, in a direction that is parallel to the primary plane of the slab substrate.

According to embodiments of the present invention, an optical functional device has, on the inside of the output slab core pattern, an inclined waveguide end face that is inclined with respect to the primary plane of the slab substrate. Light is reflected with the inclined waveguide end face and light is emitted to the outside of the waveguide.

According to embodiments of the present invention, a light reflector is able to change the relative angles of the incident light and the reflection surface is established in a position in which of the light is nearly focused.

According to embodiments of the present invention, a light reflector is able to change the position of the reflection surface, which is perpendicular to the incident light, to the traveling direction of the incident light. The light reflector is established corresponding to each wavelength in a position in which the light is nearly focused.

According to embodiments of the present invention, a photoelectric converter is established corresponding to each wavelength in a position in which the light is nearly focused such that it optically couples with incident light.

According to embodiments of the present invention, a planar light guide includes a slab substrate having a primary plane, a clad formed on the primary plane of the slab substrate, a core that has a higher index of refraction than the clad and is enclosed by the clad, and a waveguide end face in which the cross sections of the clad and the core are exposed by a surface that is perpendicular to the slab substrate. Core patterns for a channel waveguide array in which (A) the light guide is comprised of (a) a core pattern for input waveguides in which one end of the core reaches the waveguide end face, and (b) multiple independent core patterns in which one side is used as input apertures and the other side is used as output apertures, and (B) the core patterns are configured such that the light path differences between the input apertures and the output apertures of adjacent core patterns are constant. Core patterns for the input slab are formed connected to the input waveguide core pattern and the input apertures of the channel waveguide array core patterns. The input apertures of the channel waveguide array core patterns are arranged on the arc of a first circle having radius R, the input waveguide core pattern is formed on a Rowland circle of the first circle, and the output apertures of the channel waveguide array core patterns are arranged in a straight line at constant intervals. An output slab core pattern is formed connected to the output apertures of the channel waveguide array core pattern. On the inside of the output slab core pattern, a first optical functional device and a second optical functional device have a slab interior waveguide end face, which is a waveguide end face for the purpose of (a) reflecting light that is transmitted in the direction of the primary plane of the slab substrate and (b) focusing almost all light, which generates angular dispersion and is outputted as parallel light from the output apertures of the channel waveguide array core patterns, in a direction that is parallel to the primary plane of the slab substrate. Each of the optical functional devices are arranged such that the positions in which the light is nearly focused are common, and a light reflector that is able to change the relative angles of the incident light and the reflection surface is established in this position in which the light is nearly focused.

According to embodiments of the present invention, multiple optical functional devices are formed on the same slab substrate as a unit.

Moreover, according to embodiments of the present invention, a convex lens is established on the transmission route of light that is outputted to the exterior of a planar light guide such that its focal point is positioned on the output apertures of the channel waveguide array core patterns. A light reflector is established at the focal point position of the convex lens on the opposite side as the planar light guide.

According to embodiments of the present invention, a convex lens is established on the transmission route of light that is outputted to the exterior of the planar light guide such that its focal point is positioned on the output apertures of the channel waveguide array core patterns. A light reflector is able to change the position of the reflection surface, which is perpendicular to the incident light, to the traveling direction of the incident light. The light reflector is established at the focal point position of the convex lens on the opposite side as the planar light guide.

According to embodiments of the present invention, a convex lens is established on the transmission route of light that is outputted to the exterior of the planar waveguide such that its focal point is positioned on the output apertures of the channel waveguide array core patterns. A photoelectric converter is established at the focal point position of the convex lens on the opposite side as the planar light guide such that it optically couples with incident light.

According to embodiments of the present invention, multiple optical functional devices are established. A convex lens is established on the transmission route of light that is outputted to the exterior of a planar light guide of each optical functional device such that its focal point is positioned on the output apertures of channel waveguide array core patterns. Each of the optical functional devices and the convex lenses are arranged such that the focal point position of the convex lens on the opposite side as the planar light guide becomes the same focal point position for light of the same wavelength that is outputted to the exterior of each the optical functional devices. A light reflector is able to change the relative angles of the incident light, and the reflection surface is established at the focal point position of the convex lens on the opposite side as the planar light guide.

According to embodiments of the present invention, it is possible to realize optical functional devices that have flattop transmission properties, have small loss, and are compact.

Various example dimensions and measurements are described herein. However, the present invention is not limited to any specific dimensions and/or measurements. For example, the present invention is not limited to the numbers of channels, spacing of layers/devices, and device measurements described herein.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   a first optical device receiving a first wavelength division multiplexed (WDM) light, comprising
   a substrate,
   a slab waveguide formed on the substrate, and
   channel waveguides of differing lengths formed on the substrate, wherein the first WDM light is input to the slab waveguide to thereby travel through the slab waveguide and be input to the channel waveguides of differing lengths, the channel waveguides of differing lengths having differences in optical path lengths, respectively, so that lights at different wavelengths in the first WDM light are angularly dispersed from an end face of the substrate in different directions, respectively, in accordance with wavelength;
   a second optical device receiving a second WDM light, comprising
   a substrate,
   a slab waveguide formed on the substrate, and
   channel waveguides of differing lengths formed on the substrate, wherein the second WDM light is input to the slab waveguide to thereby travel through the slab waveguide and be input to the channel waveguides of differing lengths, the channel waveguides of differing lengths having differences in optical path lengths, respectively, so that lights at different wavelengths in the second WDM light are angularly dispersed from an end face of the substrate in different directions, respectively, in accordance with wavelength;

at least one focusing device focusing the lights at different wavelengths angularly dispersed from the first optical device at different positions, respectively, and focusing the lights at different wavelengths angularly dispersed from the second optical device at different positions, respectively, so that angularly dispersed light from the first optical device and angularly dispersed light from the second optical device at the same wavelength are focused at the same position; and a reflector positioned at said same position and controllable so that a reflection angle of the reflector is adjusted to cause the light from the first optical device to be either returned to the first optical device or reflected to the second optical device.

2. An apparatus comprising:

a first optical device receiving a first wavelength division multiplexed (WDM) light, comprising
- a substrate,
- a slab waveguide formed on the substrate, and
- channel waveguides of differing lengths formed on the substrate, wherein the first WDM light is input to the slab waveguide to thereby travel through the slab waveguide and be input to the channel waveguides of differing lengths, the channel waveguides of differing lengths having differences in optical path lengths, respectively, so that lights at different wavelengths in the first WDM light are angularly dispersed from an end face of the substrate in different directions, respectively, in accordance with wavelength;

a second optical device receiving a second WDM light, comprising
- a substrate,
- a slab waveguide formed on the substrate, and
- channel waveguides of differing lengths formed on the substrate, wherein the second WDM light is input to the slab waveguide to thereby travel through the slab waveguide and be input to the channel waveguides of differing lengths, the channel waveguides of differing lengths having differences in optical path lengths, respectively, so that lights at different wavelengths in the second WDM light are angularly dispersed from an end face of the substrate in different directions, respectively, in accordance with wavelength;

at least one focusing device focusing the lights at different wavelengths angularly dispersed from the first optical device at different positions, respectively, and focusing the lights at different wavelengths angularly dispersed from the second optical device at different positions, respectively, so that angularly dispersed light from the first optical device and angularly dispersed light from the second optical device at the same wavelength are focused at the same position;

a reflector positioned at said same position; and means for controlling the reflector so that a reflection angle of the reflector is adjusted to cause the light from the first optical device to be either returned to the first optical device or reflected to the second optical device.

3. An apparatus as in claim 1, wherein the substrate, slab waveguide and channel waveguides of the first optical device together form a combining/branching device, and said at least one focusing device comprises:
 a cylindrical lens adhered to the combining/branching device.

4. An apparatus as in claim 1, further comprising:
 a first optical circulator providing the first WDM light to the first optical device so that the first WDM light is received by the first optical device, and receiving light from the first optical device that was returned to the first optical device.

5. An apparatus as in claim 4, further comprising:
 a second optical circulator providing the second WDM light to the second optical device so that the second WDM light is received by the second optical device, and receiving light from the second optical device that was reflected to the first optical device.

6. An apparatus as in claim 2, wherein the substrate, slab waveguide and channel waveguides of the first optical device together form a combining/branching device, and said at least one focusing device comprises:
 a cylindrical lens adhered to the combining/branching device.

7. An apparatus as in claim 2, further comprising:
 a first optical circulator providing the first WDM light to the first optical device so that the first WDM light is received by the first optical device, and receiving light from the first optical device that was returned to the first optical device.

8. An apparatus as in claim 7, further comprising:
 a second optical circulator providing the second WDM light to the second optical device so that the second WDM light is received by the second optical device, and receiving light from the second optical device that was reflected to the second optical device.

* * * * *